US010841627B2

(12) United States Patent
Lee et al.

(10) Patent No.: US 10,841,627 B2
(45) Date of Patent: Nov. 17, 2020

(54) BROADCAST SIGNAL TRANSMISSION METHOD, BROADCAST SIGNAL RECEPTION METHOD, BROADCAST SIGNAL TRANSMISSION APPARATUS, AND BROADCAST SIGNAL RECEPTION APPARATUS

(71) Applicant: LG ELECTRONICS INC., Seoul (KR)

(72) Inventors: Sooyeon Lee, Seoul (KR); Hyunmook Oh, Seoul (KR); Jongyeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/314,534

(22) PCT Filed: Jun. 30, 2017

(86) PCT No.: PCT/KR2017/006942
§ 371 (c)(1),
(2) Date: Feb. 1, 2019

(87) PCT Pub. No.: WO2018/004291
PCT Pub. Date: Jan. 4, 2018

(65) Prior Publication Data
US 2019/0158894 A1 May 23, 2019

Related U.S. Application Data

(60) Provisional application No. 62/417,356, filed on Nov. 4, 2016, provisional application No. 62/385,237, filed
(Continued)

(51) Int. Cl.
H04N 1/60 (2006.01)
H04N 21/235 (2011.01)
(Continued)

(52) U.S. Cl.
CPC .......... *H04N 21/2353* (2013.01); *H04N 9/00* (2013.01); *H04N 19/46* (2014.11); *H04N 19/70* (2014.11);
(Continued)

(58) Field of Classification Search
None
See application file for complete search history.

(56) References Cited

U.S. PATENT DOCUMENTS 5,909,291 A * 6/1999 Myers ................. H04N 1/6052
358/523
5,933,253 A * 8/1999 Ito ....................... H04N 1/6058
358/500
(Continued)

FOREIGN PATENT DOCUMENTS

JP 2008098849 A 4/2008
KR 1020150108911 A 9/2015
(Continued)

Primary Examiner — William J Kim
(74) Attorney, Agent, or Firm — Dentons US LLP

(57) ABSTRACT

Disclosed is a color volume mapping method. A broadcast signal transmission method according to an embodiment of the present invention may comprise the steps of: encoding video data and metadata for the video data; generating a broadcast signal including the encoded video data and metadata; and transmitting the generated broadcast signal.

10 Claims, 41 Drawing Sheets

Related U.S. Application Data on Sep. 8, 2016, provisional application No. 62/357,388, filed on Jul. 1, 2016.

(51) Int. Cl.
*H04N 9/00* (2006.01)
*H04N 19/46* (2014.01)
*H04N 19/70* (2014.01)
*H04N 21/236* (2011.01)
*H04N 21/435* (2011.01)

(52) U.S. Cl.
CPC ......... *H04N 21/236* (2013.01); *H04N 21/435* (2013.01)

(56) References Cited

U.S. PATENT DOCUMENTS

| | | | | |
|---|---|---|---|---|
| 6,724,507 | B1* | 4/2004 | Ikegami | H04N 1/6058 358/501 |
| 2005/0259109 | A1* | 11/2005 | Stokes | H04N 1/6058 345/590 |
| 2005/0276474 | A1* | 12/2005 | Um | H04N 1/6058 382/167 |
| 2006/0061786 | A1* | 3/2006 | Cho | H04N 1/6058 358/1.9 |
| 2006/0170999 | A1* | 8/2006 | Sloan | H04N 1/6058 358/520 |
| 2007/0086028 | A1* | 4/2007 | Cho | H04N 1/6058 358/1.9 |
| 2007/0188783 | A1* | 8/2007 | Hasegawa | H04N 1/6058 358/1.9 |
| 2008/0297818 | A1* | 12/2008 | Shimbaru | H04N 1/6058 358/1.9 |
| 2009/0092325 | A1* | 4/2009 | Brown Elliott | G09G 3/20 382/232 |
| 2009/0154798 | A1* | 6/2009 | Mizukura | H04N 1/6058 382/162 |
| 2009/0154803 | A1* | 6/2009 | Mizukura | H04N 1/6058 382/166 |
| 2009/0322780 | A1* | 12/2009 | Mizukura | H04N 1/6058 345/590 |
| 2014/0340434 | A1* | 11/2014 | El-Ghoroury | G09G 3/3607 345/690 |
| 2016/0005201 | A1* | 1/2016 | Kunkel | H04N 9/67 345/589 |
| 2017/0237962 | A1* | 8/2017 | Oh | H04N 7/015 348/474 |

FOREIGN PATENT DOCUMENTS

| | | | | |
|---|---|---|---|---|
| KR | 1020160031466 A | | 3/2016 | |
| WO | WO-2015008987 A1 | * | 1/2015 | ............ H04N 19/70 |
| WO | 2016006971 A1 | | 1/2016 | |
| WO | 2016031911 A1 | | 6/2017 | |

* cited by examiner

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|       case 0x01: | | |
|          SLT | var | Sec. 6.3 |
|          break; | | |
|       case 0x02: | | |
|          RRT | var | See Annex F |
|          break; | | |
|       case 0x03: | | |
|          System Time | var | Sec. 6.4 |
|          break; | | |
|       case 0x04: | | |
|          CAP | var | Sec. 6.5 |
|          break; | | |
|       default: | | |
|          reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | Use | Data Type |
|---|---|---|
| bundleDescription | | |
|   userServiceDescription | | |
|     @globalServiceID | 1 | anyURL |
|     @serviceID | 1 | unsignedShort |
|     @serviceStatus | 0..1 | boolean |
|     @fullMPDUri | 1 | anyURL |
|     @sTSIDUri | 1 | anyURL |
|     name | 0..N | string |
|       @lang | 1 | language |
|     serviceLanguage | 0..N | language |
|     capabilityCode | 0..1 | string |
|     deliveryMethod | 1..N | |
|       broadcastAppService | 1..N | |
|         basePattern | 1..N | string |
|       unicastAppService | 0..N | |
|         basePattern | 1..N | string | t4010

| Element or Attribute Name | Use | Data Type |
|---|---|---|
| S-TSID | | |
|   @serviceID | 1 | unsignedShort |
|   RS | 1..N | |
|     @bsid | 0..1 | unsignedShort |
|     @sIpAddr | 0..1 | string |
|     @dIpAddr | 0..1 | string |
|     @dport | 0..1 | unsignedShort |
|     @PLPID | 0..1 | unsignedByte |
|     LS | 1..N | |
|       @tsi | 1 | unsignedInt |
|       @PLPID | 0..1 | unsignedByte |
|       @bw | 0..1 | unsignedInt |
|       @startTime | 0..1 | dateTime |
|       @endTime | 0..1 | dateTime |
|       ScrFlow | 0..1 | scrFlowType |
|       RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
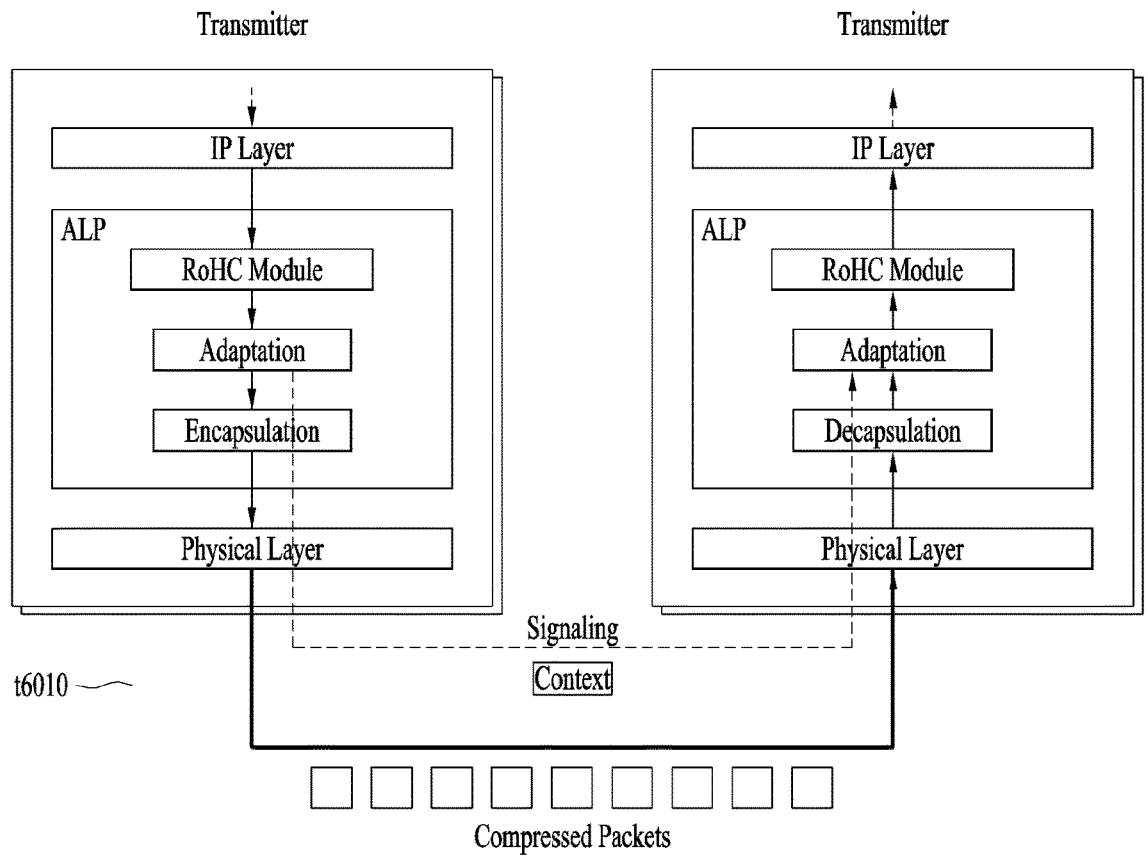
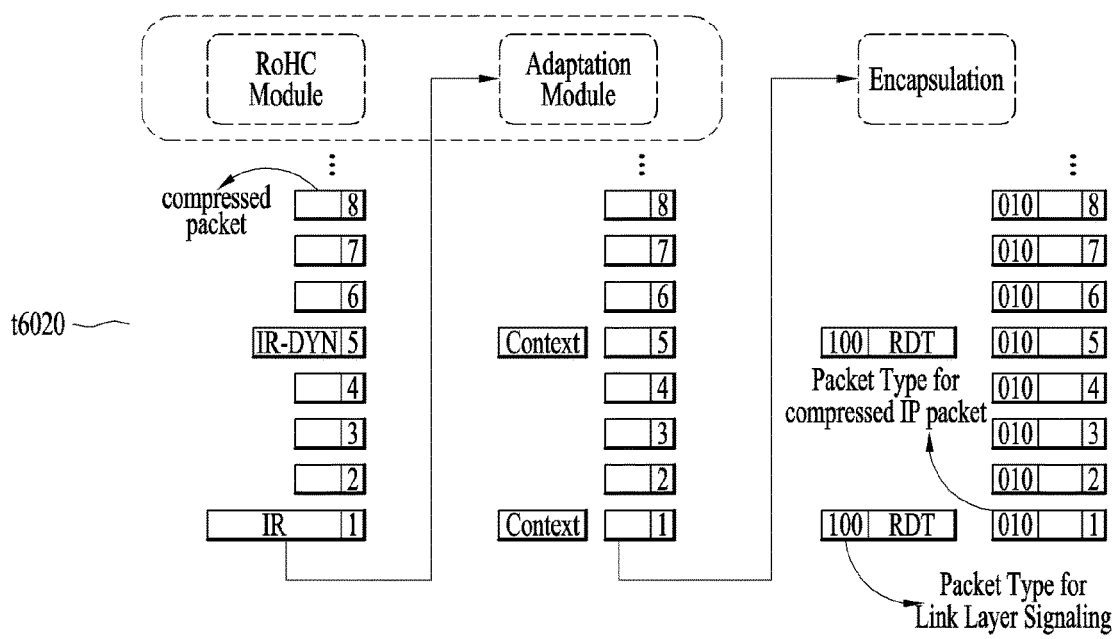

FIG. 7

| Syntax | Number of bits | Format |
|---|---|---|
| Link_Mapping_Table() { | | |
|   signaling_type | 8 | 0x01 |
|   PLP_ID | 6 | uimsbf |
|   reserved | 2 | "11" |
|   num_session | 8 | uimsbf |
|   for(i = 0 ; i < num_session ; i++) { | | |
|     src_IP_add | 32 | uimsbf |
|     dst_IP_add | 32 | uimsbf |
|     src_UDP_port | 16 | uimsbf |
|     dst_UDP_port | 16 | uimsbf |
|     SID_flag | 1 | bslbf |
|     compressed_flag | 1 | bslbf |
|     reserved | 6 | '111111' |
|     if (SID_flag == "1") { | | |
|       SID | 8 | uimsbf |
|     } | | |
|     if (compressed_flag == '1') { | | |
|       context_id | 8 | uimsbf |
|     } | | |
|   } | | |
| } | | |

FIG. 9

FIG. 23
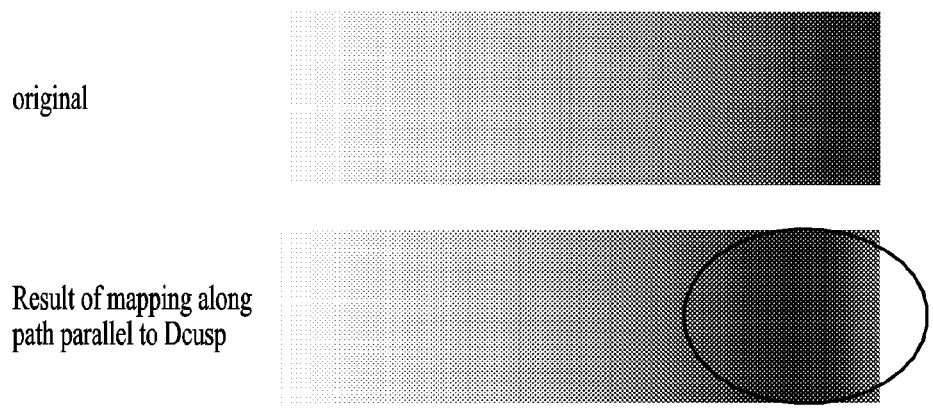
original
Result of mapping along
path parallel to Dcusp
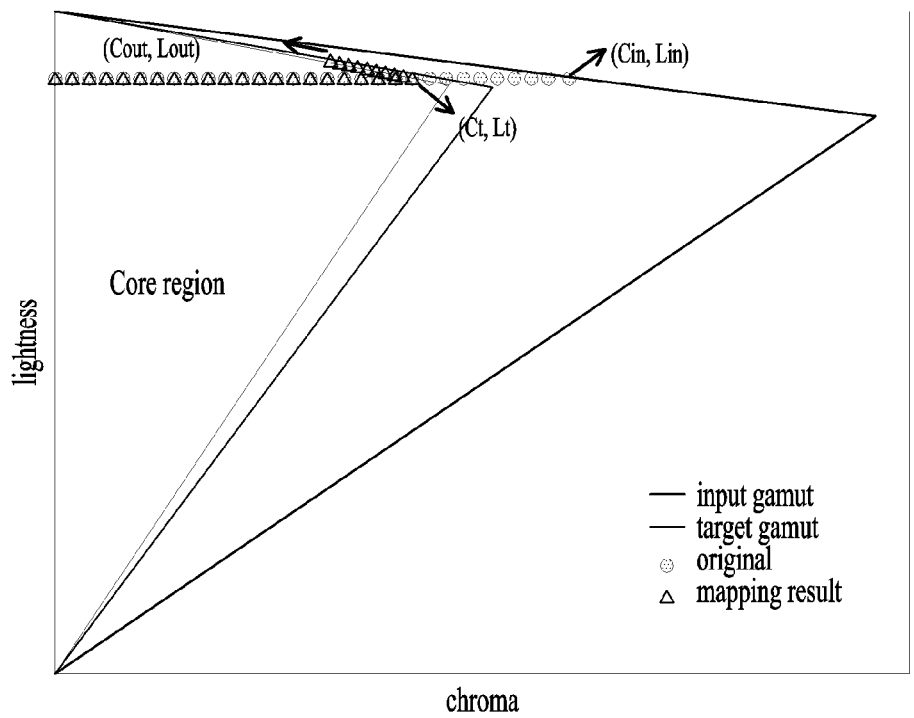

FIG. 24 original

Result of Color Volume Mapping

FIG. 25

| sei_payload( payloadType, payloadSize ) { | Category | Descriptor |
|---|---|---|
| if( nal_unit_type == PREFIX_SEI_NUT ) { | | |
| ... | | |
| if( payloadType == XXX ) | | |
| color_volume_mapping_info(payloadSize ) | 5 | |
| } } | | |

| Syntax | descriptor |
|---|---|
| color_volume_mapping_info (payloadSize) { | |
|   cvm_cancel_flag | u(1) |
|   if(! cvm_cancel_flag) { | |
|     cvm_persistence_flag | u(1) |
|     color_volume_mapping () | |
|   } } | | h25010

FIG. 26

| Syntax | No. of bits | Format |
|---|---|---|
| Color_Gamut_Volume_mapping_info (payloadSize) { | | |
|     original_color_gamut_type | 4 | uimsbf |
|     target_color_gamut_type | 4 | uimsbf |
|     if(original_color_gamut_type =='0110'){ | | |
|         RGBWL_primaries() | | |
|     } | | |
|     if(target_color_gamut_type =='0110'){ | | |
|         RGBWL_primaries() | | |
|     } | | |
|     reserved | 4 | uimsbf |
|     color_space_type | 4 | uimsbf |
|     color_space_conversion_flag | 1 | uimsbf |
|     color_gamut_boundary_info() | | |
|     hue_correction_type | 4 | uimsbf |
|     hue_correction_info() | | |
|     reserved | 3 | uimsbf |
|     if(color_space_conversion_flag =='1'){ | | |
|         color_space_conversion_function() | | |
|     } | | |
|     number_of_regions | 4 | uimsbf |
|     reserved | 4 | uimsbf |
|     for(i=0; i<number_of_regions; i++) { | | |
|         region_boundary_info() | | |
|         mapping_function_type | 4 | uimsbf |
|         reserved | 4 | uimsbf |
|         mapping_function_info () | | |
|     } | | |
| } | | |

FIG. 27

| Original_color_gamut_type | Description |
|---|---|
| 0000 | BT. 601 |
| 0001 | BT. 709 |
| 0010 | DCI-P3 |
| 0011 | BT. 2020 (NCL) |
| 0100 | BT. 2020 (CL) |
| 0101 | XYZ |
| 0110 | User defined |
| 0111~1111 | Reserved |

| Target_color_gamut_type | Description |
|---|---|
| 0000 | BT. 601 |
| 0001 | BT. 709 |
| 0010 | DCI-P3 |
| 0011 | BT. 2020 (NCL) |
| 0100 | BT. 2020 (CL) |
| 0101 | XYZ |
| 0110 | User defined |
| 0111~1111 | Reserved |

FIG. 28

| Color_space_type | Description |
|---|---|
| 0000 | CIE 1931 Yxy color space |
| 0001 | CIELAB color space |
| 0010 | CIELUV color space |
| 0011 | CIECAM02 Aab |
| 0100 | IPT |
| 0101 | CIE Yuv |
| 0110 ~ 1111 | Reserved |

FIG. 29

| Syntax | No. of bits | Format |
|---|---|---|
| RGBWL_primaries( ) { | | |
|     color_primary_r_x | 8 | uimsbf |
|     color_primary_r_y | 8 | uimsbf |
|     color_primary_g_x | 8 | uimsbf |
|     color_primary_g_y | 8 | uimsbf |
|     color_primary_b_x | 8 | uimsbf |
|     color_primary_b_y | 8 | uimsbf |
|     white_point_x | 8 | uimsbf |
|     white_point_y | 8 | uimsbf |
|     white_peak_luminance_Y | 8 | uimsbf |
| } | | |

FIG. 30

| Syntax | No. of bits | Format |
|---|---|---|
| Color_space_conversion_function( ) { | | |
|     reserved | 3 | uimsbf |
|     number_of_coeff | 5 | uimsbf |
|     for(i=0; i<number_of_coeff; i++){ | | |
|         color_space_conversion_coeff[i] | 8 | uimsbf |
|     } | | |
| } | | |

FIG. 31

| Syntax | No. of bits | Format |
|---|---|---|
| Color_gamut_boundary_info( ) { | | |
| color_gamut_boundary_type | | |
|     if(color_gamut_boundary_type == '0000'){ | | |
|       number_of_points | 4 | uimsbf |
|       reserved | 4 | uimsbf |
|       for(i=0; i<number_of_points; i++){ | | |
|         hue_index[i] | 8 | uimsbf |
|         chroma_index[i] | 8 | uimsbf |
|         lightness_index[i] | 8 | uimsbf |
|       } | | |
|     } | | |
| if(color_gamut_boundary_type == '0001'){ | | |
|       number_of_step_size | 4 | uimsbf |
|       for(j=0; i<number_of_step_size; j++){ | | |
|         number_of_points | 4 | uimsbf |
|         for(i=0; i<number_of_points; i++){ | | |
|           lightness_index[i][j] | 8 | uimsbf |
|           a_index[i][j] | 8 | uimsbf |
|           b_index[i][j] | 8 | uimsbf |
|         } | | |
|       } | | |
|     } | | |
|     if(color_gamut_boundary_type == '0010'){ | | |
|       LUT_type | 4 | uimsbf |
|       reserved | 4 | uimsbf |
|       LUT_info() | | |
|     } | | |

| Color_gamut_boundary_type | Description |
|---|---|
| 0000 | Linear interpolation |
| 0001 | Convex hull method |
| 0010 | LUT |
| 0011 | User define |
| 0100 ~ 1111 | Reserved |

FIG. 32

| Syntax | No. of bits | Format |
|---|---|---|
| hue_correction_info( ) { | | |
|     if(hue_correction_type == '0001'){ | | |
|         number_of_points | 4 | uimsbf |
|         reserved | 4 | uimsbf |
|         for(i=0; i<number_of_points; i++){ | | |
|             original_hue_index[i] | 8 | uimsbf |
|             target_hue_index[i] | 8 | uimsbf |
|         } | | |
|     } | | |
|     if(hue_correction_type == '0010'){ | | |
|         number_of_points | 4 | uimsbf |
|         reserved | 4 | uimsbf |
|         for(i=0; i<number_of_points; i++){ | | |
|             original_hue_index[i] | 8 | uimsbf |
|             target_hue_index[i] | 8 | uimsbf |
|         } | | |
|         for(i=0; i<number_of_points-1; i++){ | | |
|   hue_coeff[i] | 8 | uimsbf |
|         } | | |
|     } | | |
| if(hue_correction_type== '0011'){ | | |
|     LUT_type | 4 | uimsbf |
|     reserved | 4 | uimsbf |
|     LUT_info() | | |
|     } | | |
| } | | |

| hue_correction_type | Description |
|---|---|
| 0000 | reserved |
| 0001 | Linear interpolation |
| 0010 | nth order function |
| 0011 | 3D LUT |
| 0100 ~ 1111 | Reserved |

FIG. 33

| Syntax | No. of bits | Format |
|---|---|---|
| region_boundary_info( ) { | | |
|     region_boundary_type | 4 | |
|     reserved | 4 | |
|     if(region_boundary_type == '0001'){ | | |
|         chroma_index | 8 | uimsbf |
|         lightness_index | 8 | uimsbf |
|         alpha | | |
|     } | | |
| | | |
|     if(region_boundary_type == '0010') { | | |
|         intercept_upper | 8 | uimsbf |
|         intercept_bottom | 8 | uimsbf |
|         vertex_point_chroma | 8 | uimsbf |
|         alpha | 8 | uimsbf |
|     } | | |
| | | |
|     if(region_boundary_type == '0011') { | | |
|         number_of_points | 4 | uimsbf |
|         reserved | 4 | uimsbf |
|         for(i=0; i<number_of_points; i++) { | | |
|             x_index[i] | 8 | uimsbf |
|             y_index[i] | 8 | uimsbf |
|         } | | |
|     } | | |
| } | | |

| region_boundary_type | Description |
|---|---|
| 0000 | reserved |
| 0001 | Ratio of distance to Gamut boundary |
| 0010 | Region connecting inner point of inner gamut proportional to max chroma point and two input neutral points |
| 0011 | Any region coordinates |
| 0011 ~ 1111 | Reserved |

FIG. 34

| Syntax | No. of bits | Format |
|---|---|---|
| mapping_function_info( ) { | | |
|   if (mapping_function_type =='0x00') { | | |
|     gain | 8 | uimsbf |
|     offset | 8 | uimsbf |
|   } | | |
|   else if (mapping_function_type=='0x01') { | | |
|     gain | 8 | uimsbf |
|     offset | 8 | uimsbf |
|     coeff_n | 8 | uimsbf |
|   } | | |
|   else if (mapping_function_type=='0x02') { | | |
|     LUT_type | 4 | uimsbf |
|     reserved | 4 | uimsbf |
|     LUT_info() | | |
|   } | | |
| } | | |

| mapping_function_type | Description |
|---|---|
| 0x00 | Linear function |
| 0x01 | nth order function |
| 0x02 | Look-up table |
| 0x03 ~ 0xFF | Reserved |

Linear function: $out = gain \cdot in + offset$ $n^{th}$ order: $out = gain \cdot in^{coeff\_n} + offset$

FIG. 35

| Syntax | No. of bits | Format |
|---|---|---|
| LUT_info( ) { | | |
|     entry_length | 8 | uimsbf |
|     for (i=0; i<entry_length; i++) { | | |
|         in_value[i] | 8 | uimsbf |
|         out_value[i] | 8 | uimsbf |
|     } | | |

| LUT_type | Description |
|---|---|
| 0000 | 3D LUT |
| 0001 | 3D LUT (linear interpolation) |
| 0010~1111 | Reserved |

FIG. 36

| Syntax | descriptor |
|---|---|
| color_volume_mapping (payloadSize) { | |
|     source_color_gamut_type | u(4) |
|     if(source_color_gamut_type =='0110') | |
|         RGBWL_primaries() | |
|     target_color_gamut_type | u(4) |
|     if(target_color_gamut_type =='0110') | |
|         RGBWL_primaries() | |
|     mapping_color_space_type | u(4) |
|     forward_color_space_conversion_info_flag | u(1) |
|     if(forward_color_space_conversion_info_flag =='1') | |
|         color_space_conversion_function() | |
|     backward_color_space_conversion_info_flag | u(1) |
|     if(backward_color_space_conversion_info_flag =='1') | |
|         color_space_conversion_function() | |
|     source_gamut_boundary_info_flag | u(1) |
|     if(source_gamut_boundary_info_flag) | |
|         color_gamut_boundary_info() | |
|     target_gamut_boundary_info_flag | u(1) |
|     if(target_gamut_boundary_info_flag) | |
|         color_gamut_boundary_info() | |
|     hue_correction_info() | |
|     number_of_hue | u(4) |
|     for(i=0; i<number_of_hue; i++) { | |
|         hue_component [i] | u(4) |
|         number_of_hue_regions[i] | u(4) |
|         for(j=0; j<number_of_hue_regions[i]; j++) { | |
|             hue_region_type [i][j] | u(4) |
|             hue_region_info() | |
|             mapping_function_type [i][j] | u(4) |
|             mapping_function_info () | |
| } } }} | |

FIG. 37

| mapping_color_space_type | Description |
|---|---|
| 0000 | current color space |
| 0001 | CIE 1931 Yxy color space |
| 0010 | CIELAB color space |
| 0011 | CIELUV color space |
| 0100 | CIECAM02 Aab |
| 0101 | IPT |
| 0110 | CIE Yuv |
| 0111 ~ 1111 | Reserved |

FIG. 38

| Syntax | No. of bits | Format |
|---|---|---|
| RGBWL_primaries( ) { | | |
|     color_primary_r_x | 8 | uimsbf |
|     color_primary_r_y | 8 | uimsbf |
|     color_primary_g_x | 8 | uimsbf |
|     color_primary_g_y | 8 | uimsbf |
|     color_primary_b_x | 8 | uimsbf |
|     color_primary_b_y | 8 | uimsbf |
|     white_point_x | 8 | uimsbf |
|     white_point_y | 8 | uimsbf |
|     max_luminance_Y | 8 | uimsbf |
|     min_luminance_Y | 8 | uimsbf |
| } | | |

FIG. 39

| Syntax | No. of bits | Format |
|---|---|---|
| Color_space_conversion_function(mapping_color_space_type) { | | |
|     number_of_coeff | 8 | uimsbf |
|     for(i=0; i<number_of_coeff; i++){ | | |
|         color_space_conversion_coeff[i] | 8 | uimsbf |
|     } | | |
| } | | |

FIG. 40

| Syntax | No. of bits | Format |
|---|---|---|
| color_gamut_boundary_info( ) { | | |
|     gamut_boundary_info_type | 4 | uimsbf |
|     if(gamut_boundary_info_type == '0000'){ | | |
|         number_of_points | 4 | uimsbf |
|         for(i=0; i<number_of_points; i++){ | | |
|             x_index[i] | 8 | uimsbf |
|             y_index[i] | 8 | uimsbf |
|             z_index[i] | 8 | uimsbf |
|     } } | | |
|     else if(gamut_boundary_info_type == '0001'){ | | |
|         number_of_step_size | 4 | uimsbf |
|         for(i=0; i<number_of_step_size; i++){ | | |
|             number_of_points[i] | 4 | uimsbf |
|             x_index[i] | 8 | uimsbf |
|             for(j=0; j<number_of_points; j++){ | | |
|                 y_index[i][j] | 8 | uimsbf |
|                 z_index[i][j] | 8 | uimsbf |
|     } } } | | |
|     else if(gamut_boundary_info_type== '0010'){ | | |
|         LUT_type | 4 | uimsbf |
|         LUT_info() | | |
| } } | | |

| gamut_boundary_info_type | Description |
|---|---|
| 0000 | approach 1 |
| 0001 | approach 2 |
| 0010 | LUT |
| 0011-1111 | reserved |

FIG. 41

| Syntax | No. of bits | Format |
|---|---|---|
| hue_correction_info( ) { | | |
|     hue_correction_type | 4 | Uimsbf |
|     number_of_points | 4 | uimsbf |
|     if(hue_correction_type == '0000'){ | | |
|         for(i=0; i<number_of_points; i++){ | | |
|             original_hue_index[i] | 8 | uimsbf |
|             target_hue_index[i] | 8 | uimsbf |
|     } } | | |
| | | |
|     if(hue_correction_type == '0010'){ | 4 | Uimsbf |
|         for(i=0; i<number_of_points-1; i++){ | | |
|             function_type[i] | 4 | uimsbf |
|             for(j=0; j<number_of_coefficients; j++) | | |
|                 coeff[i][j] | 8 | uimsbf |
|     } } | | |
|     else if(hue_correction_type== '0011'){ | | |
|         LUT_type | 4 | uimsbf |
|         LUT_info() | | |
|     } | | |
| } | | |

| hue_correction_type | Description |
|---|---|
| 0000 | type 1 (e.g. linear interpolation) |
| 0001 | type 2 |
| 0010 | type 3 (e.g. any equation) |
| 0011 | LUT |
| 0100 ~ 1111 | Reserved |

FIG. 42

| Syntax | No. of bits | Format |
|---|---|---|
| hue_region_info( ) { | | |
|     if(hue_region_type == '0000'){ | | |
|         chroma_index | 8 | uimsbf |
|         lightness_index | 8 | uimsbf |
|         alpha | 8 | uimsbf |
|     } | | |
|     if(hue_region_type == '0001') { | | |
|         intercept_upper | 8 | uimsbf |
|         intercept_bottom | 8 | uimsbf |
|         vertex_point_chroma | 8 | uimsbf |
|         alpha | 8 | uimsbf |
|     } | | |
|     if(hue_region_type == '0010') { | | |
|         number_of_points | 4 | uimsbf |
|         reserved | 4 | uimsbf |
|         for(i=0; i<number_of_points; i++) { | | |
|             x_index[i] | 8 | uimsbf |
|             y_index[i] | 8 | uimsbf |
|         } | | |
|     } | | |
| } | | |

| hue_region_type | Description |
|---|---|
| 0000 | Ratio of distance to Gamut boundary |
| 0001 | Region connecting inner point of inner gamut proportional to max chroma point and two input neutral points |
| 0010 | Any region coordinates |
| 0011 | Distinguishment according to order of hue regions |
| 0100 | Distinguishment according to characteristics of hue regions |
| 0101 ~ 1111 | Reserved |

FIG. 43

| Syntax | No. of bits | Format |
|---|---|---|
| mapping_function_info( ) { | | |
|   if (mapping_function_type[i][j] =='0x00') { | | |
|     gain | 8 | uimsbf |
|     offset | 8 | uimsbf |
|   } | | |
|   else if (mapping_function_type[i][j]=='0x01') { | | |
|     gain | 8 | uimsbf |
|     offset | 8 | uimsbf |
|     coeff_n | 8 | uimsbf |
|   } | | |
|   else if (mapping_function_type[i][j]=='0x02') { | | |
|     LUT_type | 4 | uimsbf |
|     LUT_info() | | |
|   } | | |
|   else if (mapping_function_type == 0x03) { | | |
|     mapping_target_point_x | 8 | uimsbf |
|     mapping_target_point_y | 8 | uimsbf |
| } } | | |

| mapping_function_type | Description |
|---|---|
| 0x0 | Linear function |
| 0x1 | nth order function |
| 0x2 | Look-up table |
| 0x3 | Linear mapping toward target point |
| 0x4 | Not processed (core region) |
| 0x5 ~ 0xF | Reserved |

Linear function:    $out = gain \cdot in + offset$ $n^{th}$ order:    $out = gain \cdot in^{coeff\_n} + offset$

BROADCAST SIGNAL TRANSMISSION METHOD, BROADCAST SIGNAL RECEPTION METHOD, BROADCAST SIGNAL TRANSMISSION APPARATUS, AND BROADCAST SIGNAL RECEPTION APPARATUS

This application is a National Stage Application of International Application No. PCT/KR2017/006942, filed on Jun. 30, 2017, which claims the benefit of U.S. Provisional Application No. 62/357,388, filed on Jul. 1, 2016, U.S. Provisional Application No. 62/385,237, filed on Sep. 8, 2016 and U.S. Provisional Application No. 62/417,356, filed on Nov. 4, 2016, all of which are hereby incorporated by reference in their entirety for all purposes as if fully set forth herein.

TECHNICAL FIELD

The present invention relates to a method and apparatus for transmitting/receiving a broadcast signal, and more particularly, to a method and apparatus for transmitting and receiving a broadcast signal including gamut-adjustable content.

BACKGROUND ART

Various techniques for transmitting and receiving digital broadcast signals have been developed as analog broadcast signal transmission came to an end. The digital broadcast signal is capable of carrying a larger amount of video/audio data than the analog broadcast signal and is capable of containing not only the video/audio data but also various types of additional data.

Recently, ultra high definition television (UHDTV) standards have been completed and high dynamic range (HDR) standards have been actively developed. As the range of representable lightness is widened, the range in which the colors can be represented is also being widened. Thus, for UHDTV, BT.2020, which is a gamut wider than BT.709, which is a gamut of conventional HDTV, is defined. HDR is also expected to maintain the same gamut as UHDTV. In accordance with this trend, content adapted to the BT.2020 gamut is beginning to spread. However, the conventional HDTV has a narrow gamut compared to the content produced based on a wide color gamut. Accordingly, there is a need for a technique for mapping content having a wide gamut to a narrow gamut of a legacy display to reproduce the produced video in accordance with the intention of the production.

If color gamut mapping is performed without considering the ratio of peak luminances of primary colors and white color at the time of content production, the luminance of the primary colors may be changed along with change of the gamut even at the same peak luminance of white. Accordingly, there is a need for a color volume mapping technique for mapping a gamut in consideration of lightness information in color gamut mapping. In particular, a wider color gamut (WCG) is required to realize the high dynamic range (HDR), and a wider dynamic range is also required. Since the representable dynamic range differs among production companies, two-dimensional gamut mapping has a limitation in representing content as intended by a producer.

As described above, there is a demand for a technique for mapping and reproducing WCG-based image information to a narrow gamut. Furthermore, in mapping the WCG-based image information to a narrow gamut, there is a need for a technique for eliminating distortion of colors caused by distortion of lightness by reflecting and compensating for lightness information. In particular, for the HDR, processing of lightness information is important. That is, the tone mapping technique is as important as the gamut mapping technique. If the lightness information is not taken into account in gamut mapping, it is difficult to represent colors as intended. In addition, for the HDR, since a wide gamut is given, variation of colors with respect to lightness is also wide, not only the range of the chroma components but also the range of lightness information that each chroma component can represent has been widened. Accordingly, when color information for the pixels constituting WCG content is to be represented on a display having a relatively narrow gamut, it is difficult to represent the original colors of the content by two-dimensionally mapping only the chroma components except for the lightness components. This is because the narrow gamut has a narrow lightness range. For example, when the chroma of the red color is 0.4, the lightness of BT.2020, which is a WCG, is approximately in the range of [0.3, 0.75], while the lightness of BT.709, which is a relatively narrow color gamut, is approximately in the range of [0.4, 0.62]. That is, in performing color gamut mapping, not only the chroma component but also the lightness component needs to be taken into consideration to represent the original colors of the content. In order to address this issue, gamut mapping and tone mapping may be separated and consecutively processed, and also may be processed in a three-dimensional space where lightness, chroma, and hue can be represented. When the hue information and lightness information are simultaneously mapped to a narrow gamut in a color space such as YCbCr and HSV, a simple conversion equation may be used for mapping. However, use of the simple conversion equation may deteriorate uniformity of gamut mapping.

DISCLOSURE

Technical Problem

A method for mapping a color gamut volume of a wide color gamut is disclosed.

Disclosed herein are considerations and a signal processing method for properly reproducing, on a legacy display (e.g., BT.709), video produced as content having a wide gamut range (e.g., BT.2020).

An object of the present invention is to provide a method for obtaining optimum image colors. In order to achieve the object, disclosed herein is a processing method for mapping out-of-gamut hue to a gamut in mapping a wide gamut range to a narrow gamut range. However, the present invention is not limited to the method of converting images of a wide gamut range into a narrow gamut range. That is, the gamut conversion disclosed herein includes matching images of a wide gamut range to a narrow gamut range and matching images of a narrow gamut range to a wide gamut range.

An object of the present invention is to represent content produced in a wide color gamut through a narrow gamut while maintaining the contrast and chroma detail of the original content as intended at the time of the production.

Technical Solution

In an aspect of the present invention, provided herein is a method of processing the out-of-gamut effect that may occur in color gamut volume mapping. Here, the out-of-gamut effect may refer to a color signal that is outside the display color gamut and undergoes color distortion as the signal cannot be accurately represented on the display.

The method of processing the out-of-gamut effect may prevent chroma inversion by mapping the highest chroma value that each color can have in the input gamut and the highest chroma value that each color can have in the output gamut.

The method of processing the out-of-gamut effect includes setting an anchor point, dividing regions of each gamut based on the set anchor point, and performing independent remapping on each of the regions. Thereby, the method may maintain a balanced state of the lightness information and the chroma information of the original content even on the output display. The method of processing the out-of-gamut effect may improve the image quality by maintaining the contrast and colors of the original content.

The method of processing the out-of-gamut effect may include setting a part of a target gamut to be same as a part of an original gamut. Thereby, a region maintaining the original color information as much as possible may be set.

In order to achieve the above object, disclosed herein is a method of using three-dimensional color volume mapping instead of using two-dimensional color mapping when the color gamut of the original content differs from the gamut of the display.

In the three-dimensional color volume mapping, lightness information needs to be mapped by separating the lightness information and the hue information in a three-dimensional space. Further, in order to maintain the colors of the original content, it is necessary to adjust the lightness information and the hue information while maintaining balance.

The present specification discloses technical solutions for balanced adjustment of lightness information and color information in color volume mapping, and the solutions are briefly disclosed below.

When the gamut of the original content differs from the gamut of the display in hue angle, the gamut of the display is mapped based on the hue angle of the gamut of the original content.

A portion having the highest chroma saturation for each color in the gamut of the original content is set to have the highest saturation in the gamut of the display. With this setting, saturation inversion may be prevented in color gamut mapping.

In order to balance the lightness information and the chroma, regions are divided and the color processing or gamut mapping is performed differently for each divided region. Thereby, the contrast of the original content may be maintained and color distortion causing deterioration of image quality may be prevented.

In addition, a predetermined region (invariant area) that is not subjected to conversion is set in the gamut of a target display. The invariant area may be varied depending on the setting value of a size of the target display. By setting the invariant area, the colors of the original content may be maintained as much as possible.

Advantageous Effects

According to an embodiment of the present invention, a portion having the highest saturation for each color in the gamut of the content is set to have the highest saturation in a display gamut or a target gamut. Thereby, chroma inversion may be prevented from occurring in color gamut mapping. In addition, by preventing the chroma inversion, color details intended at the time of production may be reproduced.

According to another embodiment of the present invention, regions are divided to balance lightness information and chroma, and color processing or gamut mapping is performed differently for each divided region. Thereby, the contrast of original content may be maintained. Further, the contrast may be enhanced. In addition, by mapping out-of-gamut color information into the display gamut or target gamut, portions where clipping occurs may be minimized Therefore, color distortion causing deterioration of image quality may be prevented.

According to yet another embodiment of the present invention, the colors of original content may be maintained as much as possible by setting a predetermined region (invariant area) that is not subjected to conversion in the gamut of a target display. In addition, the lightness information and low chroma color information about a middle range may be implemented with the same or similar color information as the original content.

DESCRIPTION OF DRAWINGS

FIG. 3 shows a low level signaling (LLS) table and a service list table (SLT) according to an embodiment of the present invention.

FIG. 4 is a diagram illustrating a USBD and an S-TSID transferred through ROUTE according to an embodiment of the present invention.

FIG. 5 is a diagram illustrating a USBD transferred to an MMT according to an embodiment of the present invention.

FIG. 6 is a diagram illustrating a link layer operation according to an embodiment of the present invention.

FIG. 7 shows a link mapping table (LMT) according to an embodiment of the present invention.

FIG. 9 illustrates a writing operation of a time interleaver according to an embodiment of the present invention.

FIGS. 23 and 24 are reference views illustrating the advantages of a color volume mapping method according to another embodiment of the present invention.

FIG. 25 is a view showing an SEI message according to an embodiment of the present invention.

FIG. 26 is a view showing a color volume mapping descriptor according to an embodiment of the present invention.

FIG. 27 is a view showing original_color_gamut_type and target_color_gamut_type according to an embodiment of the present invention.

FIG. 28 is a view showing color_space_type according to an embodiment of the present invention.

FIG. 29 is a view showing syntax of RGBWL_primaries ( ) according to an embodiment of the present invention.

FIG. 30 is a view showing syntax of color_space_conversion_function( ) according to an embodiment of the present invention.

FIG. 31 is a view showing syntax of color_gamut_boundary_info( ) and color_gamut_boundary_type according to an embodiment of the present invention.

FIG. 32 is a view showing syntax of hue_correction_info ( ) and hue_correction_type according to an embodiment of the present invention.

FIG. 33 is a view showing syntax of region_boundary_info( ) and region_boundary_type according to an embodiment of the present invention.

FIG. 34 is a view showing syntax of mapping_function_info( ) and mapping_function_type according to an embodiment of the present invention.

FIG. 35 is a view showing syntax of LUT_info( ) and LUT_type according to an embodiment of the present invention.

FIG. 36 is a view showing a color volume mapping descriptor according to another embodiment of the present invention.

FIG. 37 is a view showing mapping_color_space_type according to another embodiment of the present invention.

FIG. 38 is a view showing the syntax of RGBWL_primaries( ) according to another embodiment of the present invention.

FIG. 39 is a view showing syntax of color_space_conversion_function( ) according to another embodiment of the present invention.

FIG. 40 is a view showing syntax of color_gamut_boundary_info( ) and gamut_boundary_info_type according to another embodiment of the present invention.

FIG. 41 is a view showing syntax of hue_correction_info ( ) and hue_correction_type according to another embodiment of the present invention.

FIG. 42 is a view showing syntax of hue_region_info( ) and hue_region_type according to another embodiment of the present invention.

FIG. 43 is a view showing syntax of mapping_function_info( ) and mapping_function_type according to another embodiment of the present invention.

BEST MODE

Exemplary embodiments of the present invention will be described in detail with reference to the accompanying drawings. The following detailed description with reference to the accompanying drawings is intended to illustrate preferred embodiments of the invention rather than merely illustrating embodiments that can be implemented according to the present invention. The following detailed description includes details in order to provide a thorough understanding of the present invention. It will be apparent, however, to those skilled in the art that the present invention can be practiced without these details.

Most of the terms used in the present invention are selected from the general ones that are widely used in the field, but some terms are arbitrarily selected by the applicant and the meaning thereof will be described in detail in the following description as necessary. Accordingly, the terms used herein should be construed based on the intended meanings thereof, rather than being simply construed based on names of the terms.

The present invention provides an apparatus and method for transmitting and receiving broadcast signals for a next generation broadcast service. The next generation broadcast service according to an embodiment of the present invention includes a terrestrial broadcast service, a mobile broadcast service, and a UHDTV service. The present invention may process the broadcast signal for the next generation broadcast service through a non-multiple input multiple output (non-MIMO) or MIMO scheme according to one embodiment. The non-MIMO scheme according to one embodiment of the present invention may include a multiple input single output (MISO) scheme and a single input single output (SISO) scheme. The present invention proposes an optimized physical profile (or system) to achieve performance required for a particular application while minimizing receiver complexity.

Figure 1:
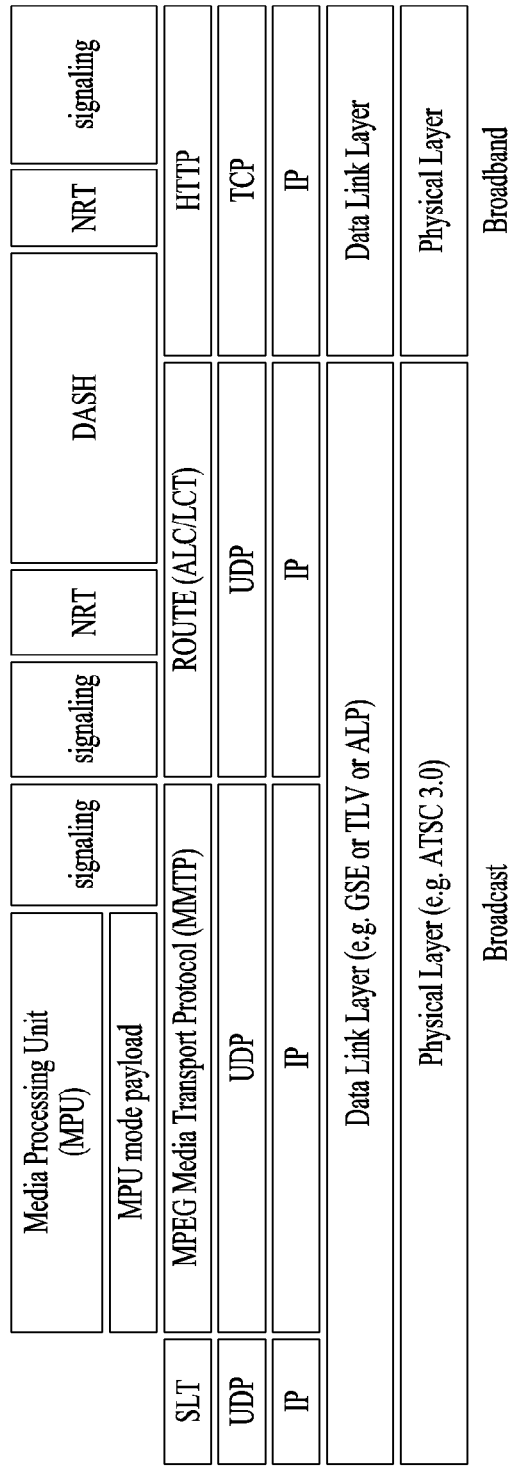
FIG. 1 is a diagram illustrating a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
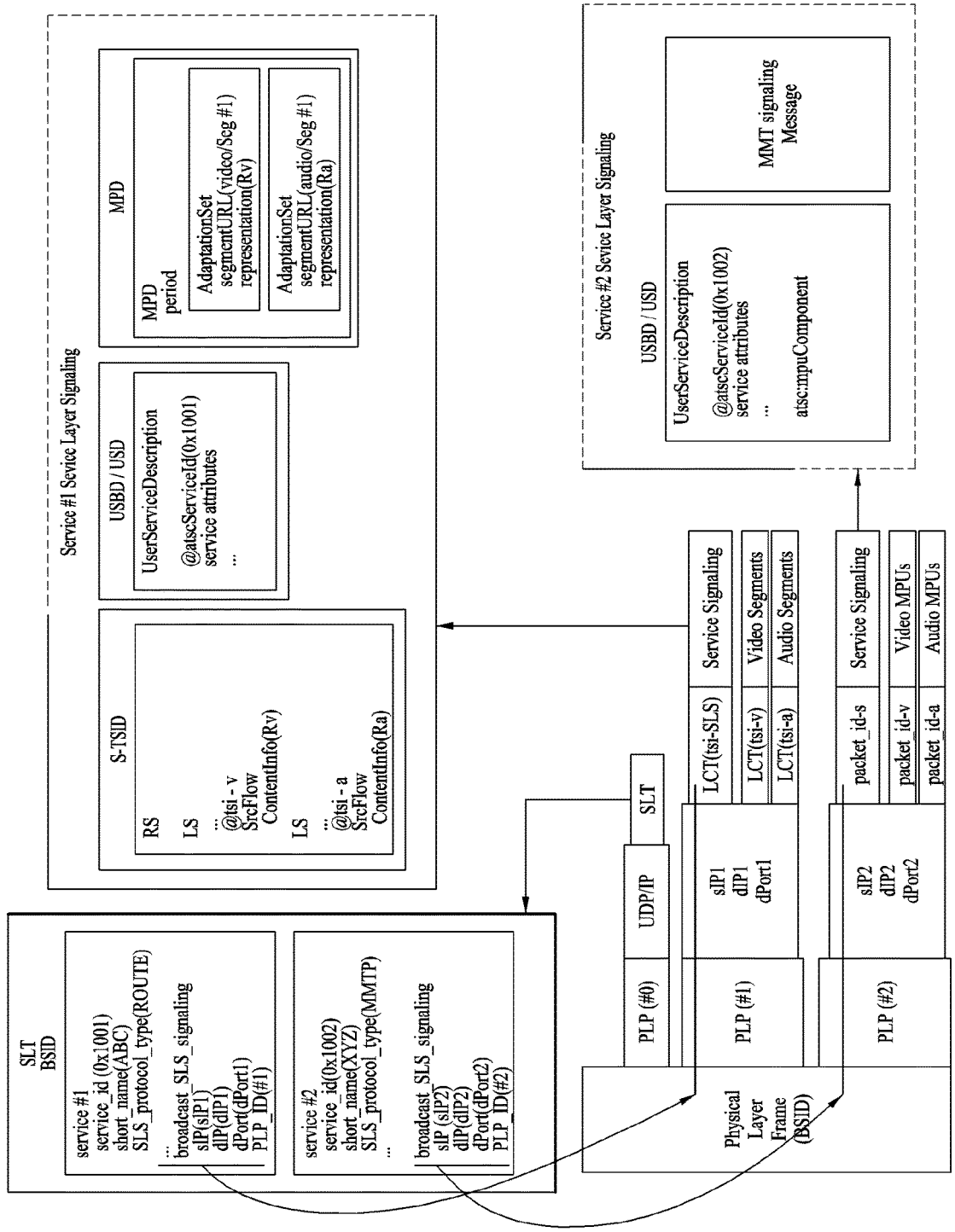
FIG. 2 is a diagram illustrating a service discovery procedure according to an embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id_field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @ svcCapabilities attribute, a BroadcastSvcSignaling element and/or an svcInetUrl element.

The @serviceId attribute is the identifier of the service and the @ sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @ svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @ slsProtocol attribute, an @ slsMajorProtocolVersion attribute, an @slsMinorProtocolVersion attribute, an @ slsPlpId attribute, an @slsDestinationIpAddress attribute, an @ slsDestinationUdpPort attribute and/or an @ slsSourceIpAddress attribute.

The @ slsProtocol attribute may indicate the protocol used to deliver the SLS of the service (ROUTE, MMT, etc.). The @slsMajorProtocolVersion attribute and the @ slsMinorProtocolVersion attribute may indicate the major version number and minor version number of the protocol used to deliver the SLS of the service, respectively.

The @ slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @ slsDestinationIpAddress attribute, the @ slsDestinationUdpPort attribute and the @ slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@ globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @ startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @ mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @ serviceIcon attribute and/or a ServiceDescription element. The @ serviceGenre attribute may indicate the genre of the service and the @ serviceIcon attribute may include the URL information of the representative icon of the service. The ServiceDescription element may provide the service description of the service and this element may further include an @ serviceDescrText attribute and/or an @ serviceDescrLang attribute. These attributes may indicate the text of the service description and the language used in the text.

The above-described routeComponent element may further include an @sTSIDUri attribute, an @ sTSIDDestinationIpAddress attribute, an @ sTSIDDestinationUdpPort attribute, an @ sTSIDSourceIpAddress attribute, an @sTSIDMajorProtocolVersion attribute and/or an @sTSIDMinorProtocolVersion attribute.

The @ sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @ sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaptation procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acqruing the signaling information, the receiver may combine the information to acquire mapping of service—IP information—context information—PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L1 detail signaling information of a physical layer. The LLS flag may be a flag field indicating whether the LLS is transmitted through a corresponding PLP with respect to each PLP. Here, the L1 detail signaling information may be correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted together using a PLP loop.

The signaling_type field may indicate the type of signaling information delivered by the table. The value of signaling_type field for the LMT may be set to 0x01. The signaling_type field may signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context id field.

The src_IP_add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
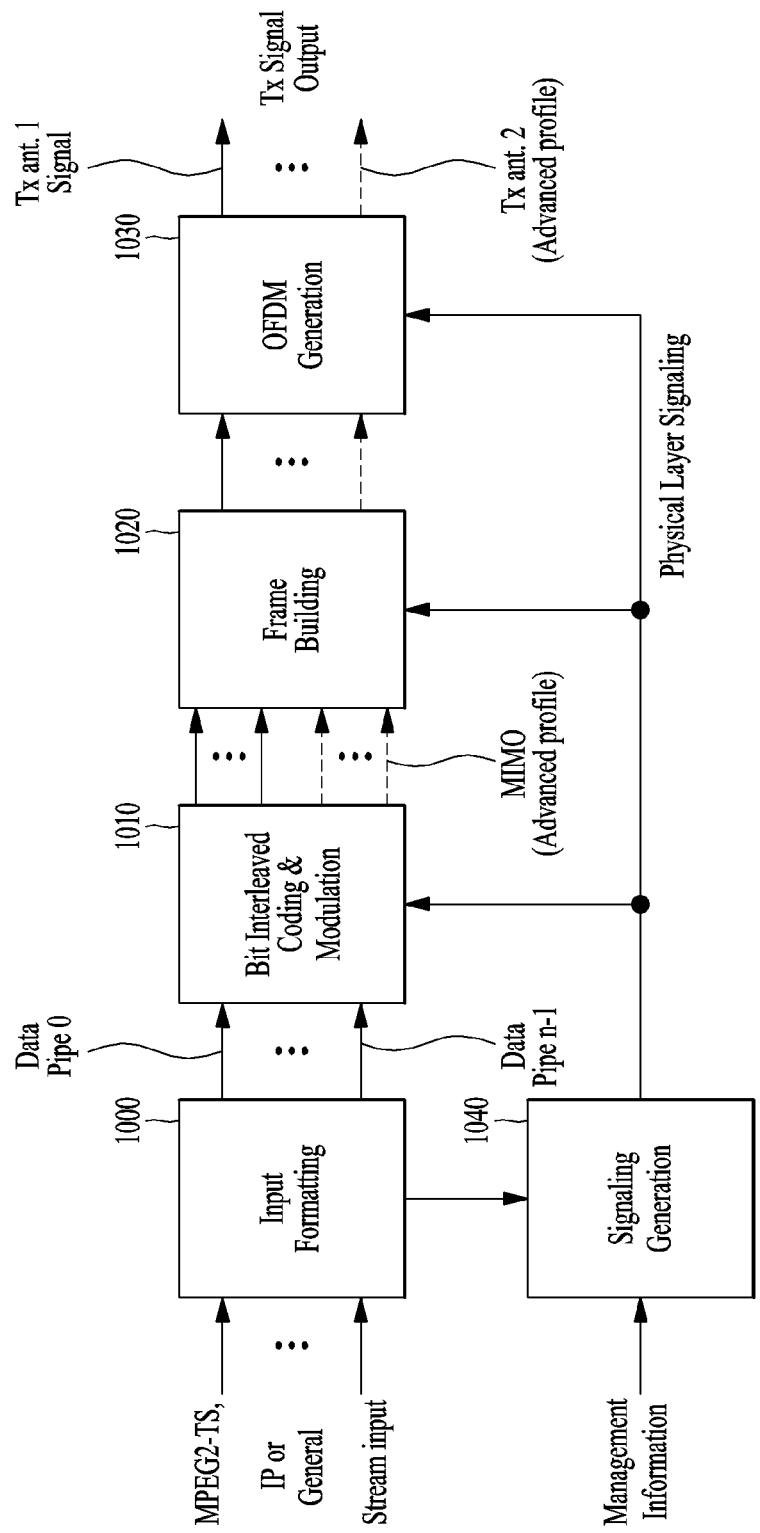
FIG. 8 shows a structure of a broadcast signal transmission apparatus for a next generation broadcast service according to an embodiment of the present invention.

FIG. 8 is a diagram showing a structure of a broadcast signal transmission device of a next-generation broadcast service according to an embodiment of the present invention.

The broadcast signal transmission device of the next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present invention, input data may use IP stream/packet and MPEG2-TS as main input format and other stream types may be handled as a general stream.

The input format block 1000 may demultiplex each input stream using one or more data pipes to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

Since QoS is dependent upon the characteristics of a service provided by the broadcast signal transmission device of the next-generation broadcast service according to an embodiment of the present invention, data corresponding to each service needs to be processed via different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied is different from the processing block of the BICM to which MIMO is not applied in that a cell word demultiplexer and an MIMO encoding block are further included.

The data FEC encoder may perform FEC encoding on an input BBF to generate a FECBLOCK procedure using external coding (BCH) and internal coding (LDPC). The external coding (BCH) may be a selective coding method. The bit interleaver may interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point. NUQ has an arbitrary type but QAM-16 and NUQ have a square shape. All of the NUQ and the NUC may be particularly defined with respect to each code rate and signaled by parameter DP_MOD of PLS2 data. The time interleaver may be operated at a data pipe level. A parameter of the time interleaving may be differently set with respect to each data pipe.

The time interleaver according to the present invention may be positioned between the BICM chain and the frame builder. In this case, the time interlever according to the present invention may selectively use a convolution interleaver (CI) and a block interleaver (BI) according to a physical layer pipe (PLP) mode or may use all. The PLP according to an embodiment of the present invention may be a physical path used using the same concept as the aforementioned DP and its term may be changed according to designer intention. The PLP mode according to an embodiment of the present invention may include a single PLP mode or a multiple PLP mode according to the number of PLPs processed by the broadcast signal transmitter or the broadcast signal transmission device. Time interleaving using different time interleaving methods according to a PLP mode may be referred to as hybrid time interleaving.

A hybrid time interleaver may include a block interleaver (BI) and a convolution interleaver (CI). In the case of PLP_NUM=1, the BI may not be applied (BI off) and only the CI may be applied. In the case of PLP_NUM>1, both the BI and the CI may be applied (BI on). The structure and operation of the CI applied in the case of PLP_NUM>1 may be different from those of the CI applied in the case of PLP_NUM=1. The hybrid time interleaver may perform an operation corresponding to a reverse operation of the aforementioned hybrid time interleaver.

The cell word demultiplexer may be used to divide a single cell word stream into a dual cell word stream for MIMO processing. The MIMO encoding block may process output of the cell word demultiplexer using a MIMO encoding method. The MIMO encoding method according to the present invention may be defined as full-rate spatial multiplexing (FR-SM) for providing increase in capacity via relatively low increase in complexity at a receiver side. MIMO processing may be applied at a data pipe level. When a pair of constellation mapper outputs, NUQ $e_{1,i}$ and $e_{2,i}$ is input to a MIMO encoder, a pair of MIMO encoder outputs, $g_{1,i}$ and $g_{2,i}$ may be transmitted by the same carrier k and OFDM symbol l of each transmission antenna.

The frame building block 1020 may map a data cell of an input data pipe in one frame to an OFDM symbol and perform frequency interleaving for frequency domain diversity.

According to an embodiment of the present invention, a frame may be divided into a preamble, one or more frame signaling symbols (FSS), and a normal data symbol. The preamble may be a special symbol for providing a combination of basic transmission parameters for effective transmission and reception of a signal. The preamble may signal a basic transmission parameter and a transmission type of a frame. In particular, the preamble may indicate whether an emergency alert service (EAS) is currently provided in a current frame. The objective of the FSS may be to transmit PLS data. For rapid synchronization and channel estimation and rapid decoding of PLS data, the FSS may have a pipe pattern with higher density than a normal data symbol.

The frame building block may include a delay compensation block for adjusting timing between a data pipe and corresponding PLS data to ensure co-time between a data pipe and corresponding PLS data at a transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave a data cell received from the cell mapper to provide frequency diversity. The frequency interleaver may operate with respect to data corresponding to an OFDM symbol pair including two sequential OFDM symbols or data corresponding to one OFDM symbol using different interleaving seed orders in order to acquire maximum interleaving gain in a single frame.

The OFDM generation block 1030 may modulate an OFDM carrier by the cell generated by the frame building block, insert a pilot, and generate a time domain signal for transmission. The corresponding block may sequentially insert guard intervals and may apply PAPR reduction processing to generate a last RF signal.

The signaling generation block 1040 may generate physical layer signaling information used in an operation of each functional block. The signaling information according to an embodiment of the present invention may include PLS data. The PLS may provide an element for connecting a receiver to a physical layer data pipe. The PLS data may include PLS1 data and PLS2 data.

The PLS1 data may be a first combination of PLS data transmitted to FSS in a frame with fixed size, coding, and modulation for transmitting basic information on a system as well as a parameter required to data PLS2 data. The PLS1 data may provide a basic transmission parameter including a parameter required to receive and decode PLS2 data. The PLS2 data may be a second combination of PLP data transmitted to FSS for transmitting more detailed PLS data of a data pipe and a system. PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic data may be PLS2 data that is dynamically changed every frame.

The PLS2 data may include FIC_FLAG information. A fast information channel (FTC) may be a dedicated channel for transmitting cross-layer information for enabling fast service acquisition and channel scanning. The FIC_FLAG information may indicate whether a fast information channel (FIC) is used in a current frame group via a 1-bit field. When a value of the corresponding field is set to 1, the FTC may be provided in the current frame. When a value of the corresponding field is set to 0, the FTC may not be transmitted in the current frame. The BICM block 1010 may include a BICM block for protecting PLS data. The BICM block for protecting the PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS 1 and 2 data using a BCH code shortened for PLS protection and inserting a zero bit after BCH encoding, a LDPC encoding block for performing encoding using an LDPC code, and an LDPC parity puncturing block. Only the PLS1 data may be permutated before an output bit of zero insertion is LDPC-encoded. The bit interleaver may interleave each of the shortened and punctured PLS1 data and PLS2 data, and the constellation mapper may map the bit-interleaved PLS1 data and PLS2 data to constellation.

A broadcast signal reception device of a next-generation broadcast service according to an embodiment of the present invention may perform a reverse operation of the broadcast signal transmission device of the next-generation broadcast service that has been described with reference to FIG. 8.

The broadcast signal reception device of a next-generation broadcast service according to an embodiment of the present invention may include a synchronization & demodulation module for performing demodulation corresponding to a reverse operation performed by the broadcast signal transmission device, a frame parsing module for parsing an input signal frame to extract data transmitted by a service selected by a user, a demapping & decoding module for converting an input signal into bit region data, deinterleaving bit region data as necessary, performing demapping on mapping applied for transmission efficiency, and correcting error that occurs in a transmission channel for decoding, an output processor for performing a reverse operation of various compression/signal processing procedures applied by the broadcast signal transmission device, and a signaling decoding module for acquiring and processing PLS information from the signal demodulated by the synchronization & demodulation module. The frame parsing module, the demapping & decoding module, and the output processor may perform the functions using the PLS data output from the signaling decoding module.

Hereinafter, the timer interleaver will be described. A time interleaving group according to an embodiment of the present invention may be directly mapped to one frame or may be spread over $P_I$ frames. In addition, each time interleaving group may be divided into one or more ($N_{TI}$) time interleaving blocks. Here, each time interleaving block may correspond to one use of a time interleaver memory. A time interleaving block in the time interleaving group may include different numbers of XFECBLOCK. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of the time interleaving memory, write a second XFECBLOCK in a next column, and write the remaining XFECBLOCKs in the time interleaving block in the same manner. In an interleaving array, a cell may be read in a diagonal direction to a last row from a first row (a leftmost column as a start column is read along a row in a right direction). In this case, to achieve single memory deinterleaving at a receiver side irrespective of the number of XFECBLOCK in the time interleaving block, the interleaving array for the twisted row-column block interleaver may insert a virtual XFECBLOCK into the time interleaving memory. In this case, to achieve single memory deinterleaving at a receiver side, the virtual XFECBLOCK needs to be inserted into another frontmost XFECBLOCK.

Figure 9:
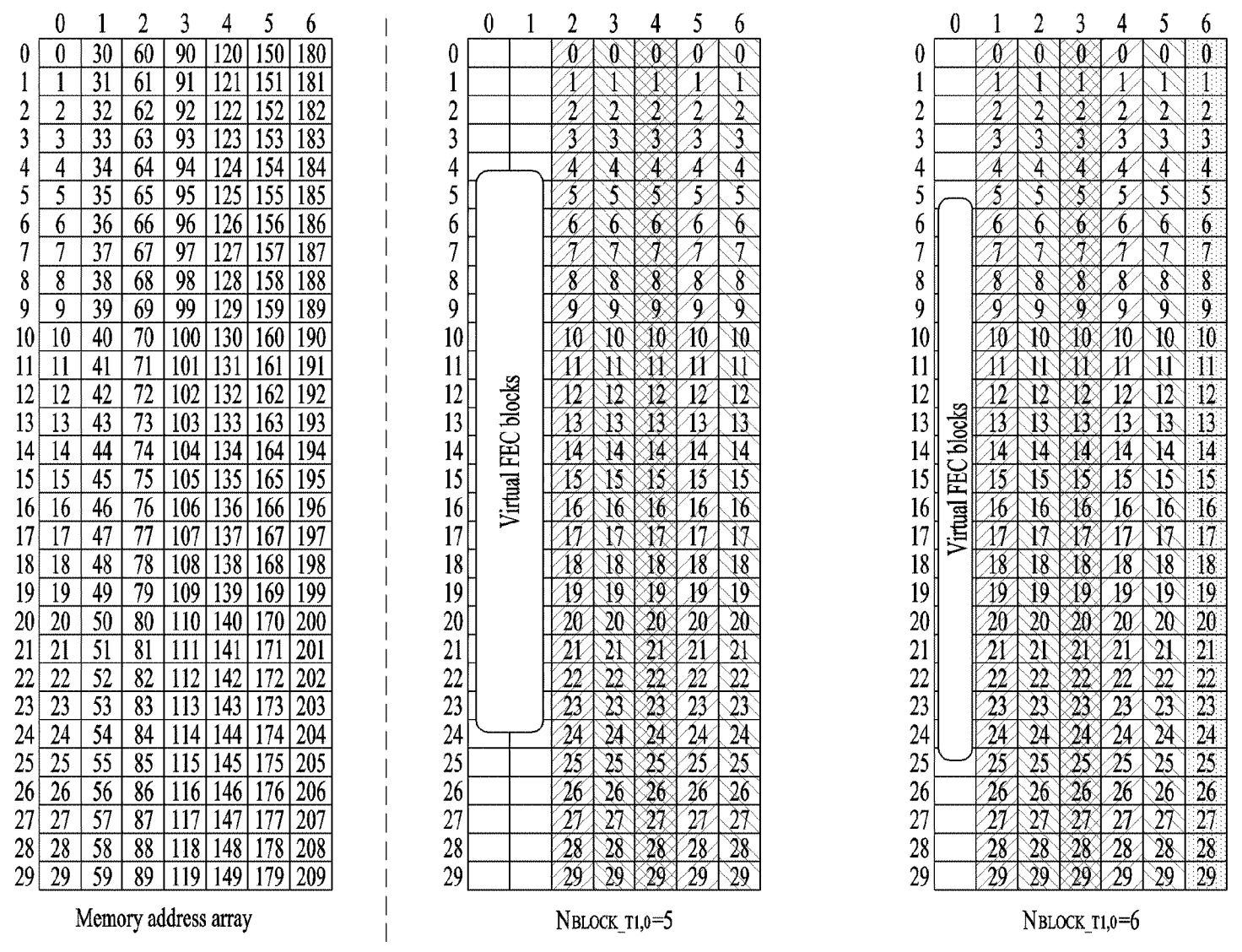

FIG. 9 is a writing operation of a time interleaver according to an embodiment of the present invention.

A block shown in a left portion of the drawing shows a TI memory address array and a block shown in a right portion of the drawing shows a writing operation when two or one virtual FEC blocks are inserted into a frontmost group of TI groups with respect to two consecutive TI groups.

The frequency interleaver according to an embodiment of the present invention may include an interleaving address generator for generating an interleaving address to be applied to data corresponding to a symbol pair.

Figure 10:
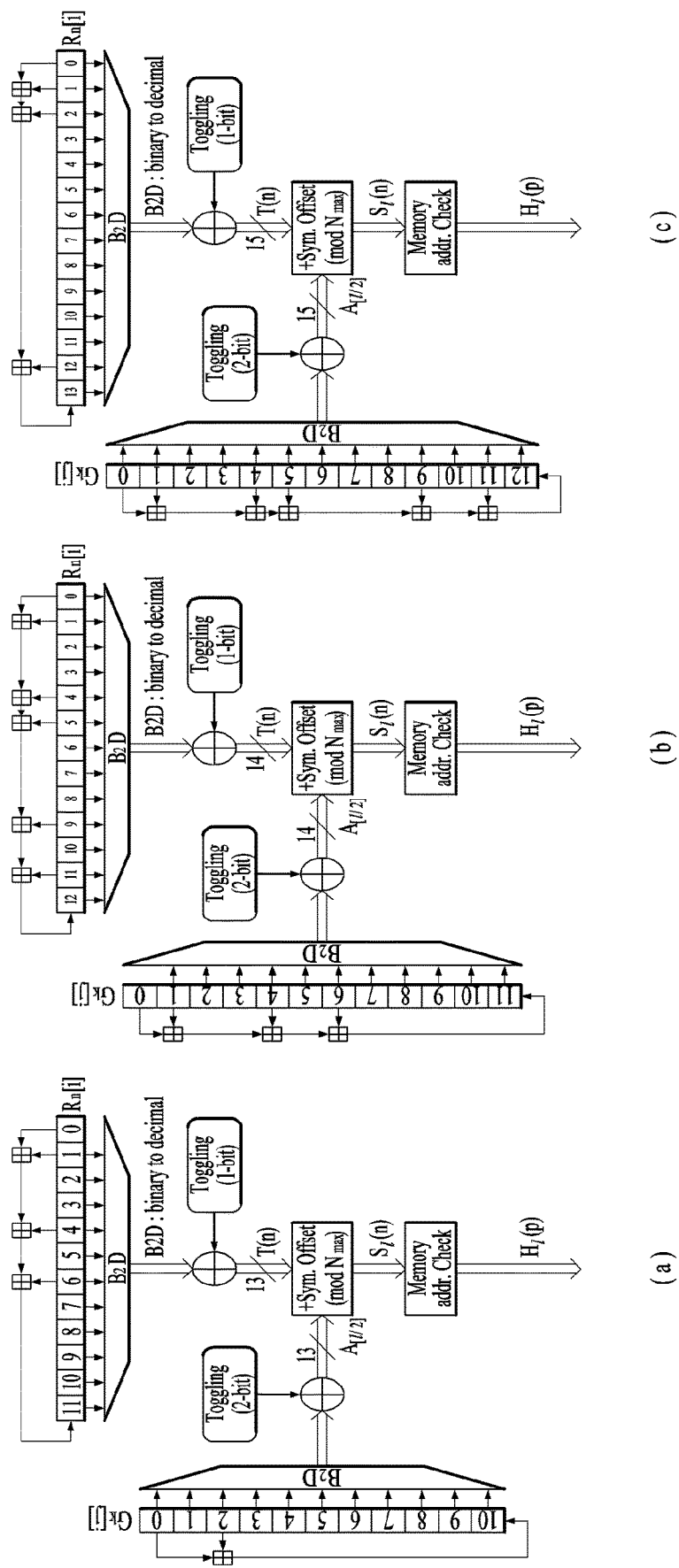
FIG. 10 is a block diagram of an interleaving address generator configured by a main-PRBS generator and a sub-PRBS generator according to FFT modes included in a frequency interleaver according to an embodiment of the present invention.

FIG. 10 is a block diagram of an interleaving address generator including a main-PRBS generator and a sub-PRBS generator according to each PET mode, included in the frequency interleaver, according to an embodiment of the present invention.

(a) is a block diagram of an interleaving address generator with respect to a 8K PET mode, (b) is a block diagram of an interleaving address generator with respect to a 16K ITT mode, and (c) is a block diagram of an interleaving address generator with respect to a 32K PET mode.

An interleaving procedure with respect to an OFDM symbol pair may use one interleaving sequence and will be described below. First, an available data cell (output cell from a cell mapper) to be interleaved in one OFDM symbol $O_{m,l}$ may be defined as $O_{m,l}=[x_{m,l,0}, \ldots, x_{m,l,p}, \ldots, x_{m,l,Ndata-1}]$ with respect to l=0, $N_{sym}-1$. In this case, $x_{m,l,p}$ may be a $p^{th}$ cell of a $l_{th}$ OFDM symbol in a $m^{th}$ frame and $N_{data}$ may be the number of data cells. In the case of a frame signaling symbol, $N_{data}=C_{FSS}$, in the case of normal data, $N_{data}=C_{data}$, and in the case of a frame edge symbol, $N_{data}=C_{FES}$. In addition, the interleaving data cell may be defined as $P_{m,l}=[v_{m,l,0}, \ldots, v_{m,l,Ndata-1}]$ with respect to l=0, $N_{sym}-1$.

With respect to an OFDM symbol pair, an interleaved OFDM symbol pair may be given according to $v_{m,l,Hi(p)}=x_{m,l,p}$, p=0, $\ldots$, $N_{data}-1$ for a first OFDM symbol of each pair and given according to $v_{m,l,p}=x_{m,l,Hi(p)}$, p=0, $\ldots$, $N_{data}-1$ for a second OFDM symbol of each pair. In this case, Hi(p) may be an interleaving address generated based on a cyclic shift value (symbol offset) of a PRBS generator and a sub-PRBS generator.

The present disclosure discloses a method for accurately representing the colors of original content in a case where the color gamut and dynamic range of the content given at the time of production of the content are different from the color gamut and dynamic range given at the time of image reproduction, namely, in various display environments.

Figure 11:
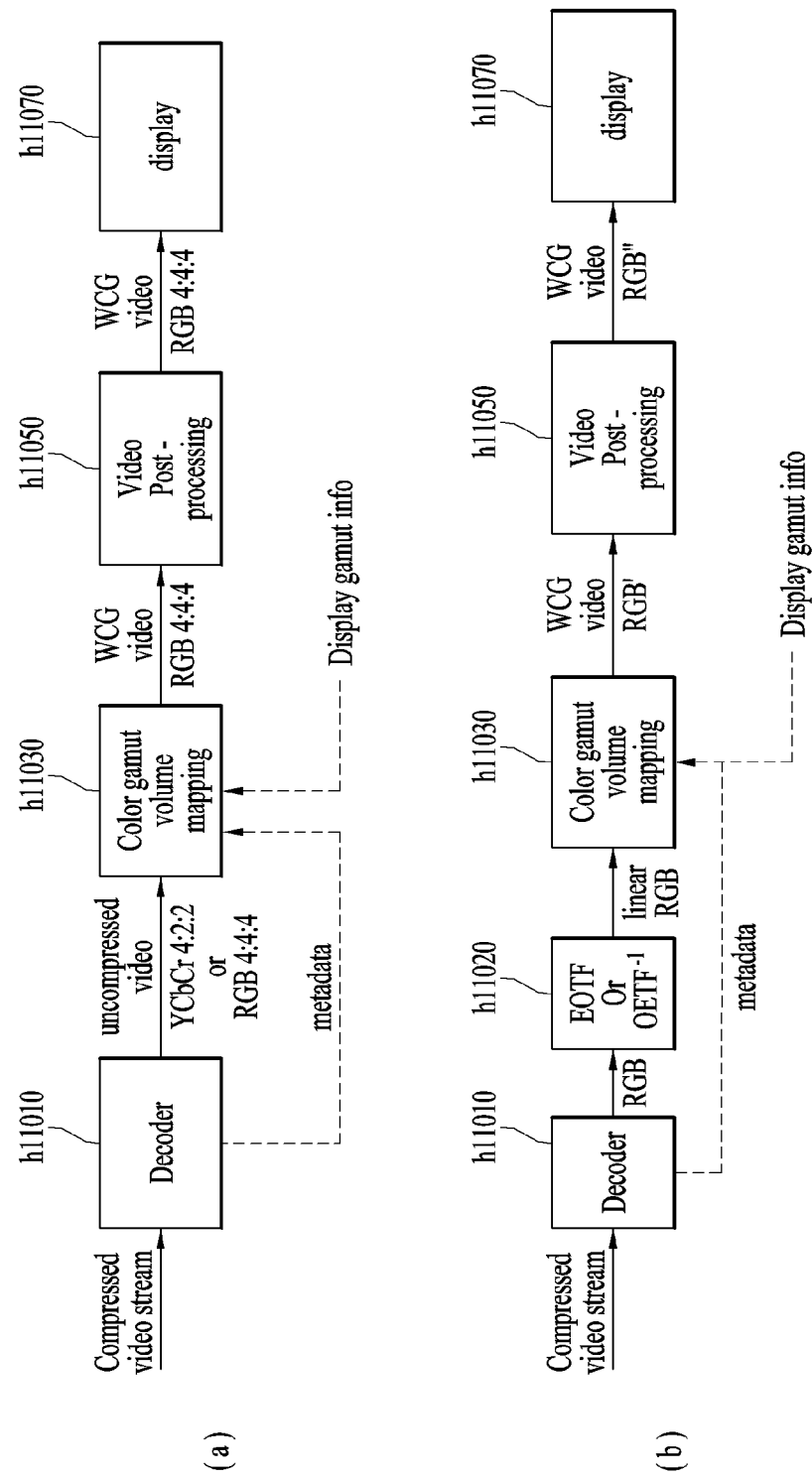
FIG. 11 is a diagram illustrating an example of receiver operation supporting color volume mapping according to an embodiment of the present invention.

FIG. 11 is a diagram illustrating an example of receiver operation supporting color volume mapping according to an embodiment of the present invention.

In FIG. 11, (a) and (b) show a series of operations of processing and display of a video stream performed by a receiver having received the video stream, respectively.

In the embodiment of (a) of FIG. 11, a receiver includes a decoder h11010, a color gamut volume mapping unit h11030, a video post-processing unit h11050, and a display h11070. In terms of operation of the receiver, the receiver may perform decoding, color volume mapping, video post-processing, and displaying operations.

The decoder h11010 may receive a compressed video stream and decode the received video stream. In an embodiment, the compressed video stream may be transmitted over a broadcast signal. The decoder h11010 may output the decompressed video to the color gamut volume mapping unit h11030. In addition, the decoder h11010 may extract metadata included in the video stream and output the extracted metadata to the color gamut volume mapping unit h11030.

The color gamut volume mapping unit h11030 may receive the decompressed video and the metadata from the decoder h11010. In addition, the color gamut volume mapping unit h11030 may receive display gamut information. The display gamut information may be referred to as target gamut information. The display gamut information may be gamut information that is a target of conversion. In one embodiment, the display gamut information may be narrow gamut information, and the original gamut information may be wide gamut information. The display gamut information may be stored in the receiver or may be input from the outside.

The color gamut volume mapping unit h11030 may perform gamut conversion using the input video, metadata, and/or display gamut information. The color gamut volume mapping unit h11030 may perform color volume conversion and then output the gamut-converted video to the video post-processing unit. The color volume conversion in the color gamut volume mapping unit h11030 will be described in detail later.

The video post-processing unit h11050 may receive the gamut-converted video from the color gamut volume mapping unit h11030. The video post-processing unit h11050 may perform various post-processing operations necessary for display. The video post-processing unit h11050 may output the post-processed video to the display h11070.

The display h11070 may receive the post-processed video input from the video post-processing unit. The display h11070 may display the input video. The video having the gamut converted into a target gamut may be displayed through a series of operations shown in (a) of FIG. 11.

In the embodiment of (b) of FIG. 11, a receiver includes a decoder, an EOTF or OETF conversion unit, a color gamut volume mapping unit, a video post-processing unit, and a display.

That is, the embodiment of (b) of FIG. 11 may be considered as an embodiment configured by adding the EOTF conversion unit h11020 to the embodiment of (a) of FIG. 11. The EOTF conversion unit h11020 may be referred to as an inverse OETF conversion unit h11020. In terms of operation of the receiver, the receiver may perform decoding, EOTF conversion (or inverse OETF conversion), color volume mapping, video post-processing, and display operations.

The EOTF conversion unit h11020 may convert an electronic video signal into an optical video signal for video decoding. Since the embodiment of (b) of FIG. 11 is an embodiment configured by adding the EOTF conversion unit h11020 to the embodiment of (a), the description of the embodiment of (a) of FIG. 11 is available for the embodiment of (b) of FIG. 11.

Figure 12:
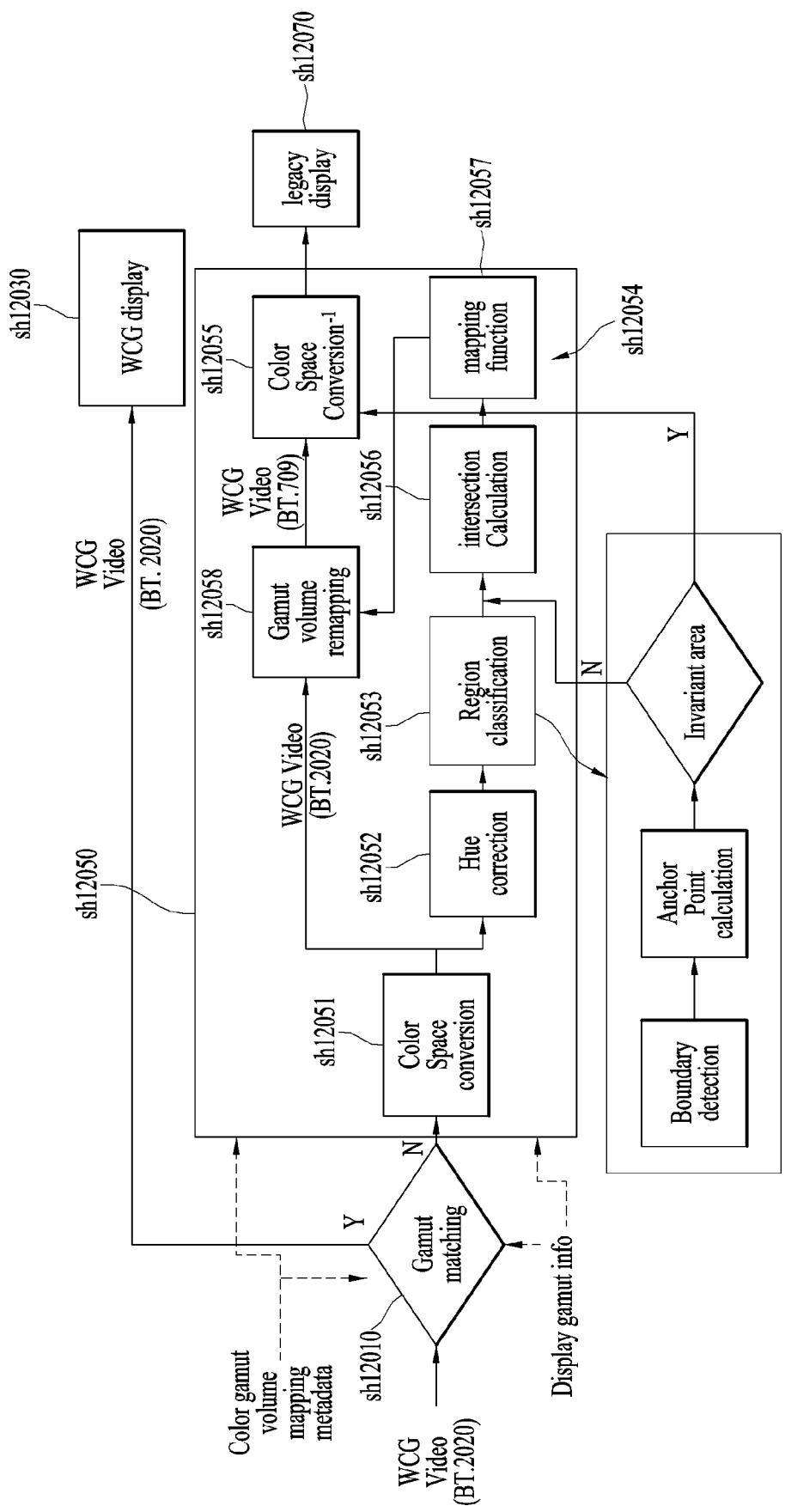
FIG. 12 is a diagram illustrating a procedure of displaying wide color gamut content according to an embodiment of the present invention.

FIG. 12 is a diagram illustrating a procedure of displaying wide color gamut content according to an embodiment of the present invention.

Referring to FIG. 12, the procedure of displaying wide color gamut content according to the embodiment includes determining gamut matching (sh12010), displaying a WCG video (sh12030), mapping the WCG to a narrow gamut (sh12050), and displaying the video of the narrow gamut (sh12070).

The operation of determining gamut matching (sh12010) may be an operation of checking whether an input WCG video matches the color gamut of the receiver. That is, the receiver may check whether the color gamut of the input video (WCG video) is a gamut that can be processed by the receiver. In this operation, the receiver may check whether the input WCG video matches the color gamut of the receiver, using the display gamut information and/or the metadata included in the video stream.

If the color gamut of the input video is a gamut that can be processed by the receiver (Yes in sh12010), the receiver may display the input WCG video (sh12030).

On the other hand, if the color gamut of the input video is not a gamut that can be processed by the receiver (No in sh12010), the receiver may perform an operation of mapping the input WCG video to a narrow gamut (sh12050).

Then, when the video of the WCG is mapped to the narrow gamut, the receiver may display a video of the narrow gamut (sh12070).

The color volume mapping operation (sh12050) of FIG. 12 may be an operation performed by the color gamut volume mapping unit h11030 of FIG. 11 described above.

The color volume mapping operation (sh12050) according to the embodiment of the present invention may include color space conversion (sh12051), hue correction (sh12052), region classification (sh12053), color information remapping (sh12054), and/or inverse color space conversion (sh12055).

The color space conversion (sh12051) may be an operation of converting a color space into a color space in which a lightness axis and a hue axis are separable for color volume mapping.

The hue correction (sh12052) may be an operation of correcting the hue angle by applying the same factor or weight.

The region classification (sh12053) may be an operation of determining a region in which any color information is present in the gamut. Since the color information remapping may differ among the regions, the region classification is performed before the color information remapping, and the color information remapping is performed according to the regions to which the color information belongs.

In one embodiment, the region classification operation (sh12053) may include boundary detection, anchor point calculation, and invariant area determination. The boundary detection may be an operation of determining a gamut boundary. The anchor point calculation may be an operation of calculating an anchor point necessary for dividing regions. The invariant area determination may be an operation of determining whether color information belongs to an invariant area. If the color information belongs to the invariant area, the color information remapping operation may not be additionally performed.

The color information remapping (sh12054) may be an operation of mapping color information belonging to the original gamut to a target gamut.

According to one embodiment, the color information remapping operation (sh12054) may be subdivided into intersection calculation (sh12056), mapping function determination (sh12057), and remapping (sh12058).

The intersection calculation (sh12056) may be an operation of calculating an intersection where a boundary of the original gamut, a boundary of the target gamut, and/or a boundary of the invariant area intersect a straight line for color information remapping. The calculated intersection may be used as an input value of a mapping function used for the color information remapping.

The mapping function determination (sh12057) may be an operation of determining mapping functions to be used for remapping for each region.

The remapping (sh12058) may be an operation of mapping any color information in the original gamut to the target gamut using the mapping function and the intersection. The remapping operation may be performed using different mapping functions for the individual regions.

The inverse color space conversion (sh12055) may be an inverse operation to the color space conversion (sh12051).

Some of the operations or steps included in the color volume mapping operation according to the embodiment of the present invention may be omitted or included in another operation or step.

Figure 13:
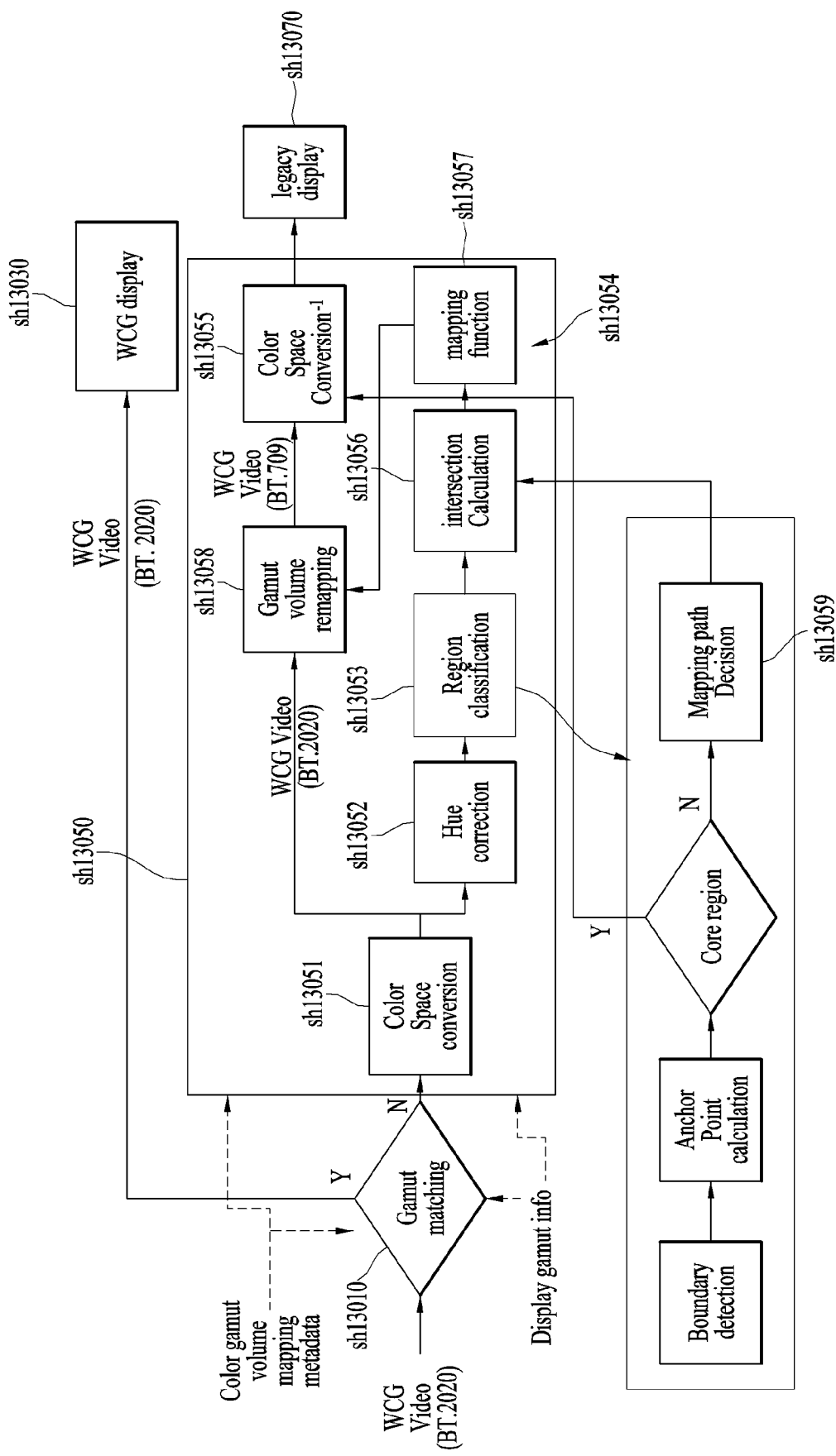
FIG. 13 is a diagram illustrating a procedure of displaying wide color gamut content according to another embodiment of the present invention.

FIG. 13 is a diagram illustrating a procedure of displaying wide color gamut content according to another embodiment of the present invention.

Referring to FIG. 13, the procedure of displaying WCG content according to another embodiment includes determining gamut matching (sh13010), displaying a WCG video (sh13030), mapping the wide color gamut to a narrow gamut (Sh13050), and displaying a video of the narrow gamut (sh13070).

The operation of determining gamut matching (sh13010) may be an operation of checking whether an input WCG video matches the color gamut of the receiver. That is, the receiver may check whether the color gamut of the input video (WCG video) is a gamut that can be processed by the receiver. In this operation, the receiver may check whether the input WCG video matches the color gamut of the receiver, using the display gamut information and/or the metadata included in the video stream.

If the color gamut of the input video is a gamut that can be processed by the receiver (Yes in sh13010), the receiver may display the received WCG video (sh13030).

On the other hand, if the color gamut of the input video is not a gamut that can be processed by the receiver (No in sh13010), the receiver may perform an operation of mapping the input WCG video to a narrow gamut (sh14050).

Then, when the video of the WCG is mapped to the narrow gamut, the receiver may display a video of the narrow gamut (sh13070).

The color volume mapping operation (sh13050) of FIG. 13 may an operation of the color gamut volume mapping unit h11030 of FIG. 11 described above.

The color volume mapping operation (sh13050) according to the embodiment of the present invention may include color space conversion (sh13051), hue correction (sh13052), region classification (sh13053), color information remapping (sh13054), and/or inverse color space conversion (sh13055).

The color space conversion (sh13051) may be an operation of converting a color space into a color space in which a lightness axis and a hue axis are separable for color volume mapping.

The hue correction (sh13052) may be an operation of correcting the hue angle by applying the same factor or weight.

The region classification (sh13053) may be an operation of determining a region in which any color information is present within the gamut. Since the color information remapping may differ among the regions, the region classification is performed before the color information remapping, and the color information remapping is performed according to the regions to which the color information belongs.

In one embodiment, the region classification (sh13053) may include boundary detection, anchor point calculation, invariant area determination, and mapping path determination (sh13059). The boundary detection may be an operation of determining a gamut boundary. The anchor point calculation may be an operation of calculating an anchor point necessary for dividing regions. The invariant area determination may be an operation of whether color information belongs to an invariant area (core region). If the color information belongs to the invariant area (core region), the color information remapping operation may not be additionally performed. The mapping path determination (sh13059) may be an operation of determining a reference line for mapping when the color information does not belong to the invariant area. More details of the mapping path determination (sh13059) will be described later with reference to FIG. 14.

The color information remapping (sh13054) may be an operation of mapping color information belonging to the original gamut to a target gamut.

According to one embodiment, the color information remapping operation (sh13054) may be subdivided into intersection calculation (sh13056), mapping function determination (sh13057), and remapping (sh13058).

The intersection calculation (sh13056) may be an operation of calculating an intersection where a boundary of the original gamut, a boundary of the target gamut, and/or a boundary of the invariant area intersect a straight line for color information remapping. The calculated intersection may be used as an input value of a mapping function used for color information remapping.

The mapping function determination (sh13057) may be an operation of determining mapping functions to be used for remapping of the respective region.

The remapping (sh13058) may be an operation of mapping any color information in the original gamut to the target gamut using the mapping function and the intersection. The remapping operation may be performed using different mapping functions for the individual regions.

The inverse color space conversion (sh13055) may be an inverse operation to the color space conversion (sh13051).

Some of the operations or steps included in the color volume mapping operation according to the embodiment of the present invention may be omitted or included in another operation or step.

Figure 14:
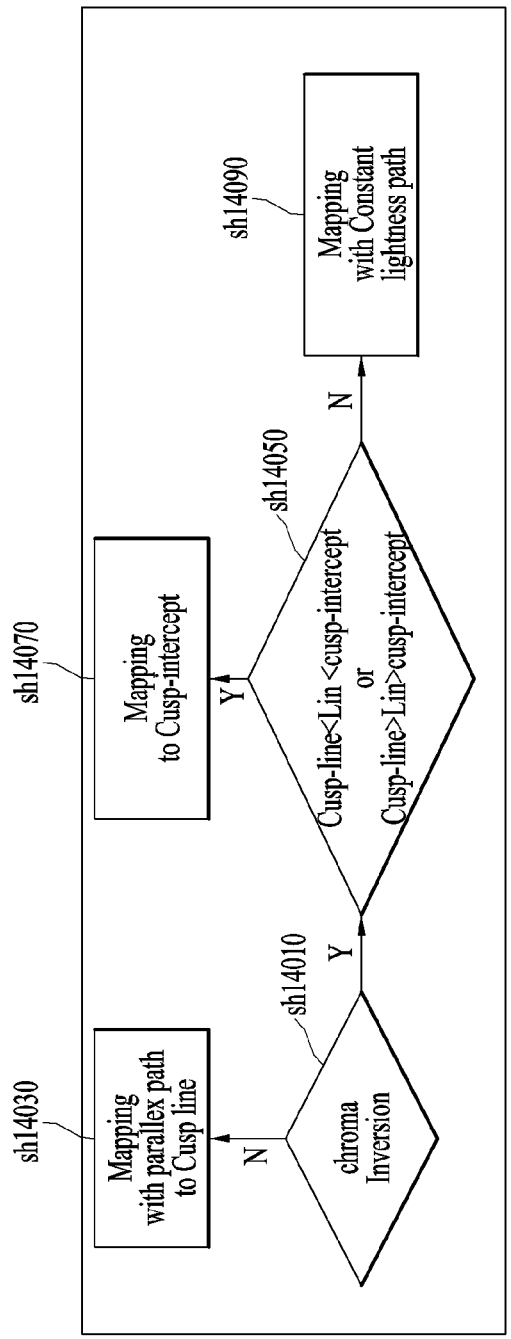
FIG. 14 is a diagram illustrating a mapping path determination operation according to an embodiment of the present invention.

FIG. 14 is a diagram illustrating a mapping path determination operation according to an embodiment of the present invention.

The mapping path determination may be an operation of determining a reference line for mapping when the color information does not belong to the invariant area (core region). Alternatively, the mapping path determination may be an operation of determining, when the color information does not belong to the core region, a region to which the color information belongs in the gamut.

The mapping path determination operation may include determining whether chroma inversion occurs (sh14010), determining a Cusp line as a reference line for mapping (sh14030), determining whether the information belongs to a switch region (sh14050), and determining a straight line passing through a Cusp intercept as the reference line for mapping (sh14070), and determining a constant line as the reference line for mapping (sh14090).

The operation of determining chroma inversion (sh14010) may be an operation of determining whether chroma inversion can occur in a region to which any color information belongs. If chroma inversion does not occur in the region to which the color information belongs (No in sh14010), the Cusp line may be set as the reference line for mapping for the region. On the other hand, if chroma inversion can occur in the region to which the color information belongs (Yes in sh14010), the operation of determining whether the information belongs to the switch region is performed.

The operation of determining the Cusp line as the reference line for mapping (sh14030) may be an operation of determining the Cusp line as the reference line for mapping. The Cups line may refer to a straight line passing through the points having the maximum chroma values in the original color gamut and the target gamut. Once the Cusp line is determined as the reference line for mapping, color information mapping of the color information included in the region may be performed along a line parallel to the Cusp line. Setting the Cusp line as the reference line for mapping may mean that the color information belongs to the Cusp region.

The operation of determining whether the information belongs to the switch region (sh14050) may be an operation of determining whether a region to which the color information belongs is the switch region. According to an embodiment, in the operation of determining whether the information belongs to the switch region (sh14050), it may be determined whether the color information belongs to the switch region by comparing a function value for the color information with a predetermined value. If the information belongs to the switch region (Yes in sh14050), a straight line passing through the Cusp intercept may be set as the reference line for mapping. On the other hand, if the color information does not belong to the switch region (No in sh14050), a constant line may be set as the reference line for mapping.

The operation of determining a straight line passing through the Cusp intercept as the reference line for mapping (sh14070) may be an operation of determining a straight line passing through the Cusp intercept as the reference line for mapping. Here, the Cusp intercept may refer to a point at which the above-described Cusp line intersects the lightness axis. Once the straight line passing through the Cusp intercept is determined as the reference line for mapping, color information mapping of the color information included in the corresponding region may be performed along the straight line passing through the Cusp intercept. The fact that the straight line passing through the Cusp intercept is set as the reference line for mapping may mean that the color information belongs to the switch region.

The operation of determining the constant line as the reference line for mapping (sh14090) may be an operation of determining the constant line as the reference line for mapping. Here, the constant line may refer to a line perpendicular to the lightness axis passing through the above-described Cusp intercept. In other words, the constant line may refer to a line that passes through the Cusp intercept described above and is parallel to the chroma axis. Once the constant line is determined as the reference line for mapping, color information mapping of the color information included in the corresponding region may be performed along a straight line parallel to the constant line. Setting the constant line as the reference line for mapping may mean that the color information belongs to a constant L region.

Figure 15:
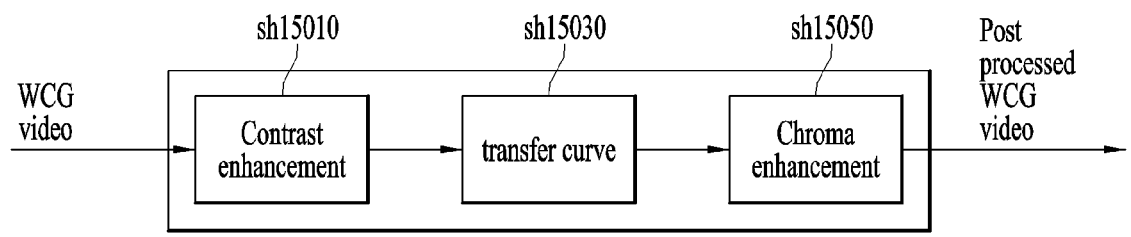
FIG. 15 is a diagram illustrating a video post-processing unit according to an embodiment of the present invention.

FIG. 15 is a diagram illustrating a video post-processing unit according to an embodiment of the present invention.

FIG. 15 may be a diagram illustrating the video post-processing operation of the video post-processing unit h11050 of FIG. 11 in detail.

The video post-processing operation according to the embodiment of the present invention may include contrast enhancement (sh15010), transfer curve application (sh15030), and chroma enhancement (sh15050). According to the embodiment of the present invention, a color volume-mapped video or a video that has not been subjected to color volume mapping may obtain an improved image quality through the contrast enhancement, the transfer curve application, and/or the chroma enhancement. In an embodiment, the image processing operation (video post-processing) illustrated in this figure may be performed before the color volume mapping.

Figure 16:
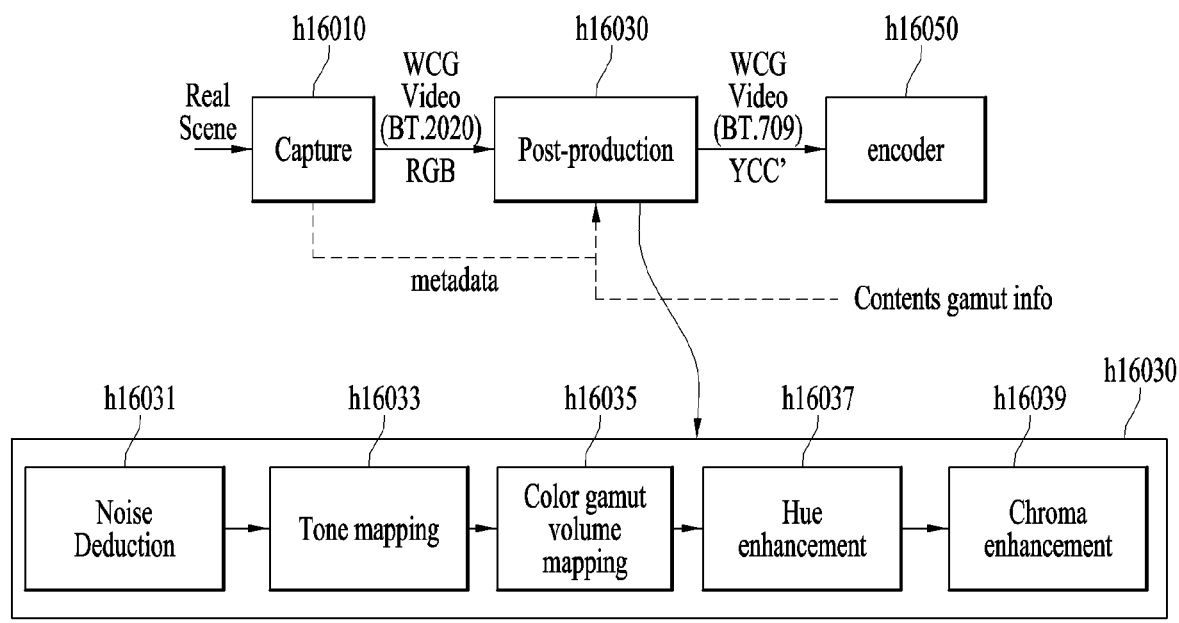
FIG. 16 is a diagram illustrating an example of transmitter operation supporting color volume mapping according to an embodiment of the present invention.

FIG. 16 is a diagram illustrating an example of transmitter operation supporting color volume mapping according to an embodiment of the present invention.

The embodiment of FIG. 16 may be an embodiment in which the operation of mapping a wide color gamut to a narrow color gamut is applied to the transmitting side.

FIG. 16 illustrates an operation of capturing a real scene and encoding the same into video. In the embodiment of FIG. 16, a transmitter includes a capture unit h16010, a post-production unit h16030, and an encoder h16050. In terms of operation of the transmitter, the transmitter may perform capture, post production, and display (encoding) operations. In one embodiment, the encoded video may be transmitted over a broadcast signal.

The capture unit h16010 may capture a real scene and generate a video. Here, the video may have a wide gamut. The capture unit h16010 may generate metadata related to the video. The capture unit h16010 may output the video and the metadata to the post-production unit h16030.

The post production unit h16030 may receive the video and the metadata input from the capture unit. The post-production unit may perform the post production operation on the generated video, and then output the post-produced video to the encoder h16050. In addition, the post-production unit h16030 may receive content gamut information. The content gamut information may be referred to as original gamut information or source gamut information. The content gamut information may represent the gamut information at the time of production. In one embodiment, the content gamut information may be wide gamut information, and the target gamut information may be narrow gamut information.

The post-production unit h16030 may perform the post production operation using the input video, metadata, and/or content gamut information. In one embodiment, the post production operation may include noise reduction sh16031, tone mapping sh16033, color gamut volume mapping sh16035, hue enhancement sh16037, and chroma enhancement sh16039. Here, the color gamut volume mapping operation (sh16035) may be substantially the same as the color gamut volume mapping operation of FIG. 11. For the color gamut volume mapping operation, the details of the color gamut volume mapping operations (sh12050 and sh13050) may be applied.

The encoder h16050 may receive the post-produced video input from the post-production unit. The encoder may encode the input video and output the encoded video. In an embodiment, the encoded video may be transmitted over a broadcast signal and consumed in the receiver.

The receiver corresponding to the transmitter of the embodiment of FIG. 16 may be configured to perform an operation of mapping the video of the narrow gamut to a wide color gamut. The operation of mapping a narrow gamut video to a wide gamut video may have a duality relationship with the operation of mapping a wide gamut video to a narrow gamut video.

Hereinafter, the color volume mapping operation according to an embodiment of the present invention will be described with reference to FIGS. 17 to 20.

The color volume mapping operation according to the embodiment described with reference to FIGS. 17 to 20 may be performed by the receiver of FIG. 13 described above.

<Color Space Conversion>

Figure 17:
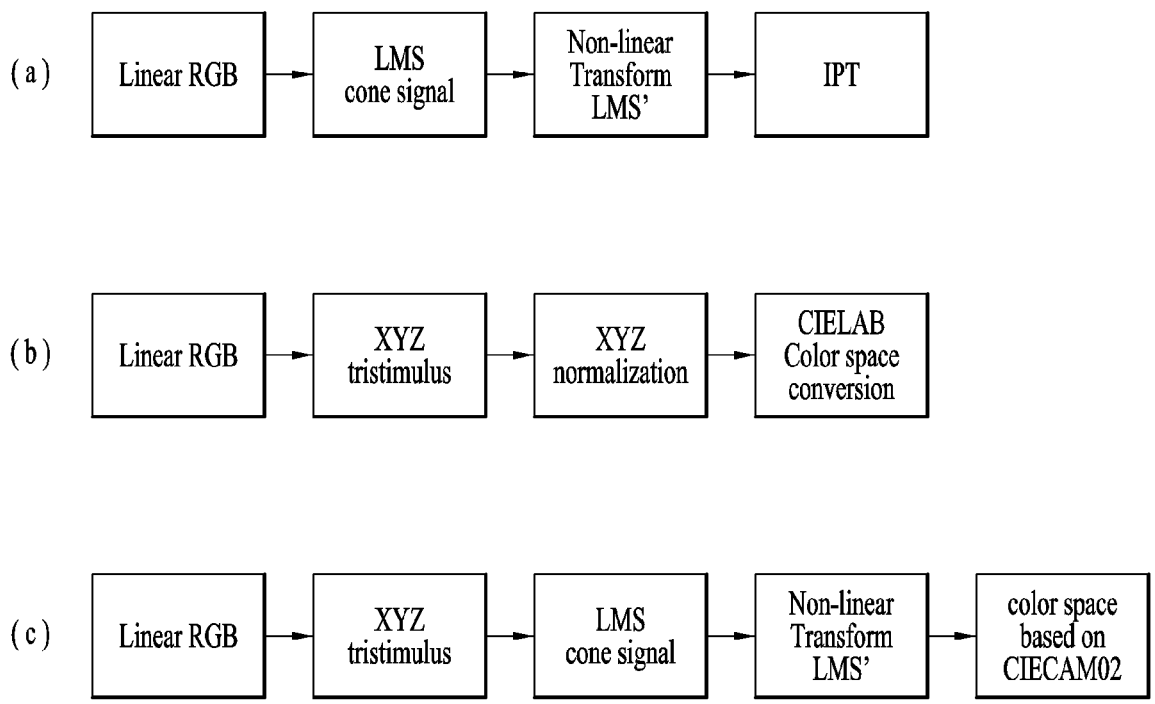
FIG. 17 is a diagram illustrating a color space conversion operation according to various embodiments of the present invention.

FIG. 17 is a diagram illustrating a color space conversion operation according to various embodiments of the present invention.

In order to perform color volume mapping, an RGB signal needs to be converted into a color space that may be represented by a lightness axis and a hue axis. Any color space may be used for color volume mapping as long as it can be represented by the lightness axis and the hue axis. A more uniform color space may more efficiently maintain the original color in color volume mapping. Representative color spaces include IPT, CIELAB, CIELUV, and a new color space based on CIECAM02. HSV and YCbCr may also be adopted as color spaces that allow color representation in a three-dimensional space although they have relatively low uniformity. Information for color space conversion may be determined through metadata. The metadata may include parameters such as a color space type, peak luminance, and a coefficient for conversion. The information to be used or the conversion operation may depend on which color space is selected, and accordingly the necessary information or parameters may be provided through the metadata and used for the conversion. The metadata may be the metadata described in FIGS. 11, 12, 13, and 16. Details of the metadata will be described later with reference to FIGS. 25 to 43.

In FIG. 17, (a), (b), and (c) illustrate conversion into the IPT color space, the CIELAB color space, and a new color space based on CIECAM02, respectively.

The color space conversion operation according to various embodiments of the present invention shown in FIG. 17 may be a specific embodiment of the color space conversion (sh12051 and sh13051) of FIG. 12 and/or FIG. 13. It is apparent to those skilled in the art that, although not shown, there may be an inverse color space conversion operation corresponding to the color space conversion operation according to the various embodiments of the present invention shown in FIG. 17. The inverse color space conversion operation may be a specific embodiment of the inverse color space conversion (sh12055 and sh13055) of FIG. 12 and/or FIG. 13.

<Color Correction>

Figure 18:
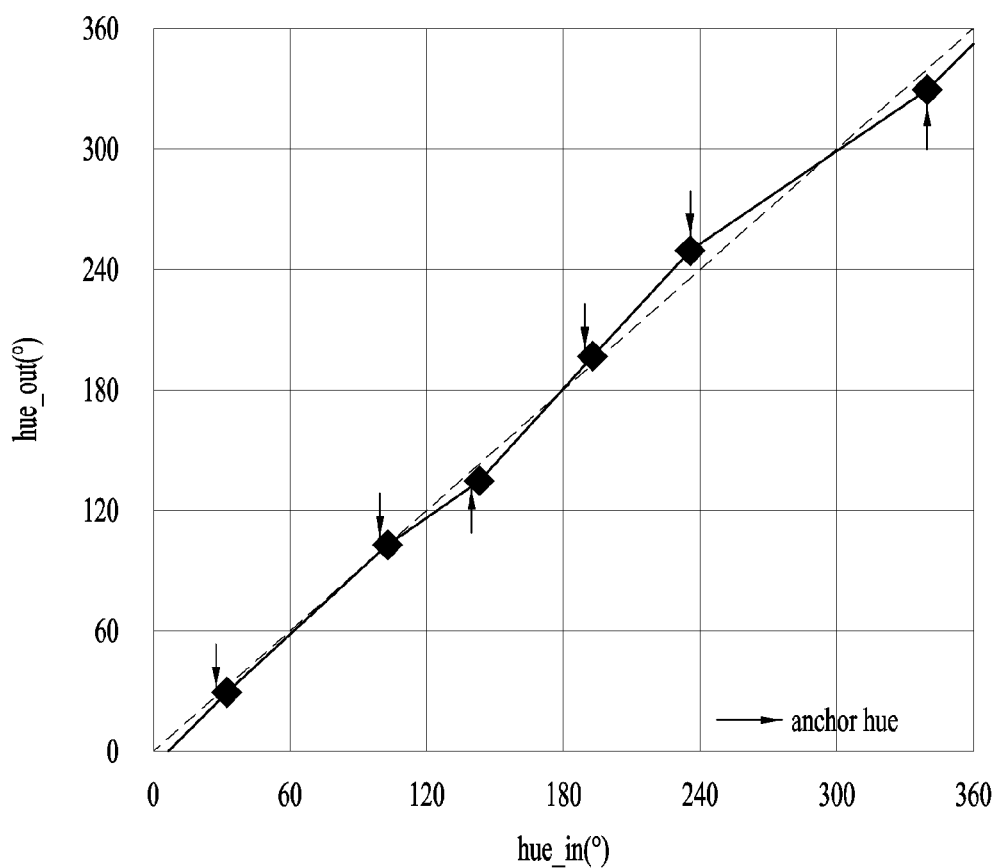
FIG. 18 is a view illustrating an example of hue correction according to an embodiment of the present invention.

FIG. 18 is a view illustrating an example of hue correction according to an embodiment of the present invention.

The metadata described in FIGS. 11, 12, 13, and 16 may include information necessary for hue correction. In one embodiment, the metadata may include hue correction function information for hue correction. The hue correction function information may include anchor point information with respect to a hue correction function graph used to convert the hue angle 'hue_in' of an original color into the hue angle 'hue_out' of a target color. Here, the original color may refer to a color after the color space conversion operation described above with reference to FIG. 17.

The anchor point information may be used to derive a hue correction function graph. When the color space used for color space conversion is uniform, the hue correction function graph may be computed from the anchor point information through linear interpolation. When the color space used for color space conversion is a non-uniform space, the hue correction function graph may be computed from the anchor point information using a power function.

FIG. 18 shows the hue angle hue_in of the original color that is corrected to a hue angle hue_out of the target color using a hue correction function graph. Here, the hue correction function graph may be computed from the anchor point information The hue correction operation according to the embodiment of the present invention illustrated in FIG. 18 may be a specific embodiment of the hue correction operations (sh12052 and sh13052) of FIG. 12 and/or FIG. 13.

The lightness information and the chroma information are associated with the hue information. Accordingly, the lightness information and the chroma information associated with any hue information may be represented in a two-dimensional plane.

Hereinafter, the operation of representing the lightness information and the hue information in a two-dimensional plane at a fixed hue in a gamut of a three-dimensional color space and performing gamut mapping in the two-dimensional plane will be described. Although the present disclosure describes representing the lightness information and the chroma information in the two-dimensional plane with respect to hue and performing gamut mapping in the two-dimensional plane, the operation may be applied even to representing, with respect to one axis of the color space, the other information in the two-dimensional plane.

Figure 19:
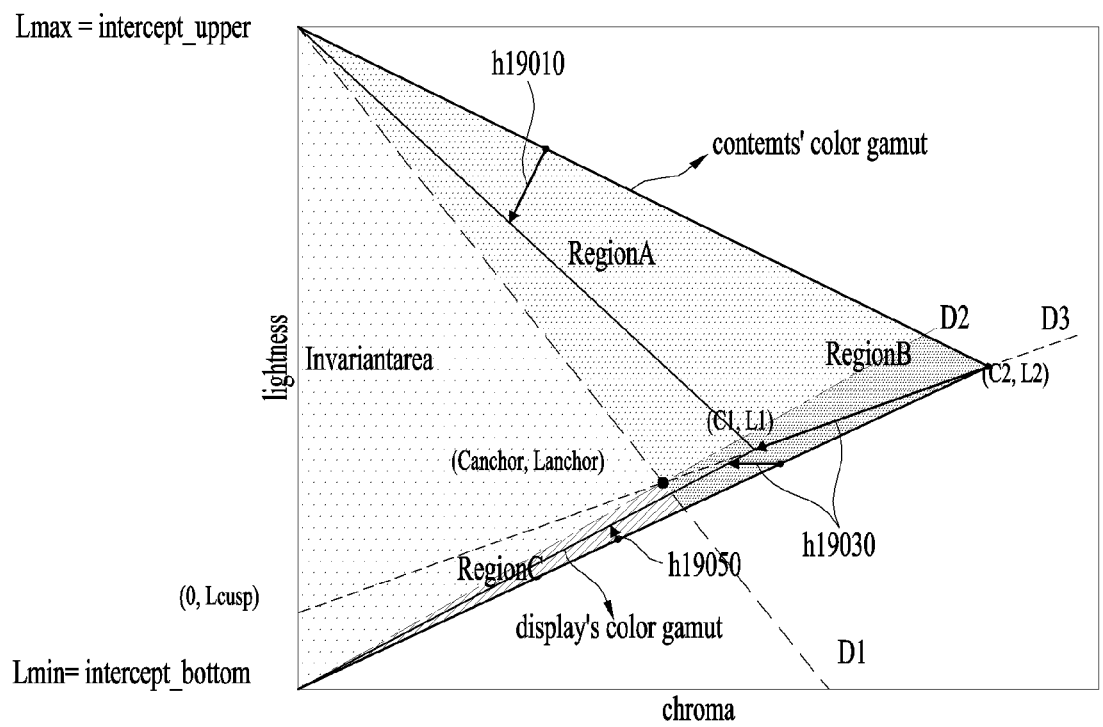
FIG. 19 is a view illustrating color volume mapping according to an embodiment of the present invention.

FIG. 19 is a view illustrating color volume mapping according to an embodiment of the present invention.

FIG. 19 shows lightness information and chroma information for any hue in a two-dimensional plane.

Referring to FIG. 19, a two-dimensional color gamut for content and a two-dimensional color gamut for a display are shown. In the two-dimensional plane, the X axis represents chroma and the Y axis represents lightness.

The two-dimensional gamut for the content represents an original gamut, which a wide gamut, and the two-dimensional gamut for the display represents a target gamut, which is a narrow gamut. In the figure, the relatively large triangle represents a boundary of the two-dimensional gamut for the content, and the relatively small triangle represents a boundary of the two-dimensional gamut for the display. The boundary detection of FIG. 12 and/or FIG. 13 may be an operation of finding the boundaries of such gamuts.

The color volume mapping according to an embodiment of the present invention may include setting regions in a gamut by dividing the gamut for mapping. In this case, an anchor point for setting regions in the gamut may be set. Here, the operation of setting or calculating the anchor point may correspond to the anchor point calculation operation of FIG. 12 and/or FIG. 13.

For reference, the anchor point for setting the regions in the gamut is distinguished from the anchor point for computing a hue correction function graph in color correction.

In the color gamut volume mapping according to the embodiment of the present invention described with reference to FIG. 19, region setting and anchor point setting may be performed through the following operations.

First, the anchor point is set as follows.

1. $L_{cusp}$ Setting $L_{cusp}$ may refer to the point at which a line passing through the points having the greatest chroma values in the original gamut and the target gamut intersects the lightness axis. In the embodiment of FIG. 19, the point having the greatest chroma value in the original gamut is $(C_2, L_2)$ and the point having the greatest chroma value in the target gamut is $(C_1, L_1)$. The straight line passing through the two points $(C_2, L_2)$ and $(C_1, L_1)$ is D3 (or $D_{cusp}$). The point at which D3 intersects the lightness axis is $(0, L_{cusp})$. $L_{cusp}$ always has a lightness value between the maximum lightness and the minimum lightness of the target gamut.

2. Determination of Chroma-Axis Anchor Value

The chroma-axis anchor value $C_{anchor}$ may be calculated using the weight information included in the metadata. The weight information may be transmitted in the metadata. More specifically, the chroma-axis anchor value may be calculated by multiplying the maximum chroma value $C_1$ of the target gamut, which is a narrow color gamut, by a weight.

$$C_{anchor} = \alpha \cdot C_1 \qquad \text{Equation 1}$$

Here, $C_{anchor}$ denotes an anchor value on the chroma axis, a denotes weight information included in the metadata, and C1 denotes the maximum chroma value of the narrow gamut.

Here, 0<a<1.

The metadata may be the metadata described in FIGS. 11, 12, 13, and 16, and the details of the metadata will be described later with reference to FIGS. 25 to 43.

3. Determination of Lightness-Axis Anchor Value

The anchor point is set to belong to D3 ($D_{cusp}$). Accordingly, once the straight line D3 and $C_{anchor}$ are determined, the Y-axis coordinate value of the point ($C_{anchor}$, $L_{anchor}$) belonging to the straight line D3 may be derived through an equation of a straight line.

In other words, the anchor point belongs to a straight line passing through ($C_1$, $L_1$) and (0, $L_{cusp}$). Since the X coordinate value $C_{anchor}$ of the anchor point has been determined, $L_{anchor}$, which is the Y coordinate value of the anchor point may be derived using the equation of the straight line connecting ($C_1$, $L_1$) and (0, $L_{cusp}$) and the X coordinate value $C_{anchor}$.

Therefore, $L_{anchor}$ derived from the equation of the straight line is given as follows.

$$L_{anchor} = \frac{(L_1 - L_{cusp}) \cdot C_{anchor}}{C_1} + L_{cusp} \qquad \text{Equation 2}$$

When $L_{cusp}$ is expressed with $L_1$, $C_1$, $L_2$, and $C_2$, $L_{cusp}$ is given as follows.

$$L_{cusp} = L_1 - \frac{(L_2 - L_1) \cdot C_1}{(C_2 - C_1)} \qquad \text{Equation 3}$$

Therefore, the value of the anchor point ($C_{anchor}$, $L_{anchor}$) may be summarized as follows.

$$C_{anchor} = \alpha \cdot C_1 \qquad \text{Equation 4}$$

$$L_{anchor} = \frac{(L_1 - L_{cusp}) \cdot C_{anchor}}{C_1} + L_{cusp}$$

where, $$0 < \alpha < 1$$

$$L_{cusp} = L_1 - \frac{(L_2 - L_1) \cdot C_1}{(C_2 - C_1)}$$

When the anchor point is set, region setting may be performed based on the anchor point.

In one embodiment, each gamut may be divided into four regions based on the anchor point.

When the anchor point is set, each gamut may be divided into four regions using straight line connecting two y-intercepts and the anchor point. Here, the y-intercepts may correspond to the maximum lightness value and the minimum lightness value that may be represented by the gamut. That is, a first y-intercept may be $L_{max}$, and a second y-intercept may be $L_{min}$. Each color gamut is divided into four regions based on a straight line D1 connecting (0, $L_{max}$) and ($C_{anchor}$, $L_{anchor}$) and a straight line D2 connecting (0, $L_{min}$) and ($C_{anchor}$, $L_{anchor}$).

The four regions may be denoted as an invariant area, Region A, Region B, and Region C. The respective regions are shown in the figure.

First, the invariant area may be defined as a triangular region surrounded by the straight line D1 connecting (0, $L_{max}$) and ($C_{anchor}$, $L_{anchor}$), the straight line D2 connecting (0, $L_{min}$) and ($C_{anchor}$, $L_{anchor}$), and the lightness axis.

Next, region A may be defined as a triangular region surrounded by the straight line D1, the straight line D2, a boundary line of the gamut passing through (0, L.).

Next, region C may be defined as a triangular region surrounded by the straight line D1, the straight line D2, a boundary line of the gamut passing through (0, $L_{min}$).

Next, region B may be defined as a quadrangular region surrounded by the straight line D1, the straight line D2, the boundary line of the gamut passing through (0, $L_{min}$), and the boundary line of the gamut passing through (0, $L_{max}$).

<Region Classification>

In color volume mapping, the color information remapping method may differ among the four regions described above. Therefore, it is necessary to pre-determine a region to which color information ($L_{in}$, $C_{in}$) of the original gamut belongs. Since the straight lines D1 and D2 are given in the form of a function of L=f(C), the region to which ($L_{in}$, $C_{in}$) belongs may be determined using $L_{in}$ and an equation of $f_{D1}(C_{in})$ or $f_{D2}(C_{in})$.

That is, the region to which ($L_{in}$, $C_{in}$) belongs may be determined using the following relations:

$L_{in} < f_{D1}(C_{in})$ & $L_{in} > f_{D2}(C_{in})$;   Invariant area:

$L_{in} > f_{D1}(C_{in})$ & $L_{in} > f_{D2}(C_{in})$;   Region A:

$L_{in} > f_{D1}(C_{in})$ & $L_{in} < f_{D2}(C_{in})$;   Region B:

$L_{in} < f_{D1}(C_{in})$ & $L_{in} < f_{D2}(C_{in})$.   Region C:

The region classification operation described above may correspond to the invariant area determination operation of FIG. 12 and/or the core region determination operation and the mapping path determination operation (sh13059) of FIG. 13.

<Color Information Remapping>

For color information belonging to the invariant area, the color information of the original gamut is maintained. Since the invariant area is a region where the original information is intended to be maintained as much as possible, the color information remapping is not performed on the color information belonging to the invariant area.

Next, for color information that does not belong to the invariant area, the color information of the original gamut is mapped to the color information of the target gamut. Here, the mapping may be performed according to the mapping functions of the corresponding regions. That is, in region A, a mapping function corresponding to region A may be applied. In region B, a mapping function corresponding to region B may be applied. In region C, a mapping function corresponding to region C may be applied.

In a specific embodiment, color information remapping may be performed in region A, region B, and region C as follows.

1. Region A

For color information belonging to region A, the color information is remapped along a straight line connecting ($C_{in}$, $L_{in}$) and (0, intercept_bottom=$L_{min}$). Referring again to FIG. 19, in region A, color information remapping is performed in the direction indicated by an arrow h19010. As a result, the color information belonging to region A of the original gamut is mapped between the invariant area and the boundary of the target gamut.

Region B

For color information belonging to region B, the color information is remapped toward ($C_{anchor}$, $L_{anchor}$). Referring again to FIG. 19, in region B, color information remapping is performed along rows h19030. As a result, the color information belonging to region B of the original gamut is mapped between the invariant area and the boundary of the target gamut.

3. Region C

For color information belonging to region C, the color information is remapped along a straight line connecting ($C_{in}$, $L_{in}$) and (0, intercept_top=$L_{max}$). Referring again to FIG. 19, in region C, color information remapping is performed along an arrow h19050. As a result, the color information belonging to region C of the original gamut is mapped between the invariant area and the boundary of the target gamut.

Here, the straight line used for color information remapping (the straight lines in the directions of the arrows in the respective regions) may be referred to as mapping lines.

The color information remapping operation may include intersection calculation, mapping function determination operation, and remapping. The color information remapping operation will be described in more detail through the embodiment of FIG. 20 disclosed below. Here, the color information remapping operation may correspond to the color information remapping operation (sh12504, sh13054) of FIG. 12 and/or FIG. 13. The intersection calculation, the mapping function determination, and the remapping, which are the specific operations of the color information remapping operation, may correspond to the intersection calculation operation (sh13056), the mapping function determination operation (sh13057), and the remapping operation sh13058) of FIGS. 12 and 13, respectively.

Figure 20:
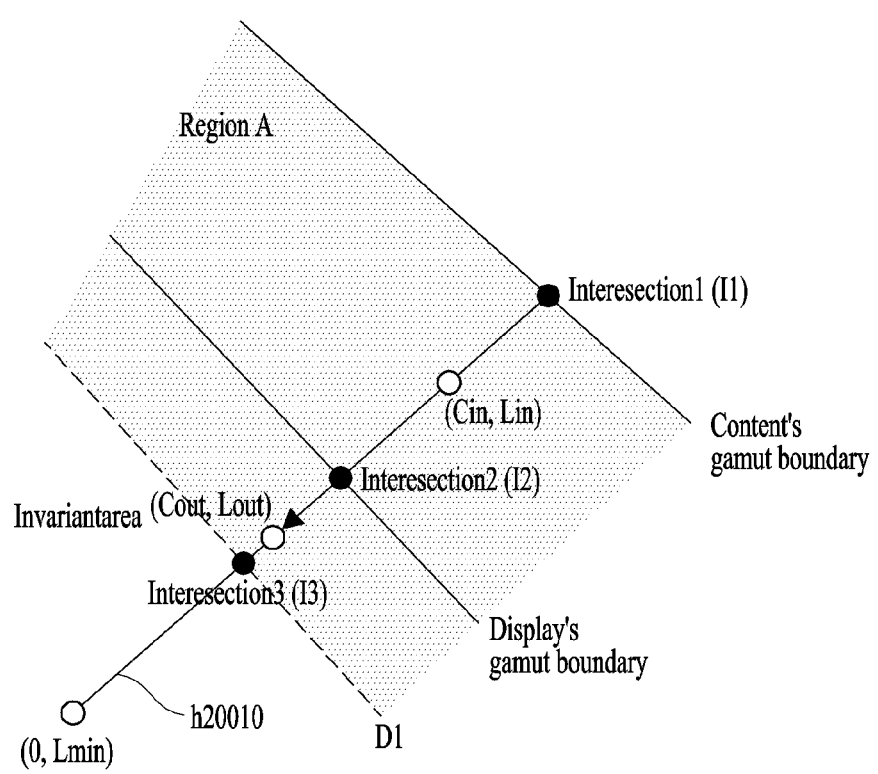
FIG. 20 is a detailed view illustrating a color information remapping operation in Region A according to an embodiment of the present invention.

FIG. 20 is a detailed view illustrating a color information remapping operation in Region A according to an embodiment of the present invention.

Hereinafter, the intersection calculation operation, the mapping function determination operation, and the remapping operation in region A will be sequentially described with reference to FIG. 20.

First, when color information ($C_{in}$, $L_{in}$) of the original color gamut is selected, a straight line h20010 connecting ($C_{in}$, $L_{in}$) and (0, intercept_bottom=$L_{min}$) is determined.

Once the straight line h20010 connecting ($C_{in}$, $L_{in}$) and (0, intercept_bottom=$L_{min}$) is determined, intersections may be calculated. Here, three intersections are determined, and the coordinate values of the intersections may be calculated using two equations of straight lines.

A first intersection (Intersection1 (I1)) may mean an intersection of the determined straight line h20010 and the boundary of the original gamut (content's gamut boundary).

A second intersection (Intersection2 (I2)) may mean an intersection of the determined straight line h20010 and the boundary of the target gamut (display's gamut boundary).

A third intersection (Intersectione3 (I3)) may mean an intersection of the determined straight line h20010 and the boundary D1 of the invariant area.

Once the intersections are determined, the coordinates of the intersections may be calculated using two equations of straight lines.

The color information coordinates ($C_{out}$, $L_{out}$) to be mapped may be calculated using the relationship between the color information coordinates ($C_{in}$, $L_{in}$) of the original gamut and the intersections. Specifically, the relationship between ($C_{in}$, $L_{in}$) present between the first intersection and the second intersection, and ($C_{out}$, $L_{out}$) present between the second intersection and the third intersection may be represented by a function. In this case, the relationship between ($C_{in}$, $L_{in}$) present between the first intersection and the second intersection, and ($C_{out}$, $L_{out}$) present between the second intersection and the third intersection may be represented by a linear function, a power function, or the like. The type and/or parameter values of the function may be included in metadata. The metadata may be the metadata described in FIGS. 11, 12, 13, and 16, and the details of the metadata will be described later with reference to FIGS. 25 to 43.

Once the intersections and the function representing the relationship between the color information coordinates of the original gamut and the color information coordinates to be mapped are determined, the color information coordinates of the original gamut may be remapped to the target gamut. Here, the function representing the relationship between the color information coordinates of the original gamut and the color information coordinates to be mapped may be determined through the type of the function and/or the values of parameters.

As a specific example of the function used for color information remapping, the linear function and the power function are given as follows.

First, the linear function may be represented as follows.

$$\text{out} = \frac{(\text{in} \cdot I3) \cdot (I2 - I3)}{(I1 - I3)} + I3 \qquad \text{Equation 5}$$

Here, 'out' denotes (Cout, Lout), 'in' denotes ($C_{in}$, $L_{in}$), and I1, I2 and I3 denote the first intersection, the second intersection and the third intersection, respectively. When the equation above is applied to each of the X coordinate and the Y coordinate, the color information coordinates ($C_{out}$, $L_{out}$) of the target gamut to which the color information coordinates ($C_{in}$, $L_{in}$) of the original gamut are to be remapped may be calculated.

Next, the power function may be expressed as follows.

$$\text{out} = (I2 - I3) \cdot \left(\frac{(\text{in} - I3)}{(I1 - I3)}\right)^\gamma + I3 \qquad \text{Equation 6}$$

Herein, 'out' denotes ($C_{out}$, $L_{out}$), 'in' denotes ($C_{in}$, $L_{in}$), and I1, I2 and I3 denote the first intersection, the second intersection and the third intersection, respectively. In addition, r denotes the exponent of the power function. When the equation above is applied to each of the X coordinate and the Y coordinate, the color information coordinates ($C_{out}$, $L_{out}$) of the target gamut to which the color information coordinates ($C_{in}$, $L_{in}$) of the original gamut are to be remapped may be calculated.

<Inverse Color Space Conversion>

Once the color information remapping is completed, inverse color space conversion is performed to return the signal to a state in which the information can be represented on the display. That is, the signal converted into three-dimensional axes of lightness and hue is converted into an RGB signal so as to be represented on the display. Here, the information used for inverse color space conversion may be included in the metadata. The metadata may be the metadata described in FIGS. 11, 12, 13, and 16, and the details of the metadata will be described later with reference to FIGS. 25 to 43. The inverse color space conversion corresponds to the inverse color space conversion described in FIG. 17.

The color volume mapping operation according to one embodiment of the present invention has been described with reference to FIGS. 17 to 20.

Hereinafter, a color volume mapping operation according to another embodiment of the present invention will be described with reference to FIGS. 21 and 22.

<Color Space Conversion>

In order to perform color volume mapping, the RGB signal is converted into a color space where the signal can be represented along a lightness axis and a hue axis. The description of FIG. 17 may be applied to the details of the color space conversion.

<Color Correction>

After color space conversion, color correction may be performed. The description of FIG. 18 is available for the details of the color correction.

<Region Classification>

The color volume mapping operation according to another embodiment of the present invention which will be described with reference to FIGS. 21 and 22 differs from the color volume mapping operation according to one embodiment of the present invention described with reference to FIGS. 17 to 20 in the region classification operation and the color information remapping operation.

More specifically, the color volume mapping operation according to another embodiment of the present invention differs from the color volume mapping operation according to one embodiment of the present invention in a method of setting regions and a method of determining the regions.

Hereinafter, a method of setting regions and a method of determining the regions in the color volume mapping operation according to another embodiment of the present invention will be described.

Figure 21:
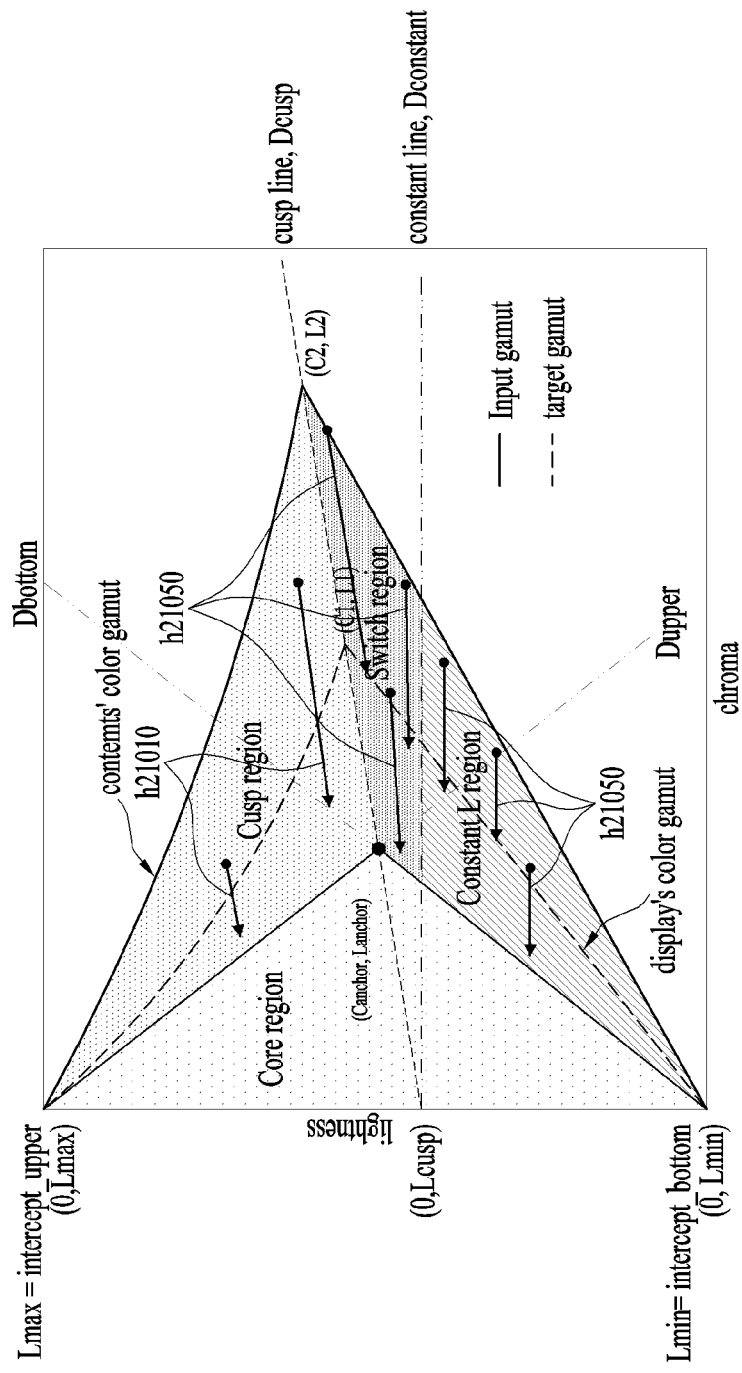
FIG. 21 is a view illustrating color volume mapping according to another embodiment of the present invention.

FIG. 21 is a view illustrating color volume mapping according to another embodiment of the present invention.

FIG. 21 shows lightness information and chroma information about hue in a two-dimensional plane.

Referring to FIG. 21, a two-dimensional color gamut for content and a two-dimensional gamut for a display are shown. In the two-dimensional plane, the X axis represents chroma and the Y axis represents lightness.

The two-dimensional gamut for the content represents an original gamut, which a wide gamut, and the two-dimensional gamut for the display represents a target gamut, which is a narrow gamut. In the figure, the relatively large triangle represents a boundary of the two-dimensional gamut for the content, and the relatively small triangle represents a boundary of the two-dimensional gamut for the display. The boundary detection of FIG. 12 and/or FIG. 13 may be an operation of finding the boundaries of such gamuts.

The color volume mapping according to this embodiment may include setting regions in a gamut by dividing the gamut for mapping. In this case, an anchor point for setting regions in the gamut may be set. For reference, the anchor point for setting regions in the gamut is distinguished from the anchor point for computing a hue correction function graph in hue correction. Here, the operation of setting or calculating the anchor point may correspond to the anchor point calculation operation of FIG. 12 and/or FIG. 13.

In the color gamut volume mapping according to the embodiment of the present invention described with reference to FIG. 21, region setting and anchor point setting may be performed through the following operations.

First, the anchor point is set as follows.

1. $L_{cusp}$ Setting $L_{cusp}$ may refer to the point at which a line passing through the points having the greatest chroma values in the original gamut and the target gamut intersects the lightness axis. In the embodiment of FIG. 21, the point having the greatest chroma value in the original gamut is ($C_2$, $L_2$) and the point having the greatest chroma value in the target gamut is ($C_1$, $L_1$). The straight line passing through the two points ($C_2$, $L_2$) and ($C_1$, $L_1$) is $D_{cusp}$. The point at which $D_{cusp}$ intersects the lightness axis is (0, $L_{cusp}$). $L_{cusp}$ always has a lightness value between the maximum lightness and the minimum lightness of the target gamut.

2. Determination of Chroma-Axis Anchor Value

The chroma-axis anchor value $C_{anchor}$ may be calculated using the weight information included in the metadata. The weight information may be transmitted in the metadata. More specifically, the chroma-axis anchor value may be calculated by multiplying the maximum chroma value $C_1$ of the target gamut, which is a narrow color gamut, by a weight.

$$C_{anchor} = \alpha \cdot C_1 \qquad \text{Equation 7}$$

Here, $C_{anchor}$ denotes an anchor value on the chroma axis, a denotes weight information included in the metadata, and C1 denotes the maximum chroma value of the narrow gamut.

Here, $0 < a < 1$.

The metadata may be the metadata described in FIGS. 11, 12, 13, and 16, and the details of the metadata will be described later with reference to FIGS. 25 to 43.

3. Determination of Lightness-Axis Anchor Value

The anchor point is set to belong to $D_{cuSp}$. Accordingly, once the straight line $D_{cusp}$ and $C_{anchor}$ are determined, the Y-axis coordinate value of the point $(C_{anchor}, L_{anchor})$ belonging to the straight line $D_{cusp}$ may be derived from an equation of a straight line.

In other words, the anchor point belongs to a straight line passing through $(C_1, L_1)$ and $(0, L_{cusp})$. Since the X coordinate value $C_{anchor}$ of the anchor point has been determined, $L_{anchor}$, which is the Y coordinate value of the anchor point, may be derived from the equation of the straight line connecting $(C_1, L_1)$ and $(0, L_{cusp})$ and the X coordinate value $C_{anchor}$.

Therefore, $L_{anchor}$ is derived from the equation of the straight line as follows.

$$L_{anchor} = \frac{(L_1 - L_{cusp}) \cdot C_{anchor}}{C_1} + L_{cusp} \qquad \text{Equation 8}$$

When $L_{cusp}$ is expressed with $L_1$, $C_1$, $L_2$, and $C_2$, $L_{cusp}$ is given as follows.

$$L_{cusp} = L_1 - \frac{(L_2 - L_1) \cdot C_1}{(C_2 - C_1)} \qquad \text{Equation 9}$$

Therefore, the value of the anchor point $(C_{anchor}, L_{anchor})$ may be summarized as follows.

$$C_{anchor} = \alpha \cdot C_1, \qquad \text{Equation 10}$$
$$L_{anchor} = \frac{(L_1 - L_{cusp}) \cdot C_{anchor}}{C_1} + L_{cusp}$$

where, $$0 < \alpha < 1,$$

$$L_{cusp} = L_1 - \frac{(L_2 - L_1) \cdot C_1}{(C_2 - C_1)}.$$

When the anchor point is set, region setting may be performed based on the anchor point.

In one embodiment, each gamut may be divided into four regions based on the anchor point.

When the anchor point is set, each gamut may be divided into four regions using straight line connecting two y-intercepts and the anchor point, and $(0, L_{cusp})$. Here, the y-intercepts may correspond to the maximum lightness value and the minimum lightness value that may be represented by the gamut. That is, a first y-intercept may be $L_{max}$, and a second y-intercept may be $L_{min}$. Each color gamut is divided into four regions.

These four regions may be denoted by a core region, a Cusp region, a constant L region, and a switch region. The respective regions are shown in the figure.

First, the core region is a region substantially identical to the invariant area in FIGS. 17 to 2. The core region may be defined as a triangular region surrounded by the straight line $D_{upper}$ connecting $(0, L_{max})$ and $(C_{anchor}, L_{anchor})$, the straight line $D_{bottom}$ connecting $(0, L_{min})$ and $(C_{anchor}, L_{anchor})$, and the lightness axis.

Then, the constant L region may be defined as a triangular region surrounded by the boundary of the core region, a straight lien Dconstant having a lightness value of Lcusp, and the boundaries of the respective gamuts.

Next, the Cusp region may be defined as a trianglular region that is surrounded by the boundary of the core region, a straight line $D_{cusp}$, and the boundaries of the respective gamuts and does not include the constant L region.

Next, the switch region may be defined as a quadrangular region surrounded by the straight line $D_{cusp}$, the straight line $D_{constant}$, the boundary of the core region, and the boundaries of the respective gamuts.

<Region Classification>

In color volume mapping, the color information remapping method differs among the four regions described above. Therefore, it is necessary to pre-determine a region to which color information $(L_{in}, C_{in})$ of the original gamut belongs. Since the straight lines D1 and D2 are given in the form of a function of $L = f(C)$, the region to which $(L_{in}, C_{in})$ belongs may be determined using a relation of $L_{in}$ and $f_{D1}(C_{in})$ or $f_{D2}(C_{in})$.

That is, the region to which $(L_{in}, C_{in})$ belongs may be determined using the following relations:

In the present embodiment, the region determination method may depend on the slope of $D_{cusp}$. That is, the region determination method may differ between a case where the slope of $D_{cusp}$ is positive and a case where the slope of $D_{cusp}$ is negative. The case where the slope of $D_{cusp}$ is positive may be expressed as $L_1(L_2) > L_{cusp}$, and the case where the slope of $D_{cusp}$ is negative may be expressed as $L_1(L_2) < L_{cusp}$.

The case where the slope of $D_{cusp}$ is positive will be described first.

As described above, the case where the slope of $D_{cusp}$ is positive may be expressed as $L_1(L_2) > L_{cusp}$ and may satisfy the following equation.

$$-\frac{L_2 - L_1}{C_2 - C_1} \times \frac{(L_1 - L_{w,t})}{C_1} < 0, \qquad \text{Equation 11}$$

where $L_{w,t}$ denotes lightness of white in the target gamut.

Figure 22:
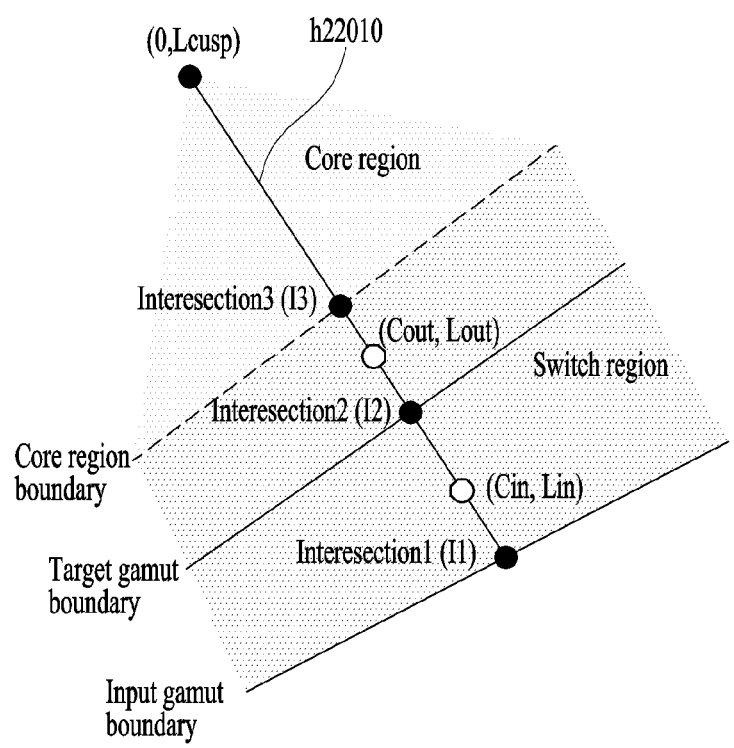
FIG. 22 is a detailed view illustrating a color information remapping operation in a switch region according to an embodiment of the present invention.

The example shown in FIG. 22 represents the case where the slope of $D_{cusp}$ is positive.

When the slope of $D_{cusp}$ is positive, the region to which $(L_{in}, C_{in})$ belongs may be determined using the following relations:

| | |
|---|---|
| $L_{in} < f_{Dupper}(C_{in})$ and $L_{in} > f_{Dbottom}(C_{in})$; | Core region: |
| $L_{in} > f_{Dbottom}(C_{in})$ and $L_{in} > f_{Dcusp}(C_{in})$; | Cusp region: |
| $L_{in} < f_{Dcusp}(C_{in})$ and $L_{in} > f_{Dconstant}(C_{in})$; | Switch region: |
| $L_{in} < f_{Dconstant}(C_{in})$. | Constant L region: |

Next, the case where the slope of $D_{cusp}$ is negative will be described.

As described above, the case where the slope of $D_{cusp}$ is negative may be expressed as $L_1(L_2)<L_{cusp}$, and may satisfy the following equation.

$$-\frac{L_2 - L_1}{C_2 - C_1} \times \frac{(L_1 - L_{w,t})}{C_1} < 0. \quad \text{Equation 12}$$

When the slope of $D_{cusp}$ is negative, the region to which $(L_{in}, C_{in})$ belongs may be determined using the following relations:

$L_{in} < f_{Dupper}(C_{in})$ & $L_{in} > f_{Dbottom}(C_{in})$;  Core region:

$L_{in} < f_{Dbottom}(C_{in})$ & $L_{in} < f_{Dcusp}(C_{in})$;  Cusp region:

$L_{in} > f_{Dcusp}(C_{in})$ & $L_{in} < f_{Dconstant}(C_{in})$;  Switch region:

$L_{in} > f_{Dconstant}(C_{in})$.  Constant L region:

The region classification operation described above may correspond to the invariant area determination operation of FIG. 12 and/or the core region determination operation and the mapping path determination operation (sh13059) of FIG. 13.

<Color Information Remapping>

For color information belonging to the core region, the color information of the original gamut is maintained. Since the core region is a region where the original information is to be maintained as much as possible, the color information remapping is not performed on the color information belonging to the core region.

Next, for color information that does not belong to the core region, the color information of the original gamut is mapped to the color information of the target gamut. Here, the mapping may be performed according to the mapping functions of the corresponding regions. That is, in the cusp region, a mapping function corresponding to the cusp region may be applied. In the switch region, a mapping function corresponding to the switch region may be applied. In the constant L region, a mapping function corresponding to the constant L region may be applied.

In a specific embodiment, color information remapping may be performed in the cusp region, the switch region, and the constant L region as follows.

1. Cusp Region

For color information belonging to the Cusp region, the color information is remapped along a straight line parallel to the cusp straight line $D_{cusp}$. Referring again to FIG. 21, in the Cusp region, color information remapping is performed in the direction indicated by arrows h21010. As a result, the color information belonging to the Cusp region of the original gamut is mapped between the core region and the boundary of the target gamut.

2. Switch Region

For color information belonging to the switch region, the color information is remapped toward $(0, L_{cusp})$. Referring again to FIG. 21, in the switch region, color information remapping is performed along arrows h21050. As a result, the color information belonging to the switch region of the original gamut is mapped between the core region and the boundary of the target gamut.

3. Constant L Region

For color information belonging to the constant L region, the color information is remapped with the lightness maintained. In other words, the color information belonging to the constant L region is remapped along a straight line parallel to $D_{constant}$. Referring again to FIG. 21, in the constant L region, color information remapping is performed along arrows h21050. As a result, the color information belonging to the constant L region of the original gamut is mapped between the core region and the boundary of the target gamut.

Here, the straight line used for color information remapping (the straight lines in the directions indicated by arrows in the respective regions) may be referred to as mapping lines.

The color information remapping operation may include intersection calculation, mapping function determination operation, and remapping. The color information remapping operation will be described in more detail in the embodiment of FIG. 22 below. Here, the color information remapping operation may correspond to the color information remapping operation (sh12504, sh13054) of FIG. 12 and/or FIG. 13. The intersection calculation, the mapping function determination, and the remapping, which are the specific operations of the color information remapping operation, may correspond to the intersection calculation operation (sh13056), the mapping function determination operation (sh13057), and the remapping operation sh13058) of FIGS. 12 and 13, respectively.

FIG. 22 is a detailed view illustrating a color information remapping operation in a switch region according to an embodiment of the present invention.

Hereinafter, the intersection calculation operation, the mapping function determination operation, and the remapping operation in the switch region will be sequentially described with reference to FIG. 22.

First, when color information $(C_{in}, L_{in})$ of the original color gamut is selected, a straight line h22010 connecting $(C_{in}, L_{in})$ and $(0, L_{cusp})$ is determined.

Once the straight line h22010 connecting $(C_{in}, L_{in})$ and $(0, L_{cusp})$ is determined, intersections may be calculated. Here, three intersections are determined, and the coordinate values of the intersections may be calculated using two equations of straight lines.

A first intersection (Intersection1 (I1)) may mean an intersection of the determined straight line h22010 and the boundary of the original gamut (input gamut boundary).

A second intersection (Intersection2 (I2)) may mean an intersection of the determined straight line h22010 and the boundary of the target gamut (target gamut boundary).

A third intersection (Intersectione3 (I3)) may mean an intersection of the determined straight line h22010 and the boundary of the core region (core region boundary)

Once these intersections are determined, the coordinates of the intersections may be calculated using two equations of straight lines.

The color information coordinates $(C_{out}, L_{out})$ to be mapped may be calculated using the relationship between the color information coordinates $(C_{in}, L_{in})$ of the original gamut and the intersections. Specifically, the relationship between $(C_{in}, L_{in})$ present between the first intersection and the second intersection, and $(C_{out}, L_{out})$ present between the second intersection and the third intersection may be represented by a function. In this case, the relationship between $(C_{in}, L_{in})$ present between the first intersection and the second intersection, and $(C_{out}, L_{out})$ present between the second intersection and the third intersection may be represented by a linear function, a power function, or the like. The type and/or parameter values of the function may be included in metadata. The metadata may be the metadata described in FIGS. 11, 12, 13, and 16, and the details of the metadata will be described later with reference to FIGS. 25 to 43.

Once the intersections and the function representing the relationship between the color information coordinates of the original gamut and the color information coordinates to be mapped are determined, the color information coordinates of the original gamut may be remapped to the target gamut. Here, the function representing the relationship between the color information coordinates of the original gamut and the color information coordinates to be mapped may be determined through the type of the function and/or the values of parameters.

As a specific example of the function used for color information remapping, the linear function and the power function are given as follows.

First, the linear function may be represented as follows.

$$\text{out} = \frac{(\text{in} - I3) \cdot (I2 - I3)}{(I1 - I3)} + I3 \qquad \text{Equation 13}$$

Herein, 'out' denotes (Cout, Lout), 'in' denotes ($C_{in}$, $L_{in}$), and I1, I2 and I3 denote the first intersection, the second intersection and the third intersection, respectively. When the equation above is applied to each of the X coordinate and the Y coordinate, the color information coordinates ($C_{out}$, $L_{out}$) of the target gamut to which the color information coordinates ($C_{in}$, $L_{in}$) of the original gamut are to be remapped may be calculated.

Next, the power function may be expressed as follows.

$$\text{out} = (I2 - I3) \cdot \left( \frac{(\text{in} - I3)}{(I1 - I3)} \right)^\gamma + I3 \qquad \text{Equation 14}$$

Herein, 'out' denotes ($C_{out}$, $L_{out}$), 'in' denotes ($C_{in}$, $L_{in}$), and I1, I2 and I3 denote the first intersection, the second intersection and the third intersection, respectively. In addition, r denotes the exponent of the power function. When the equation above is applied to each of the X coordinate and the Y coordinate, the color information coordinates ($C_{out}$, $L_{out}$) of the target gamut to which the color information coordinates ($C_{in}$, $L_{in}$) of the original gamut are to be remapped may be calculated.

<Inverse Color Space Conversion>

When the color information remapping is completed, inverse color space conversion is performed to return the signal to a state in which the information can be represented on the display. That is, the signal converted into three-dimensional axes of lightness and hue is converted into an RGB signal so as to be represented on the display. Here, the information used for inverse color space conversion may be included in the metadata. The metadata may be the metadata described in FIGS. 11, 12, 13, and 16, and the details of the metadata will be described later with reference to FIGS. 25 to 43. The inverse color space conversion corresponds to the inverse color space conversion described in FIG. 18.

FIGS. 23 and 24 are reference views illustrating the advantages of a color volume mapping method according to another embodiment of the present invention.

FIG. 23 shows a comparative example of chroma inversion that may occur when $D_{cusp}$ is parallel to the mapping path.

Referring to FIG. 23, the upper part of FIG. 23 shows a color obtained by mapping along a path parallel to $D_{cusp}$ and gamut conversion in comparison with the original color. Compared to the original color, the color obtained by mapping along the path parallel to $D_{cusp}$ and gamut conversion undergoes chroma inversion. In can be seen that the right side of the color obtained by mapping along the path parallel to $D_{cusp}$ and gamut conversion is lower in chroma than the left thereof (chroma inversion).

In order to maintain the contrast of the original content, the lightness information for the mapping point needs to be maintained. However, in order to maintain the maximum chroma value C. of the input gamut in the target gamut, the other paths need to be determined based on the mapping path of the straight line $D_{cusp}$. If all paths are determined so as to be parallel to $D_{cusp}$ as shown in FIG. 23, chroma inversion may occur in a specific color. In particular, referring to the lower part of FIG. 23, it can be seen that, as a result of mapping of ($C_{in}$, $L_{in}$), the maximum chroma value $C_{max}$ may be maintained, but the relationship of $C_{in} > C_t$ in the original gamut is changed to $C_{out} < C_t$ after the mapping. The upper part of FIG. 23 presents the color coordinates at which chroma inversion occurs in the lower part of FIG. 23. In the original color, the chroma has the greatest value on the rightmost side and gradually decreases to the left side. In the color after the mapping, on the other hand, the chroma has the greatest value in the fourth step from the right side.

According to the color volume mapping method according to another embodiment of the present invention, the chroma inversion may be prevented by dividing the regions and setting a new mapping path. The color volume mapping method according to the embodiment described above may be summarized as follows.

The color information belonging to the Cusp region is mapped between the target gamut and the core region along the straight line that passes through ($C_{in}$, $L_{in}$) and is parallel to $D_{cusp}$.

The color information belonging to the switch region is mapped between the target gamut and the core region boundary along the straight line connecting ($C_{in}$, $L_{in}$) and (0, $L_{cusp}$).

For the color information belonging to the constant L region, only chroma information is mapped between the target gamut and the core region boundary with the lightness information maintained.

Remapping may be performed using the positional relationship between the points at which the input gamut, target gamut, and the boundary of the core region meet along each path, and the points to be mapped.

Next, FIG. 24 shows a result of removing the chroma inversion according to the color volume mapping according to the embodiment of the present invention.

FIG. 24 shows a gamut-converted color in comparison with the original color. It can be seen form FIG. 24 that the chroma inversion effect is eliminated in the gamut-converted color.

Embodiment of Metadata

The above-described metadata may be provided in the form of a descriptor or an information table described below. In one embodiment, the metadata may be metadata delivered from the image production side, the image conversion side, or the transmitting side. That is, the metadata may be signaled as additional information about the image. In another embodiment, the metadata may be generated after the receiver or image conversion unit analyzes the characteristics of the image.

Such metadata may be defined and signaled at the video level, the system level, and/or the service level. Here, examples of the video level may include SEI, PPS, SPS, and VPS of codecs such as HEVC and AVC. Examples of the system level may include PMT, DASH, and ISO BMFF. Examples of the service level may include DVB and ATSC EIT.

In addition, the metadata may be formatted in a format suitable for production, post production, broadcasting, storage media, and information delivery between devices.

Hereinafter, a case where the metadata is provided in the form of a descriptor and the descriptor is defined at the video level will be described as an example. However, the metadata described in the present invention is not limited to the descriptor form, and the level to which the information belongs is not limited to the video level. The metadata described below may be metadata generated or used by the transmitter and/or receiver described above with reference to FIGS. 11 to 16.

FIG. 25 is a view showing an SEI message according to an embodiment of the present invention.

A color volume mapping descriptor according to an embodiment of the present invention may be delivered in the form of a Supplemental Enhancement Information (SEI) message defined in the video codec. In this case, the SEI message may be transmitted to the HEVC NAL Unit. The nal_unit_type of the NAL_Unit may have a value corresponding to PREFIX_SEI_NUT or SUFFIX_SEI_NUT.

The SEI message according to an embodiment of the present invention has a predetermined value as a payload type. Here, the SEI payload may include color_volume_mapping_info.

As shown in the figure, the color_volume_mapping_info( ) included in the SEI payload may include parameter information as shown in the lower part of the figure.

The information of cvm_cancel_flag may indicate whether or not the previously transmitted information is used. In one embodiment, when cvm_cancel_flag is 1, it may indicate that the same kind of previously transmitted information (e.g., an SEI message with the same payload type) is not used.

The cvm_persistence_flag information may indicate whether to continue to use the information transmitted via the current SEI message. In one embodiment, cvm_persistence_flag may be used as follows. If cvm_persistence_flag is 0, this may idnciate that the information defined in color_volume_mapping( ) which is the following information, is applied only to the current image. If cvm_persistence_flag is 1, this may indicate that the information defined in color_volume_mapping( ) which is the following information, is applied not only to the current image in output picture order but also to subsequent images.

color_volume_mapping( ) h25010 may refer to a color volume mapping descriptor according to various embodiments of the present invention.

FIG. 26 is a view showing a color volume mapping descriptor according to an embodiment of the present invention.

A color volume mapping descriptor according to the embodiment may include original_color_gamut_type, target_color_gamut_type, RGBWL_primaries( ) color_space_type, color_space_conversion_flag, Color_gamut_boundary_info( ) hue_correction_type, hue_correction_info( ), color_space_conversion_function( ) number_of_regions, region_boundary_Info( ), mapping_function_type, and mapping_function_info.

original_color_gamut_type may indicate the gamut of the original content. For the gamut of the original content, the gamut information may be provided through a predefined standard. If there is no predefined standard, the gamut information may be provided through RGBW_primaries( ) defined by the user. The peak luminance values defined in RGBW_primaries( ) may be used as information for XYZ tristimulus value conversion and color space conversion.

FIG. 27 is a view showing original_color_gamut_type and target_color_gamut_type according to an embodiment of the present invention.

Referring to FIG. 27, gamut information according to original_color_gamut_type is shown in the upper part of the figure. If original_color_gamut_type==0110, the gamut information may be provided through RGBW_primaries( ) defined by the user.

Referring again to FIG. 26, target_color_gamut_type may indicate a target gamut, a display gamut, or a legacy gamut. For the target gamut, the gamut information may be provided through a predefined standard. If there is no predefined standard, the gamut information may be provided through RGBW_primaries( ) defined by the user. The peak luminance values defined in RGBW_primaries( ) may be used as information for XYZ tristimulus value conversion and color space conversion.

Referring back to FIG. 27, gamut information according to target_color_gamut_type is shown in the lower part of the figure. If target_color_gamut_type==0110, the gamut information may be provided through RGBW_primaries( ) defined by the user.

Referring again to FIG. 26, RGBWL_primaries( ) may indicate a color gamut. RGBWL_primaries( ) may be used in defining the original gamut and/or the target gamut. RGBWL_primaries( ) may also be used in defining an un-standardized gamut or delivering color volume information including lightness information, or when it is necessary to further define lightness information in addition to a standardized gamut. In addition, according to an embodiment, RGBWL_primaries( ) may be used to indicate container/content/display color gamut/volume information for color volume mapping. In one embodiment, color primaries and a luminance range may be used to configure a color volume. A color gamut may be converted into CIEXYZ using the peak luminance and the coordinate values of each primary color, and the converted CIEXYZ values can be used for conversion into a three-dimensional color space for gamut mapping. As a method for representing the color volume, not only the embodiment described above but also a more complicated method such as representing a gamut according to a lightness range may be used.

A more specific embodiment of RGBWL_primaries( ) will be described with reference to FIG. 29.

Referring again to FIG. 26, color_space_type may indicate the type of a color space for color space conversion. The color space conversion refers to color space conversion that is used in converting color information into a three-dimensional color space composed of lightness and color axes for color gamut volume mapping.

FIG. 28 is a view showing color_space_type according to an embodiment of the present invention.

Referring to FIG. 28, color spaces according to color_space_type are listed.

Referring again to FIG. 26, color_space_conversion_flag may indicate presence or absence of color_gamut_boundary_info( ) In one embodiment, if color_space_conversion_ flag is 1, this may indicate that color_gamut_boundary_ info( ) is present.

color_space_conversion_function( ) may be used to convert given gamut information into a three-dimensional color space. Each coefficient may vary depending on the value delivered from color_space_type. A more specific embodiment of color_space_conversion_function( ) will be described with reference to FIG. 30.

color_gamut_boundary_info( ) may provide a parameter for defining the volume boundary of the original gamut and/or the volume boundary of the target gamut in a three-dimensional color space, through the data obtained from the gamut information and the color space conversion information.

color_gamut_boundary_type may indicate a method for defining a three-dimensional gamut volume boundary. As described above, in order to map, to the legacy gamut, the out-of-gamut information in the color information converted into the three-dimensional space, the boundaries of the content gamut (input gamut) and the legacy gamut should be defined. In one embodiment, as a method for defining a gamut volume boundary in three dimensions, an input anchor point (e.g., the hue angle, chroma, lightness values of RGBCMY) may be used as a reference and the other boundary values may be defined through linear interpolation based on the input anchor point. In another embodiment, as a method for defining a gamut volume boundary in three dimensions, a pre-input boundary value for each lightness level may be used to calculate the other values. In yet another embodiment, as a method for defining a gamut volume boundary in three dimensions, a look-up table (LUT) may be used.

In one embodiment, color_gamut_boundary_type may be included in color_gamut_boundary_info( ).

A more specific embodiment of color_gamut_boundary_ info( ) and color_gamut_boundary_type will be described with reference to FIG. 31.

hue_correction_info( ) may provide a parameter for defining a hue correction method. When the hue angle of the primary and secondary colors differs between the original gamut and the target gamut after the color space is converted into a three-dimensional space, hue correction needs to be performed to accurately represent the color information of the original gamut in the target gamut. hue_correction_function_info( ) may provide information for defining a hue correction method for accurately representing the color information of the original gamut in the target gamut.

hue_correction_type may indicate the type of hue correction. To minimize chroma inversion in gamut mapping, the peak chroma should be on the same line for all hue angles. In a non-uniform color space, which may have cognitively or visually different colors at the same hue angle, the hue may be shifted by applying different weights rather than at the same rate in the hue correction. For example, as a type of hue correction, the hue angles may be corrected based on given anchor points using an interpolation method. The hue angles may be corrected using a look-up table (LUT). A more specific embodiment of hue_correction_type will be described with reference to FIGS. 32 and 41.

In one embodiment, hue_correction_type may be included in hue_correction_info( ).

A more specific embodiment of hue_correction_info( ) and hue_correction_type will be described with reference to FIG. 32.

number_of_regions may indicate the number of regions which differ in the mapping method.

region_boundary_info( ) may provide information for defining a hue region for which color gamut mapping is to be performed in a three-dimensional color volume. A type of representation of regions in the hue plane may be defined according to region_boundary_type, which will be described later. More specifically, region_boundary_info( ) may provide information for defining the invariant area or the core region in the three-dimensional color volume.

region_boundary_type may indicate the type of representation of the regions in the hue plane. In one embodiment, the region representation type may define regions in the hue plane using lightness information and chroma boundary information in the constant_hue plane and a corresponding distance ratio alpha. In another embodiment, the region representation type may define regions in the hue plane in a triangular shape or a shape set by the user based on any two neutral points in an inner gamut (narrow gamut). In yet another embodiment, the region representation type may define the regions in the hue plane through region coordinates. More specifically, region_boundary_type may indicate a type defining the invariant area or the core region in the hue plane.

In one embodiment, region_boundary_type may be included in region_boundary_info( ).

A more specific embodiment of region_boundary_info( ) and region_boundary_type will be described with reference to FIG. 33.

mapping_function_info( ) may indicate a method for mapping the outer gamut (wide gamut) to the inner gamut (narrow gamut). There may be various functions for color information remapping, which may be represented by a linear function or an nth-order polynomial.

mapping_function_type may indicate the type of a function to be used in mapping_function_info( ) As described above, the type of the function in mapping_function_info( ) varies according to mapping_function_type. Depending on the type of the function, the relationship between input and output may be defined.

In one embodiment, mapping_function_type may be included in mapping_function_info( ).

A more specific embodiment of mapping_function_info ( ) and mapping_function_type will be described with reference to FIG. 34.

FIG. 29 is a view showing syntax of RGBWL_primaries ( ) according to an embodiment of the present invention.

RGBWL_primaries( ) may be used in defining the original gamut and/or the target gamut. It is used as described above.

RGBWL_primaries( ) according to the embodiment may include color_primary_r_x, color_primary_r_y, color_primary_g_x, color_primary_g_y, color_primary_b_x, color_primary_b_y, white_point_x, white_point_y, and white_peak_luminance_Y.

Here, color_primary_r_x, color_primary_r_y, color_primaryg_x, color_primaryg_y, color_primary_b_x, and color_primary_b_y may denote the coordinates of the RGB primary, and may indicate the coordinate values (x, y) of red (r), green (g), and blue (b) in the CIE1931 chromaticity diagram.

white_point_x and white_point_y may denote the coordinates of the white point and may indicate the coordinate values (x, y) of the white point in the CIE1931 chromaticity diagram.

white_peak_luminance_Y may indicate the peak luminance of white of the original gamut or the target gamut. Conversion into CIEXYZ may be performed using the peak luminance and the coordinate values of each primary color.

The converted CIEXYZ values may be used for conversion into a three-dimensional color space for gamut mapping.

FIG. 30 is a view showing syntax of color_space_conversion_function( ) according to an embodiment of the present invention.

color_space_conversion_function( ) according to the embodiment includes number_of_coeff and color_space_conversion_coeff[i].

number_of_coeff may indicate the number of coefficients used for color space conversion. For example, when color space conversion is performed using the information of red, green, and blue, which are the primary colors, the coefficients are given in the form of a 3×3 matrix, and therefore number_of_coeff is 9.

color_space_conversion_coeff[i] may indicate the coefficient values of a matrix constituted according to number_of_coeff.

FIG. 31 is a view showing syntax of color_gamut_boundary_info( ) and color_gamut_boundary_type according to an embodiment of the present invention.

color_gamut_boundary_info( ) according to the embodiment may include color_gamut_boundary_type, number_of_ points, hue_index, chroma_index, lightness_index, number_of_step_size, a_index, b_index, LUT_type, and LUT_info( ).

More specifically, color_gamut_boundary_info( ) according to the embodiment includes number_of_points, hue_index[i], chroma_index[i], and lightness_index[i], includes number_of_step_size, number_of_points, lightness_index [i] [j], a_index[i] [j], and b_index[i][j], or includes LUT_type and LUT_info( ) depending on the value of color_gamut_boundary_type.

As described above, color_gamut_boundary_type may indicate a method for defining a three-dimensional gamut volume boundary. When color_gamut_boundary_type is 0000, linear interpolation may be performed based on the anchor point for a boundary to derive the other boundary values, thereby defining the gamut volume boundary. When color_gamut_boundary_type is 0001, the gamut volume boundary may be defined using the convex hull method. When the color_gamut_boundary_type is 0010, the color_gamut boundary may be defined by a value represented through the look-up table (LUT). When color_gamut_boundary_type is 0011, the color_gamut boundary may be defined according to the method defined by the user.

number_of_points may indicate the number of points for defining the boundary of a chrominance component for each step of each lightness level.

hue_index may indicate hue information after conversion into a three-dimensional color space.

chroma_index may indicate chroma information after conversion into the three-dimensional color space.

lightness_index may indicate lightness information after conversion into the three-dimensional color space.

number_of_step_size may indicate the number of steps of a lightness level for defining a color gamut volume in a color space in which the lightness component and the chrominance component can be represented separately.

a_index may indicate information corresponding to redness-greenness among the chrominance components after conversion into the three-dimensional color space.

b-index may indicate information corresponding to yellowness-blueness among the chrominance components after conversion into the three-dimensional color space.

LUT_type and LUT_info( ) may indicate the type of the look-up table and the information provided through the look-up table, respectively. An embodiment of LUT_type and LUT_info( ) will be described with reference to a drawing.

FIG. 32 is a view showing syntax of hue_correction_info ( ) and hue_correction_type according to an embodiment of the present invention.

hue_correction_info( ) according to the embodiment may include hue_correction_type, number_of_points, original_hue_index, target_hue_index, hue_coeff, LUT_type, and LUT_info( ).

More specifically, hue_correction_info( ) according to the embodiment may include number_of_points, original_hue_index[i], and target_hue_index[i], include number_of_points, original_hue_index[i], target_hue_index[i], and hue_coeff[i], or include LUT_type and LUT_info( ) depending on the value of hue_correction_type.

As described above, hue_correction_type may indicate the type of hue correction. When hue_correction_type is 0001 or 0010, the other hue angles may be derived using given anchor points. More specifically, when hue_correction_type is 0001, the other hue angles may be derived by performing linear interpolation based on given anchor points. When hue_correction_type is 0010, the other hue angles may be derived by applying the nth order function based on the given anchor points. When hue_correction_type is 0011, hue correction may be performed using a look-up table.

number_of_points may indicate the number of anchor points for hue correction.

original_hue_index may indicate hue angle information about the primary colors and the secondary colors in the three-dimensional color space of the original content.

target_hue_index may indicate hue angle information about the primary colors and the secondary colors in the three-dimensional color space of the target content.

hue_coeff may be a parameter value for non-linearly correcting the hue angle between the anchor points set for hue correction.

LUT_type and LUT_info( ) may indicate the type of the look-up table and the information provided through the look-up table, respectively. An embodiment of LUT_type and LUT_info( ) will be described with reference to a drawing.

FIG. 33 is a view showing syntax of region_boundary_info( ) and region_boundary_type according to an embodiment of the present invention.

Region_boundary_info( ) according to the embodiment may include region_boundary_type, chroma_index, lightness_index, alpha, intercept_upper, intercept_bottom, vertex_point_chroma, number of points, x_index, and y_index.

More specifically, the region_boundary_info( ) according to the embodiment may include chroma_index, lightness_index, and alpha, include intercept_upper, intercept_bottom, vertex_point_chroma, and alpha, or include number of points, x_index, and y_index, depending on the value of region_boundary_type.

As described above, region_boundary_type may indicate the type of representation of the regions in the hue plane. When region_boundary_type is 0001, regions in the hue plane may be defined using lightness information and chroma boundary information in the constant_hue plane and a corresponding distance ratio alpha. When region_boundary_type is 0010, regions in the hue plane may be defined in a triangular shape or a shape set by the user based on any two neutral points in an inner gamut (narrow gamut). When region_boundary_type is 0011, the regions in the hue plane may be defined through region coordinates.

choma_index may indicate the coordinate values of a chroma component positioned at the color volume boundary in the three-dimensional color space.

lightness_index may indicate the coordinate values of a lightness component positioned at the color volume boundary in the three-dimensional color space.

intercept_upper may indicate the coordinate values of a point positioned on the lightness axis to set the invariant area or core region. intercept_upper may indicate a lightness value close to white.

intercept_bottom indicate the coordinate values of a point positioned on the lightness axis to set a region (e.g., the invariant area or core region). intercept_bottom may indicate a lightness value close to black.

vertex_point_chroma may indicate the chroma having the greatest value in the constant_hue plane among the boundary values corresponding to the inner gamut.

Alpha may indicate a weight for setting the invariant area or core region in a predefined chroma_index, lightness_index, or vertex_point_chroma value.

number_of_points may indicate the number of points for region setting.

x_index may indicate the x-axis coordinates for region setting.

y_index may indicate the y-axis coordinate for region setting.

FIG. 34 is a view showing syntax of mapping_function_info( ) and mapping_function_type according to an embodiment of the present invention.

mapping_function_info( ) according to the embodiment of the present invention may include mapping_function_type, gain, offset, coeff_n, LUT_type and LUT_info( ).

More specifically, mapping_function_info( ) according to the embodiment may include gain and offset, include gain, offset, and coeff_n, or include LUT_type and LUT_info( ) depending on mapping_function_type, depending on mapping_function_type.

mapping_function_type may indicate the type of a function to be used in mapping_function_info( ) The color information present in the outer gamut needs to be remapped to the inner gamut. Various types of functions may be used for color information remapping. Different types of functions may be applied to the respective regions to maximize the content delivery effect. When mapping_function_type is 0x00, the color information remapping may be performed using a linear function. When mapping_function_type is 0x01, the color information remapping may be performed using an nth order function. When mapping_function_type is 0x02, the color information remapping may be performed by applying a given look-up table.

Gain and offset may indicate the coefficients of a function to be used for color information remapping. That is, gain may indicate the slope of the function to be used for color information remapping, and offset may indicate the offset of the function to be used for color information remapping.

coeff_n may indicate the order of the n-th order nonlinear function.

In the lower part of FIG. 34, the relationship between input (in) and output (out) according to the function type (linear function or nonlinear function) is exemplarily defined.

LUT_type and LUT_info( ) may indicate the type of the look-up table and the information provided through the look-up table, respectively. An embodiment of LUT_type and LUT_info( ) will be described with reference to FIG. 35.

FIG. 35 is a view showing syntax of LUT_info( ) and LUT_type according to an embodiment of the present invention.

LUT_info( ) according to the embodiment of the may include entry_length, in_value, and out_value.

LUT_info( ) may provide information related to the look-up table. LUT_info( ) may be a database of the mapping relationship of input data and output data. LUT_info( ) may indicate a mapping type according to LUT_type, and the LTU may be a one-dimensional LUT or a 3D LUT depending on the LUT_type.

entry_length may indicate the size of the whole look-up table (LUT) or the number of data.

in_value may indicate input data to be mapped out_value may indicate output data to be mapped to the input data.

LUT_type may indicate the type of the look-up table (LUT). In one embodiment, the LUT may be a table that matches all input values with output values on a one-to-one basis. In this embodiment, since all the input/output data are matched on a one-to-one basis, the output data value may be derived quickly without any additional calculation. In another embodiment, the LUT may match input values with output values only for given reference point(s), and the other data may be derived through an operation such as interpolation. In this embodiment, only a part of input/output data needs to be matched and stored, and therefore the amount of data to be transmitted/stored may be reduced.

In one embodiment, LUT_type may be included in LUT_info( ).

FIG. 36 is a view showing a color volume mapping descriptor according to another embodiment of the present invention.

A color volume mapping descriptor according to the embodiment may include source_color_gamut_type, target_color_gamut_type, RGBWL_primaries( ) mapping_color_space_type, forward_color_space_conversion_flag, backward_color_space_conversion_flag, color_space_conversion_function( ) source_gamut_boundary_info_flag, color_gamut_boundary=info( ) target_gamut_ boundary_info_flag, hue_correction_info( ) num_of_hue, hue_component, number_of_hue_region, hue_region_type, hue_region_info( ) mapping_function_ type, and mapping_function_info( ).

source_color_gamut_type may indicate the gamut of the original content. For the gamut of the original content, the gamut information may be provided through a predefined standard. If there is no predefined standard, the gamut information may be provided through RGBW_primaries( ) defined by the user. The peak luminance values defined in RGBW_primaries( ) may be used as information for XYZ tristimulus value conversion and color space conversion.

source_color_gamut_type may indicate substantially the same information as original_color_gamut_type included in the color volume mapping descriptor according to the previous embodiment of the present invention described above.

In a more specific embodiment of source_color_gamut_type, original_color_gamut_type of FIG. 27 described above may be applied.

target_color_gamut_type may indicate a target gamut, a display gamut, or a legacy gamut. For the target gamut, the gamut information may be provided through a predefined standard. If there is no predefined standard, the gamut information may be provided through RGBW_primaries( ) defined by the user. The peak luminance values defined in RGBW_primaries( ) may be used as information for XYZ tristimulus value conversion and color space conversion.

In a more specific embodiment of target_color_gamut_type, target_color_gamut_type of FIG. 27 described above may be applied.

RGBWL_primaries( ) may indicate a color gamut. RGBWL_primaries( ) may be used in defining the original gamut and/or the target gamut. RGBWL_primaries( ) may also be used in defining an un-standardized gamut or delivering color volume information including lightness information, or when it is necessary to further define lightness information in addition to a standardized gamut. In addition, according to an embodiment, RGBWL_primaries( ) may be used to indicate container/content/display color gamut/volume information for color volume mapping. In one embodiment, color primaries and a luminance range may be used to configure a color volume. A color gamut may be converted into CIEXYZ using the peak luminance and the coordinate values of each primary color, and the converted CIEXYZ values can be used for conversion into a three-dimensional color space for gamut mapping. As a method for representing the color volume, not only the embodiment described above but also a more complicated method such as representing a gamut according to a lightness range may be used.

A more specific embodiment of RGBWL_primaries( ) will be described with reference to FIG. 38.

mapping_color_space_type may indicate the type of a color space for color space conversion. The color space conversion refers to color space conversion that is used in converting color information into a three-dimensional color space composed of lightness and color axes for color gamut volume mapping. mapping_color_space_type may be another embodiment of color_space_type included in the color volume mapping descriptor according to the previous embodiment of the present invention described above.

FIG. 37 is a view showing mapping_color_space_type according to an embodiment of the present invention.

Referring to FIG. 37, color spaces according to mapping_color_space_type are listed.

Referring again to FIG. 36, forward_color_space_conversion_info_flag may indicate presence or absence of color_gamut_boundary_info( ) More specifically, forward_color_space_conversion_info_flag may indicate whether there is information for conversion from an input color space into a color space designated by mapping_color_space_type. In one embodiment, if forward_color_space_conversion_flag is 1, this may indicate that color_gamut_boundary_info( ) is present.

backward_color_space_conversion_info_flag may indicate presence or absence of color_gamut_boundary_info( ) More specifically, backward_color_space_conversion_info_flag may indicate whether there is information for conversion from the color space designated by mapping_color_space_type into the input color space. In one embodiment, if backward_color_space_conversion_flag is 1, this may indicate that color_gamut_boundary_info( ) is present.

If the color space is converted into a color space different from the color space designated by mapping_color_space_type after the gamut conversion, additional signaling for indicating the color space after the gamut conversion may be further needed.

color_space_conversion_function( ) may be used to deliver specific information for converting the given gamut information into a three-dimensional color space. Each coefficient may vary depending on the value delivered from mapping_color_space_type. A more specific embodiment of color_space_conversion_function( ) will be described with reference to FIG. 39.

source_gamut_boundary_info_flag may indicate presence or absence of color_gamut_boundary_info( ) More specifically, source_gamut_boundary_info_flag may indicate presence or absence of color_gamut_boundary_info( ) related to the source. In one embodiment, if source_gamut_boundary_info_flag is 1, this may indicate that color_gamut_boundary_info( ) is present.

target_gamut_boundary_info_flag may indicate presence or absence of color_gamut_boundary_info( ) More specifically, the target_gamut_boundary_info_flag may indicate presence or absence of color_gamut_boundary_info( ) related to the target. In one embodiment, if target_gamut_boundary_info_flag is 1, this may indicate that color_gamut_boundary_info( ) is present.

color_gamut_boundary_info( ) may provide a parameter for defining the volume boundary of the original gamut and/or the volume boundary of the target gamut in a three-dimensional color space, through the data obtained from the gamut information and the color space conversion information. In other words, color_gamut_boundary_info( ) may indicate the source/target color gamut in the color space defined by mapping_color_space_type, which may be provided as information that is distinguished from source_color_gamut_type and/or target_color_gamut_type. In this case, the color gamut boundary may be distinguished by the color space, and may be classified according to the information to be presented, such as container/content, or according to the level of detail of information required at the stage of using the information. A more specific embodiment of color_gamut_boundary_info( ) will be described with reference to FIG. 40.

hue_correction_info( ) may be information provided to correct the hue of the source and the target. hue_correction_info( ) may indicate information corresponding to hue_correction_function_info( ) included in the color volume mapping descriptor according to the above-described embodiment of the present invention. A more specific embodiment of hue_correction_info( ) will be described with reference to FIG. 41.

num_of_hue may indicate the number of hues to represent. In one embodiment, the maximum value of number_of_hue may be 1023. If the number_of_hue is 1023 (the maximum value), the hue angle may be uniformly represented in units of 1 degree (from 0 to 359 degrees). If number_of_hue is 1022, the case may be defined as RGB-CMY. If number_of_hue is 1021, the case may be defined as RGB. In this way, a specific case may be defined using num_of hue.

hue_component may indicate a hue sample value for delivering different information. If hue_component is a hue angle, the hue angle may be represented in units of 1 degree. In one embodiment, the maximum value of hue_component may be 1023. The maximum value of hue_component may indicate a case where the hue value is not used (e.g., a case where the order or characteristics of regions as in region_boundary_type==0100 or 0101), and number_of_hue may be fixed to number_of_hue=1. In one embodiment, a value of the hue angle greater than or equal to 360 may be regarded as meaningless information.

number_of_hue_region indicates the number of hue regions currently defined by hue_component through the hue/chroma/lightness classification. When the color volume mapping method described above is used, the area in the constant-hue-angle-plane may be divided into four regions.

number_of_hue_region may indicate substantially the same information as number_of_regions included in the color volume mapping descriptor according to the above-described embodiment of the present invention.

hue_region_info( ) may provide information for defining a hue region for which color gamut mapping is to be performed in a three-dimensional color volume. A type of representation of regions in the hue plane may be defined according to hue_region_type, which will be described later.

hue_region_type may indicate the type of representation of the regions in the hue plane. The hue_region_type may also indicate that the hue regions are distinguished in order, or that the hue regions are distinguished according to the method of representing the hue regions. In one embodiment, the region representation type may define regions in the hue plane using lightness information and chroma boundary information in the constant_hue plane and a corresponding distance ratio alpha. In another embodiment, the region representation type may define regions in the hue plane in a triangular shape or a shape set by the user based on any two neutral points in an inner gamut (narrow gamut). In yet another embodiment, the region representation type may define the regions in the hue plane through region coordinates. When hue_region_type indicates that the hue regions are divided according to the order of the regions, j ranging to number_of_hue_regions[i] may be used as the order of the regions. When hue_region_type indicates that the hue regions are divided according to the hue region characteristics, the order of the regions may be predefined (e.g., the order according to the degree of change of chroma/lightness by mapping) or the characteristics may be distinguished by mapping_function_type.

In one embodiment, hue_region_type may be included in hue_region_info( ).

A more specific embodiment of hue_region_info( ) and hue_region_type will be described with reference to FIG. 42.

mapping_function_info( ) may indicate a method for mapping the outer gamut (wide gamut) to the inner gamut (narrow gamut). There may be various functions for color information remapping, which may be represented by a linear function or an nth-order polynomial. In particular, when the constant-hue-angle-plane is divided into a plurality of regions, mapping_function_info( ) may provide information for remapping in different method for the respective region.

mapping_function_type may indicate the type of a function to be used in mapping_function_info( ) As described above, the type of the function in mapping_function_info( ) varies according to mapping_function_type. Depending on the type of the function, the relationship between input and output may be defined.

In one embodiment, mapping_function_type may be included in mapping_function_info( ).

A more specific embodiment of mapping_function_info ( ) and mapping_function_type will be described with reference to FIG. 43.

FIG. 38 is a view showing the syntax of RGBWL_primaries( ) according to another embodiment of the present invention.

RGBWL_primaries( ) may be used in defining the source gamut (original gamut) and/or the target gamut. It is used as described above.

RGBWL_primaries( ) according to the embodiment may include color_primary_r_x, color_primary_r_y, color_primary_g_x, color_primary_g_y, color_primary_b_x, color_primary_b_y, white_point_x, white_point_y, max_luminance_Y, and min_luminance_Y.

Here, color_primary_r_x, color_primary_r_y, color_primary_g_x, color_primary_g_y, color_primary_b_x, and color_primary_b_y may denote the coordinates of the RGB primary and white point, and may indicate the coordinate values (x, y) of red (r), green (g), and blue (b) in the CIE1931 chromaticity diagram.

white_point_x and white_point_y may denote the coordinates of the white point and may indicate the coordinate values (x, y) of the white point in the CIE1931 chromaticity diagram.

max_luminance_Y may denote the maximum luminance, and may indicate Y of CIE1931. More specifically, max_luminance_Y may indicate the luminance value of peak white.

min_luminance_Y may denote the minimum luminance and may indicate Y of CIE1931. More specifically, min_luminance_Y may indicate a luminance value of the black level.

FIG. 39 is a view showing syntax of color_space_conversion_function( ) according to another embodiment of the present invention.

color_space_conversion_function( ) according to the embodiment includes number_of_coeff and color_space_conversion_coeff[i].

number_of_coeff may indicate the number of coefficients used for color space conversion. For example, when color space conversion is performed using the information of red, green, and blue, which are the primary colors, the coefficients are given in the form of a 3×3 matrix, and therefore number_of_coeff is 9.

color_space_conversion_coeff[i] may indicate the coefficient values of a matrix constituted according to number_of_coeff.

FIG. 40 is a view showing syntax of color_gamut_boundary_info( ) and gamut_boundary_info_type according to another embodiment of the present invention.

Color_gamut_boundary_info( ) according to the embodiment may include gamut_boundary_info_type, number_of_points, x_index, y_Index, z_index, number_of_step_size, LUT_type, and LUT_info( ).

More specifically, color_gamut_boundary_info( ) according to the embodiment includes number_of_points, x_index [i], y_Index [i] and z_index[i], includes number_of_step_size, number_of_points, x_index[i], and y_index[i], or includes LUT_type and LUT_info( ) depending on the value of gamut_boundary_info_type.

As described above, gamut_boundary_info_type may indicate a method for representing a three-dimensional gamut volume boundary. When gamut_boundary_info_type is 0000, color_gamut_boundary may be defined according to a first approach. When gamut_boundary_info_type is 0001, color_gamut_boundary may be defined according to a second approach. According to one embodiment, the first approach and the second approach may derive the other boundary values by performing linear interpolation based on the anchor points for the boundaries, and may define the gamut volume boundary through the derived values or using the convex hull method. When color_gamut_boundary_type is 0010, the color_gamut boundary may be defined with a value represented through a look-up table (LUT).

number_of_points may indicate the number of points for defining the boundary of a chrominance component for each step of each lightness level.

x_index, y_index, and z_index may indicate coordinate in color_space_type or a given color space. For example, in the Lch color space, x_index, y_index, and z_index may have the same meanings as hue, chroma, and lightness Number_of_step_size may indicate the number of steps of a lightness level for defining a color volume in a color space in which the lightness component and the chrominance component can be represented separately.

LUT_type and LUT_info( ) may indicate the type of the look-up table and the information provided through the look-up table, respectively. In an embodiment of LUT_type and LUT_info( ) the embodiment of FIG. 35 described above may be applied FIG. 41 is a view showing syntax of hue_correction_info ( ) and hue_correction_type according to another embodiment of the present invention.

hue_correction_info( ) according to the embodiment may include number_of_points, original_hue_index, target_hue_index, hue_coeff, hue_correction_type, function_type, number_of_coefficients, coeff, LUT_type and LUT_info( )

More specifically, hue_correction_info( ) according to the embodiment may include number_of_points, original_hue_index[i], and target_hue_index[i], include number_of_points, function_type number_of_coefficients and coeff[i][j], or include LUT_type and LUT_info( ) depending on the value of hue_correction_type.

As described above, hue_correction_type may indicate the type of hue correction. When the hue_correction_type is 0000, 0001 or 0010, this may indicate preset type 1, type 2, or type 3. In one embodiment, type 1 may indicate linear interpolation, and type 3 may indicate any equation. For type1, the other hue angles may be derived using given anchor points. More specifically, when hue_correction_type is 0000 and type 1 is linear interpolation, the other hue angles may be derived by performing linear interpolation based on the given anchor points. In the case of type 3, the other hue angles may be derived using an interpolation function defined in hue_correction_info( ). When hue_correction_type is 0011, hue correction may be performed using a look-up table.

number_of_points may indicate the number of anchor points for hue correction.

original_hue_index may indicate hue angle information about the primary colors and the secondary colors in the three-dimensional color space of the original content.

target_hue_index may indicate hue angle information about the primary colors and the secondary colors in the three-dimensional color space of the target content.

function_type may indicate a method of interpolation between the ith hue index and the i+1th hue index. Depending on function_type, a linear or nth order function may be used. The number of coefficients (number_of_coefficients) may be determined according to function_type.

Number_of_coefficients may indicate the number of coefficients used in the function defined by function_type.

coeff may be a parameter value for non-linearly correcting the hue angle between the anchor points set for hue correction.

hue_coeff may be a parameter value for non-linearly correcting the hue angle between the anchor points set for hue correction.

LUT_type and LUT_info( ) may indicate the type of the look-up table and the information provided through the look-up table, respectively. As an embodiment of LUT_type and LUT_info( ) the emebodiment of FIG. 35 described above may be applied.

FIG. 42 is a view showing syntax of hue_region_info( ) and hue_region_type according to another embodiment of the present invention.

hue_region_info( ) according to the embodiment of the present invention may include hue_region_type, chroma_index, lightness_index, alpha, intercept_upper, intercept_bottom, vertex_point_chroma, number of points, x_index, and y_index.

More specifically, hue_region_info( ) according to the embodiment may include chroma_index, lightness_index, and alpha, include intercept_upper, intercept_bottom, vertex_point_chroma, and alpha, or include number_of_points, x_index, and y_index, depending on the value of hue_region_type.

As described above, hue_region_type may indicate the type of representation of the regions in the hue plane. When hue_region_type is 0000, regions in the hue plane may be defined using lightness information and chroma boundary information in the constant_hue plane and a corresponding distance ratio alpha. When hue_region_type is 0001, regions in the hue plane may be defined in a triangular shape or a shape set by the user based on any two neutral points in an inner gamut (narrow gamut). When hue_region_type is 0010, the regions in the hue plane may be defined through region coordinates.

When hue_region_type is 0011 or 0100, the hue_region_type may indicate that the hue regions are divided according to the order of the regions, or that the hue regions are divided according to the method of representing the hue regions. When the hue_region_type may indicate that the hue regions are divided according to the order of the regions (hue_region_type=0011), j ranging to number_of_hue_regions may be used as the order of the regions. When hue_region_type indicates that the hue regions are divided according to the hue region characteristics (hue_region_type=0100), he order of the regions may be predefined (e.g., the order according to the degree of change of chroma/lightness by mapping) or the characteristics may be distinguished by mapping_function_type.

choma_index may indicate the coordinate values of a chroma component positioned at the color volume boundary in the three-dimensional color space.

lightness_index may indicate the coordinate values of a lightness component positioned at the color volume boundary in the three-dimensional color space.

intercept_upper may indicate the coordinate values of a point positioned on the lightness axis to set the invariant area or core region. Intercept_upper may indicate a lightness value close to white.

intercept_bottom indicate the coordinate values of a point positioned on the lightness axis to set a region (e.g., the invariant area or core region). intercept_bottom may indicate a lightness value close to black.

vertex_point_chroma may indicate the chroma having the greatest value in the constant_hue plane among the boundary values corresponding to the inner gamut.

Alpha may indicate a weight for setting the invariant area or core region in a predefined chroma_index, lightness_index, or vertex_point_chroma value.

number_of_points may indicate the number of points for region setting.

_index may indicate the x-axis coordinates for region setting.

y_Index may indicate the y-axis coordinate for region setting.

FIG. 43 is a view showing syntax of mapping_function_info( ) and mapping_function_type according to another embodiment of the present invention.

mapping_function_info( ) according to the embodiment of the present invention may include mapping_function_type, gain, offset, coeff_n, LUT_type, LUT_info( ) mapping_target_point_X, and mapping_target_point_Y.

More specifically, mapping_function_info( ) according to the embodiment may include gain and offset, include gain and offset, include gain, offset, and coeff_n, include LUT_type and LUT_info( ) or include mapping_target_point_X and mapping_target_point_Y, depending on mapping_function_type.

mapping_function_type may indicate the type of a function to be used in mapping_function_info( ) The color information present in the outer gamut needs to be remapped to the inner gamut. Various types of functions may be used for color information remapping. Different types of functions may be applied to the respective regions to maximize the content delivery effect. When mapping_function_type is 0x00, the color information remapping may be performed using a linear function. When mapping_function_type is 0x01, the color information remapping may be performed using an nth order function. When mapping_function_type is 0x02, the color information remapping may be performed by applying a given look-up table. When mapping_function_type is 0x3, the color information remapping may be performed by applying a given look-up table. When mapping_function_type is 0x4, the color information remapping may be performed according to a ratio on a straight line connecting a specific point and an original point (source point). When the mapping_function_type is 0x4, separate color information remapping may not be performed. That is, the original color information may be maintained. In one embodiment, if the region is an invariant area or the core region, mapping_function_type may be 0x4.

Gain and offset may indicate the coefficients of a function to be used for color information remapping. That is, gain may indicate the slope of the function to be used for color information remapping, and offset may indicate the offset of the function to be used for color information remapping.

coeff_n may indicate the order of the n-th order nonlinear function.

In the lower part of FIG. 43, the relationship between input (in) and output (out) according to the function type (linear function or nonlinear function) is exemplarily defined.

mapping_target_point_x and mapping_target_point_y may indicate the coordinates of a specific point when color information remapping is performed according to a ratio on a straight line connecting the specific point and the original point (source point). For example, when remapping is performed according to a predetermined ratio for a straight line connecting a given specific point (x, y) and an original point (x, y) to be mapped, (mapping_target_point_x, mapping_target_point_y) may be used as a reference point.

LUT_type and LUT_info( ) may indicate the type of the look-up table and the information provided through the look-up table, respectively. As an embodiment of LUT_type and LUT_info( ) the embodiment of FIG. 35 may be applied.

Meanwhile, the mapping function described above with reference to the figure may be represented based on the syntax above. For example, for the mapping function for maintaining lightness, when mapping_function_type=0x00, the gain may be set to zero, and the offset may be set to any value (in one embodiment, if offset is set to max, it may be defined as a case where the offset is determined by each source point. As another example, to define a straight line parallel to the cusp line as a mapping function, the gain may be set to the same value as the slope of the cusp line, and the offset may be set to a predetermined value, such as max.

In another aspect, the mapping function may not be defined based on the parameter described above. Instead, the mapping function may be defined by defining mapping_function_type as maintaining lightness, parallel to the cusp line, or mapping toward the intersection of the cusp line and the lightness axis, or the like. Alternatively, a rule may be preconfigured at the transmitting/receiving end, and mapping may be allowed according to the preconfigured rule even when there is no separate signaling.

Figure 44:
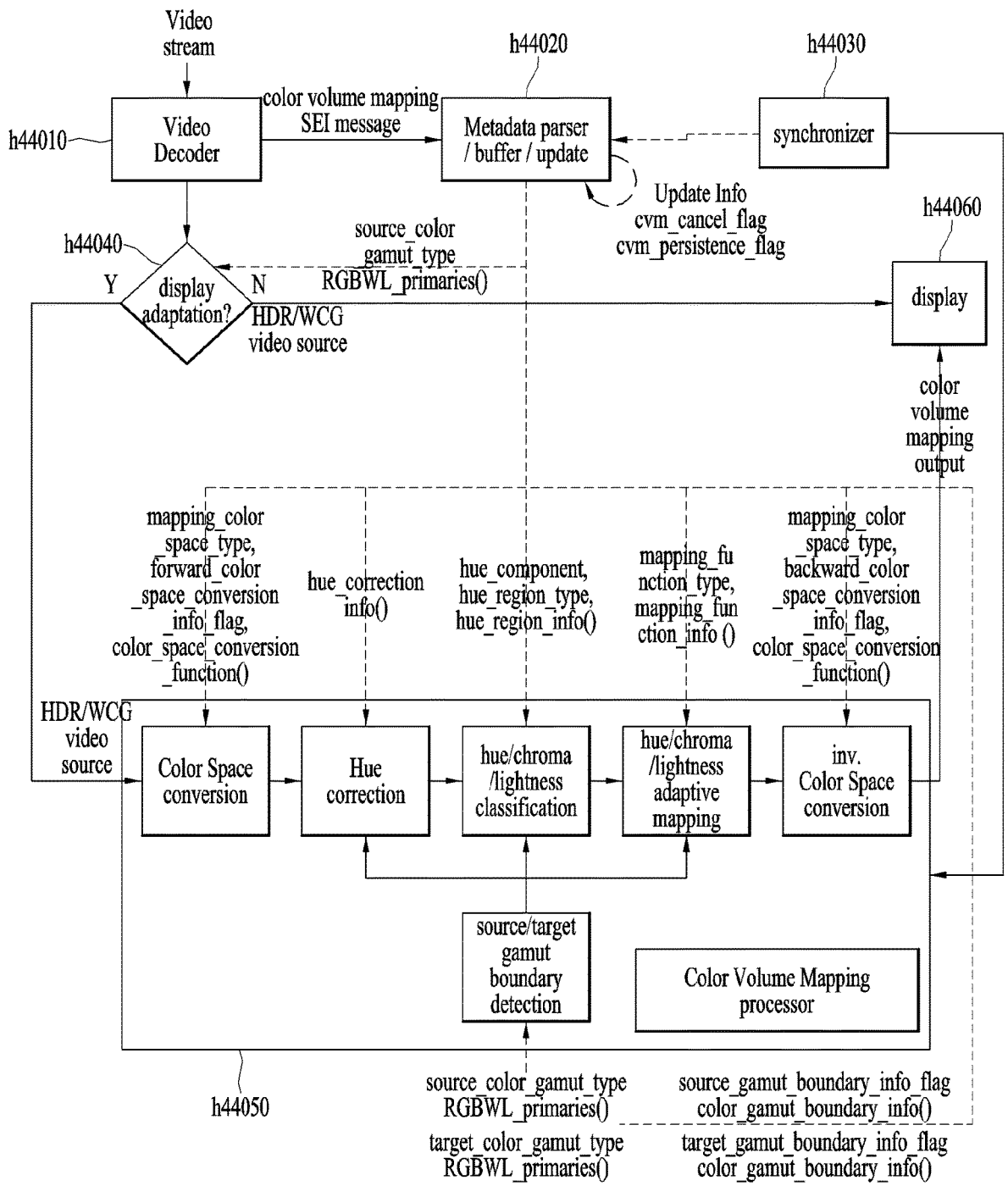
FIG. 44 is a diagram illustrating operation of a receiver of receiving and processing an SEI message including a color volume mapping descriptor according to another embodiment of the present invention.

FIG. 44 is a diagram illustrating operation of a receiver of receiving and processing an SEI message including a color volume mapping descriptor according to another embodiment of the present invention.

The SEI message described in this embodiment may include the color volume mapping descriptor described with reference to FIG. 36.

The receiver includes a video decoder h44010, a metadata parser h44020, a synchronizer h44030, an adaptation unit h44040, a color volume mapping processor h44050 and a display h44060.

The video decoder h44010 may receive a video stream. The video decoder h44010 may decode the video stream and transmit an HDR/WCG video source to the adaptation unit h44040. The video decoder h44010 may also decode the video stream to obtain a color volume mapping SEI message. Here, the color volume mapping SEI message may be an SEI message including a color volume mapping descriptor. The video decoder h44010 may transmit the obtained color volume mapping SEI message to the metadata parser h44020.

The metadata parser h44020 may receive the color volume mapping SEI message from the video decoder h44010. The metadata parser h44020 may parse the color volume mapping SEI message. The metadata parser h44020 may transmit the information contained in the color volume mapping SEI message to other components in the receiver.

The metadata parser h44020 may transmit source_color_gamut_type and RGBWL_primaries( ) to the adaptation unit h44030. The information transmitted to the adaptation unit h44030 may be used as information for determining whether to perform color volume mapping in the adaptation unit h44030.

The metadata parser h44020 may transmit, to the color volume mapping processor h44050, mapping_color_space_type, forward_color_space_conversion_info_flag, color_space_conversion_function( ) hue_correction_info( ) hue_component, hue_region_type, hue_region_info( ) mapping_function_type, mapping_function_info( ) mapping_color_space_type, backward_color_space_conversion_info_ flag, color_space_conversion_function( ) source_color_gamut_type, RGBWL_primaries( ) target_color_gamut_type, source_gamut_boundary_info_flag, color_gamut_boundary_info( ), and/or target_gamut_boundary_info_flag.

More specifically, the metadata parser h44010 may transmit each metadata to an element of the color volume mapping processor h44050.

The metadata parser h44020 may transmit mapping_color_space_type, forward_color_space_conversion_info_flag, and color_space_conversion_function( ) to a color space conversion unit.

In addition, the metadata parser h44020 may transmit, to a source/target gamut boundary detection unit, source_color_gamut_type, RGBWL_primaries( ) target_color_gamut_type, RGBWL_primaries( ) source_gamut_boundary_info_flag, color_gamut_boundary_info( ), target_gamut_boundary_info_flag, and color_gamut_boundary_info( ).

The metadata parser h44020 may transmit hue_correction_info( ) to a hue correction unit.

The metadata parser h44020 may transmit hue_component, hue_region_type and hue_region_info( ) to a region determination (hue/chroma/lightness classification) unit.

The metadata parser h44020 may transmit mapping_function_type and mapping_function_info( ) to a color information remapping (hue/chroma/lightness adaptive mapping) unit.

The metadata parser h44020 may transmit mapping_color_space_type, backward_color_space_conversion_info_flag and color_space_conversion_function( ) to an inverse (inv.) color space conversion unit.

The metadata parser h44020 may update the color volume mapping SEI message using update information. Here, the update information may be cvm_cancel_flag and cvm_persistence_flag.

The synchronizer h44030 may synchronize the metadata parser h44020 with the color volume mapping processor h44050.

The adaptation unit h44040 may receive an HDR/WCG video source from the video decoder h44010.

The adaptation unit h44040 may receive source_color_gamut_type and RGBWL_primaries( ) from the metadata parser h44020. Upon receiving the information, the adaptation unit h44040 may determine whether to perform color volume mapping. If the source color gamut (original color gamut) is a color gamut displayable on the receiver (No in h44040), the adaptation unit h44040 may transmit the HDR/WCG video source received from the video decoder h44010 to the display h44060. On the other hand, if the source color gamut (original color gamut) is a color gamut that is not displayable on the receiver (Yes in h44040), the adaptation unit h44040 may transmit the HDR/WCG video source received from the video decoder h44010 to the color volume mapping processor h44050.

The color volume mapping processor h44050 may receive the HDR/WCG video source from the adaptation unit h44040. In addition, the color volume mapping processor h44050 may receive, from the metadata parser h44020, mapping_color_space_type, forward_color_space_conversion_info_flag, color_space_conversion_function( ) hue_correction_info( ) hue_component, hue_region_type, hue_region_info( ) mapping_function_type, mapping_function_info( ) mapping_color_space_type, backward_color_space_conversion_info_flag, color_space_conversion_function( ) source_color_gamut_type, RGBWL_primaries( ) target_color_gamut_type, source_gamut_boundary_info_flag, color_gamut_boundary_info( ), and/or target_gamut_boundary_info_flag.

More specifically, the element of the color volume mapping processor h44050 may receive respective metadata from the metadata parser h44020.

The color space conversion unit may receive mapping_color_space_type, forward_color_space_conversion_info_flag, and color_space_conversion_function( ) from the metadata parser h44020.

In addition, the source/target gamut boundary detection unit may receive source_color_gamut_type, RGBWL_primaries( ) target_color_gamut_type, RGBWL_primaries( ) source_gamut_boundary_info_flag, color_gamut_boundary_info( ) target_gamut_boundary_info_flag, and color_gamut_boundary_info( ) from the metadata parser h44020.

The hue correction unit may receive hue_correction_info ( ) from the metadata parser h44020.

The region determination (hue/chroma/lightness classification) unit may receive hue_component, hue_region_type, and hue_region_info( ) from the metadata parser h44020.

The color information remapping (hue/chroma/lightness adaptive mapping) unit may receive mapping_function_type and mapping_function_info( ) from the metadata parser h44020.

In addition, the inv. color space conversion unit may receive mapping_color_space_type, backward_color_space_conversion_info_flag, and color_space_conversion_function( ) from the metadata parser h44020.

The color space conversion unit may perform color space conversion on the HDR/WCG video source received from the adaptation unit h44040 using the metadata received from the metadata parser h44020. The color space conversion unit may transmit the color space-converted HDR/WCG video source to the hue correction unit.

The hue correction unit may receive the color space-converted HDR/WCG video source from the color space conversion unit. In addition, the hue correction unit may perform color correction on the color space-converted HDR/WCG video source. In this operation, the hue correction unit may use the metadata received from the metadata parser h44020. The hue correction unit may transmit the hue-corrected HDR/WCG video source to the region determination (hue/chroma/lightness classification) unit.

The region determination (hue/chroma/lightness classification) unit may receive the hue-corrected HDR/WCG video source from the hue correction unit. In addition, the region determination (hue/chroma/lightness classification) unit may determine a region in the gamut to which color information belongs. In this operation, the region determination (hue/chroma/lightness classification) may use the metadata received from the metadata parser h44020. The region determination (hue/chroma/lightness classification) unit may transmit the region-determined color information to the color information remapping (hue/chroma/lightness adaptive mapping) unit.

The color information remapping (hue/chroma/lightness adaptive mapping) unit may receive the region-determined color information from the region determination (hue/chroma/lightness classification) unit. In addition, the color information remapping (hue/chroma/lightness adaptive mapping) unit may perform color information remapping of the color information by applying a mapping function corresponding to the region. In this operation, the color information remapping (hue/chroma/lightness adaptive mapping) unit may use the metadata received from the metadata parser h44020. The color information remapping (hue/chroma/lightness adaptive mapping) unit may transmit the remapped color information to the color space conversion unit.

The inv. color space conversion unit may receive the remapped color information from the color information remapping (hue/chroma/lightness adaptive mapping) unit. In addition, the inv. color space conversion unit may inversely convert the color space into the original color space after gamut mapping. In this operation, the inv. color space conversion unit may use the metadata received from the metadata parser h44020. The inv. color space conversion unit may transmit the color volume mapping-completed video to the display h44060.

The source/target gamut boundary detection unit may detect the boundary of the source gamut and the boundary of the target gamut using the metadata received from the metadata parser h44020. The gamut boundaries detected by the source/target gamut boundary detection unit may be used in the hue correction unit, the region determination (hue/chroma/lightness classification) unit, and/or the color information remapping (hue/chroma/lightness adaptive mapping) unit.

The display h44060 may receive the HDR/WCG video source from the adaptation unit h44040. Alternatively, the display h44060 may receive the color volume mapping-completed video from the color volume mapping processor h44050. The display h44060 may display the video of a wide gamut or a narrow gamut.

Hereinafter, the exemplary operations of the receiver of FIG. 44 will be described in order.

When the video information and the additional information are separated through the video decoder h44010, the receiver may determine whether to perform additional processing based on the additional information (source_color_gamut_type and RGBWL_primaries( ) (where the color gamut information of the display may be additionally used). If it is determined that the color gamut to be represented by the video is wider than the gamut that can be represented by the display and is processible based on the color volume mapping info, the video of the wide gamut may be converted into a color gamut suitable for the display using the above-described detailed information such that the video can be reproduced.

First, the gamut should be converted into a required color space. In this operation, mapping_color_space_type may be used. Alternatively, if forward_color_space_conversion_info_flag is 1, a conversion equation given through the color_space_conversion_function( ) information may be used.

In the the converted color space, the hues of source gamut and target gamut are corrected. In this operation, hue_correction_info( ) may be used.

In addition, information about the gamut boundaries to be used in the subsequent color volume mapping operation may be obtained through source/target gamut boundary detection. In this operation, source_color_gamut_type and target_color_gamut_type may be used, and specific information may be obtained through RGBWL_primaries( ) If source_gamut_boundary_Info_flag and/or target_gamut_boundary_info_flag are 1, this may indicate that the information about the color boundary in the converted color space is delivered, and specific information may be received through color_gamut_boundary=info( ).

In the next step, the colors to be converted are distinguished. That is, the processing method depends on the type of a region to be distinguished by the receiver (algorithm). As a reference for the distinguishment, hue_component and the hue_region_type may be used. When processing is performed differently according to hue, different region information may be delivered according to hue_component, and hue_region_type and specific information hue_region_info( ) may be used for information on each region.

After a hue region to which the hue to be converted belongs is distinguished, color volume mapping may be performed using different methods according to the region. In this operation, information about the conversion method may be obtained through mapping_function_type and mapping_function_info( ) corresponding to hue_component and hue_region_type. The receiver uses the obtained information to adaptively convert the source hue into the hue within the target gamut boundary according to the color region.

For display, the conversion should be performed into the color space for the final output. In this operation, mapping_color_space_type may be used. Alternatively, if backward_color_space_conversion_info_flag is 1, inverse color space conversion according to a given conversion equation may be performed using the color_space_conversion_function( ) information.

The final video output after the color volume mapping is performed may be reproduced through the display h44060.

While it is illustrated in the figure that the metadata is delivered in the form of an SEI message of a video codec, the metadata may be delivered at a service level such as broadcasting, or may be transmitted as additional information of the file format. In the figure, a receiver is exemplarily used to explain how the delivered metadata is substantially used. Although not shown in the figure, an operation having a duality relationship with the operation of the receiver may be performed at the transmitting end. That is, the transmitting end may generate relevant metadata, store the same in a signaling format and deliver the same. The signaling format described above may also be used to communicate relevant information between productions or between devices.

Figure 45:
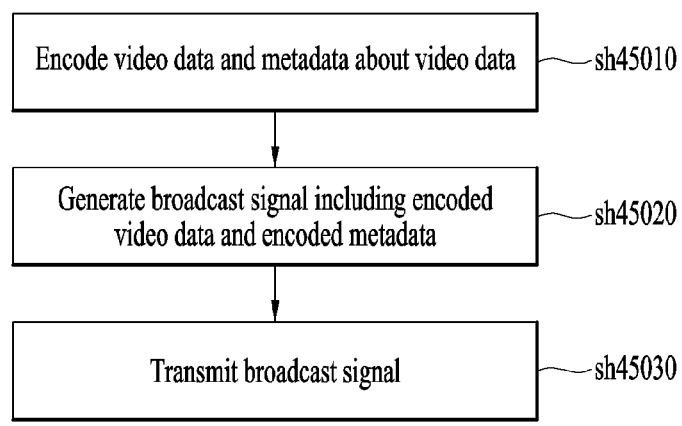
FIG. 45 illustrates a broadcast signal transmission method according to an embodiment of the present invention.

FIG. 45 illustrates a broadcast signal transmission method according to an embodiment of the present invention.

The broadcast signal transmission method according to the embodiment may include encoding video data and metadata for the video data (sh45010), generating a broadcast signal including the encoded video data and metadata (sh45020), and/or transmitting the generated broadcast signal. Here, the metadata may be the metadata described in FIGS. 11, 12, 13, 16, and 25 to 43.

The metadata may include original gamut information indicating the gamut of the video data and target gamut information indicating a target gamut to which the video data is to be converted. Herein, the original gamut information may include original_color_gamut_type and/or RGBWL_primaries( ) in FIGS. 26, 27 and 29, and may include source_color_gamut_type and/or RGBWL_primaries( ) in FIGS. 36 and 38. In addition, the target gamut information may include target_color_gamut_type and/or RGBWL_primaries( ) in FIGS. 26, 27 and 29, and may include target_color_gamut_type and/or RGBWL_primaries( ) in FIGS. 36 and 38.

The metadata may also include color space conversion information used to convert a gamut to a three-dimensional color space in which the lightness axis and the hue axis are separable. Here, the color space conversion information may include color_space_type, color_space_conversion_flag, and/or color_space_conversion_function( ) in FIGS. 26, 28, and 30, or include mapping_color_space_type, forward_color_space_conversion_info_flag, backward_color_space_conversion_info_flag and/or color_space_conversion_function( ) in FIGS. 36, 37, and 39.

The metadata may also include color correction information used for color correction. Herein, the color correction information may include hue_correction_type and/or hue_correction_info( ) in FIGS. 26 and 32, or include hue_correction_type and/or hue_correction_info( ) in FIGS. 36 and 41.

The metadata may include information indicating the number of regions present in the gamut, information indicating a method of dividing the regions, and detailed information for dividing the regions according to the method of dividing the regions. Here, the detailed information for dividing the regions may include reference coordinate information for dividing the regions.

Here, the information indicating the number of regions may be number_of_regions in FIG. 26 or number_of_hue_regions[i] in FIG. 36. The information indicating the method of dividing the regions may be the region_boundary_type in FIG. 26 and FIG. 33, or hue_region_type in FIGS. 36 and 42. Further, the detailed information for dividing the regions may be region_boundary_info( ) in FIGS. 26 and 33, or hue_region_info( ) in FIGS. 36 and 42.

The metadata may also include information indicating a type of a mapping function used for converting a gamut of the video data to a target gamut, and parameter information used in the mapping function. Here, the information indicating the type of the mapping function may be mapping_function_type in FIGS. 26 and 34 or mapping_function_type in FIGS. 36 and 43.

The parameter information used in the mapping function may be mapping_function_info( ) in FIGS. 26 and 34 or mapping_function_type in FIGS. 36 and 43.

In one embodiment, a first region of the regions present in the gamut (the original gamut or the target gamut) may be set not to be subjected to gamut conversion. Here, the first region may be the invariant area or core region described above, which is invariable.

In another embodiment, the method of setting a mapping line used to convert the gamut of the video data to the target gamut may differ among the regions. That is, the mapping line of region A, the mapping line of region B, and the mapping line of region C may be different from each other, as in the embodiment of FIG. 19. In addition, as in the embodiment of FIG. 21, the mapping line of the cusp region, the mapping line of the switch region, and the mapping line of the constant L region may be different from each other.

In yet another embodiment, for a second region of the regions present in the gamut, a straight line parallel to a first line may be set as a first mapping line. For a third region of the regions present in the gamut, a straight line passing through a point where first line intersects the lightness axis as a second mapping line. For a fourth region of the regions present in the gamut, a straight line perpendicular to the lightness axis may be set as a third mapping line. Here, the second region may be the cusp region shown in be the constant L region. The first line may be a straight line connecting a point having the maximum chroma value in the gamut of the video data and a point having the maximum chroma value in the target gamut. That is, the first line may refer to the cusp line in FIG. 21.

The metadata may be signaled in a supplemental enhancement information (SEI) message.

Figure 46:
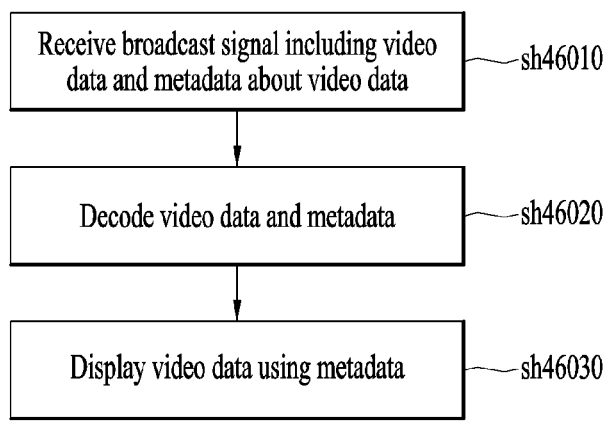
FIG. 46 illustrates a broadcast signal reception method according to an embodiment of the present invention.

FIG. 46 illustrates a broadcast signal reception method according to an embodiment of the present invention.

A method of receiving a broadcast signal according to the embodiment may include receiving a broadcast signal including video data and metadata for the video data (sh46010), decoding the video data and metadata included in the received broadcast signal (Sh46020), and/or displaying the video data using the metadata (sh46030). Here, the metadata may be the metadata described in FIGS. 11, 12, 13, 16, and 25 to 43.

The metadata may include original gamut information indicating the gamut of the video data and target gamut information indicating a target gamut to which the video data is to be converted. Herein, the original gamut information may include original_color_gamut_type and/or RGBWL_primaries( ) in FIGS. 26, 27 and 29, and may include source_color_gamut_type and/or RGBWL_primaries( ) in FIGS. 36 and 38. In addition, the target gamut information may include target_color_gamut_type and/or RGBWL_primaries( ) in FIGS. 26, 27 and 29, and may include target_color_gamut_type and/or RGBWL_primaries( ) in FIGS. 36 and 38.

The metadata may also include color space conversion information used to convert a gamut to a three-dimensional color space in which the lightness axis and the hue axis are separable. Here, the color space conversion information may include color_space_type, color_space_conversion_flag, and/or color_space_conversion_function( ) in FIGS. 26, 28, and 30, or mapping_color_space_type, forward_color_space_conversion_info_flag, backward_color_space_conversion_info_flag and/or color_space_conversion_function ( ) in FIGS. 36, 37, and 39.

The metadata may also include color correction information used for color correction. Herein, the color correction information may include hue_correction_type and/or hue_correction_info( ) in FIGS. 26 and 32, or include hue_correction_type and/or hue_correction_info( ) in FIGS. 36 and 41.

The metadata may include information indicating the number of regions present in the gamut, information indicating a method of dividing the regions, and detailed information for dividing the regions according to the method of dividing the regions. Here, the detailed information for dividing the regions may include reference coordinate information for dividing the regions.

Here, the information indicating the number of regions may be number_of_regions in FIG. 26 or number_of_hue_regions[i] in FIG. 36. The information indicating the method of dividing the regions may be the region_boundary_type in FIG. 26 and FIG. 33, or hue_region_type in FIGS. 36 and 42. Further, the detailed information for dividing the regions may be region_boundary_info( ) in FIGS. 26 and 33, or hue_region_info( ) in FIGS. 36 and 42.

The metadata may also include information indicating a type of a mapping function used for converting a gamut of the video data to a target gamut, and parameter information used in the mapping function. Here, the information indicating the type of the mapping function may be mapping_function_type in FIGS. 26 and 34 or mapping_function_type in FIGS. 36 and 43.

The parameter information used in the mapping function may be mapping_function_info( ) in FIGS. 26 and 34 or mapping_function_type in FIGS. 36 and 43.

In one embodiment, a first region of the regions present in the gamut (the original gamut or the target gamut) may be set not to be subjected to gamut conversion. Here, the first region may be the invariant area or core region described above, which is invariable.

In another embodiment, the method of setting a mapping line used to convert the gamut of the video data to the target gamut may differ among the regions. That is, the mapping line of region A, the mapping line of region B, and the mapping line of region C may be different from each other, as in the embodiment of FIG. 19. In addition, as in the embodiment of FIG. 21, the mapping line of the cusp region, the mapping line of the switch region, and the mapping line of the constant L region may be different from each other.

In yet another embodiment, for a second region of the regions present in the gamut, a straight line parallel to a first line may be set as a first mapping line. For a third region of the regions present in the gamut, a straight line passing through a point where first line intersects the lightness axis as a second mapping line. For a fourth region of the regions present in the gamut, a straight line perpendicular to the lightness axis may be set as a third mapping line. Here, the second region may be the cusp region shown in FIG. 21, etc., and the third region may be the switch region, and the fourth region may be the constant L region. The first line may be a straight line connecting a point having the maximum chroma value in the gamut of the video data and a point having the maximum chroma value in the target gamut. That is, the first line may refer to the cusp line in FIG. 21.

The metadata may be signaled in a supplemental enhancement information (SEI) message.

Figure 47:
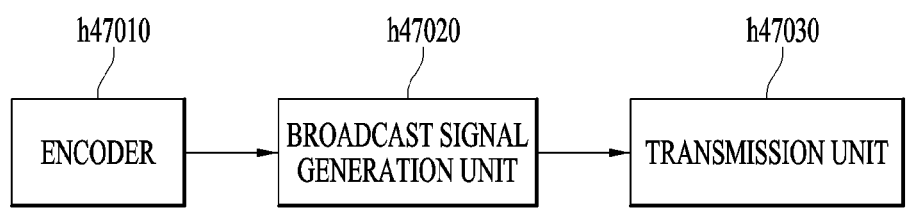
FIG. 47 is a diagram illustrating a broadcast signal transmission apparatus according to an embodiment of the present invention.

FIG. 47 is a diagram illustrating a broadcast signal transmission apparatus according to an embodiment of the present invention.

The broadcast signal transmission apparatus according to the embodiment may include an encoder h47010 configured to encode video data and metadata for the video data, a broadcast signal generation unit h47020 configured to generate a broadcast signal including the encoded video data and metadata, and/or a transmission unit h47030 configured to transmit the generated broadcast signal. Here, the metadata may be the metadata described in FIGS. 11, 12, 13, 16, and 25 to 43.

The metadata may include original gamut information indicating the gamut of the video data and target gamut information indicating a target gamut to which the video data is to be converted. Herein, the original gamut information may include original_color_gamut_type and/or RGB-WL_primaries( ) in FIGS. 26, 27 and 29, and may include source_color_gamut_type and/or RGBWL_primaries( ) in FIGS. 36 and 38. In addition, the target gamut information may include target_color_gamut_type and/or RGBWL_primaries( ) in FIGS. 26, 27 and 29, and may include target_color_gamut_type and/or RGBWL_primaries( ) in FIGS. 36 and 38.

The metadata may also include color space conversion information used to convert a gamut to a three-dimensional color space in which the lightness axis and the hue axis are separable. Here, the color space conversion information may include color_space_type, color_space_conversion_flag, and/or color_space_conversion_function( ) in FIGS. 26, 28, and 30, or include mapping_color_space_type, forward_color_space_conversion_info_flag, backward_color_space_conversion_info_flag and/or color_space_conversion_ function( ) in FIGS. 36, 37, and 39.

The metadata may also include color correction information used for color correction. Herein, the color correction information may include hue_correction_type and/or hue_correction_info( ) in FIGS. 26 and 32, or include hue_correction_type and/or hue_correction_info( ) in FIGS. 36 and 41.

The metadata may include information indicating the number of regions present in the gamut, information indicating a method of dividing the regions, and detailed information for dividing the regions according to the method of dividing the regions. Here, the detailed information for dividing the regions may include reference coordinate information for dividing the regions.

Here, the information indicating the number of regions may be number_of_regions in FIG. 26 or number_of_hue_regions[i] in FIG. 36. The information indicating the method of dividing the regions may be the region_boundary_type in FIG. 26 and FIG. 33, or hue_region_type in FIGS. 36 and 42. Further, the detailed information for dividing the regions may be region_boundary_info( ) in FIGS. 26 and 33, or hue_region_info( ) in FIGS. 36 and 42.

The metadata may also include information indicating a type of a mapping function used for converting the gamut of the video data to the target gamut, and parameter information used in the mapping function. Here, the information indicating the type of the mapping function may be mapping_function_type in FIGS. 26 and 34 or mapping_function_type in FIGS. 36 and 43.

The parameter information used in the mapping function may be mapping_function_info( ) in FIGS. 26 and 34 or mapping_function_type in FIGS. 36 and 43.

In one embodiment, a first region of the regions present in the gamut (the original gamut or the target gamut) may be set not to be subjected to gamut conversion. Here, the first region may be the invariant area or core region described above, which is invariable.

In another embodiment, a method of setting a mapping line used to convert the gamut of the video data to the target gamut may differ among the regions. That is, the mapping line of region A, the mapping line of region B, and the mapping line of region C may be different from each other, as in the embodiment of FIG. 19. In addition, as in the embodiment of FIG. 21, the mapping line of the cusp region, the mapping line of the switch region, and the mapping line of the constant L region may be different from each other.

In yet another embodiment, for a second region of the regions present in the gamut, a straight line parallel to a first line may be set as a first mapping line. For a third region of the regions present in the gamut, a straight line passing through a point where the first line intersects the lightness axis may be set as a second mapping line. For a fourth region of the regions present in the gamut, a straight line perpendicular to the lightness axis may be set as a third mapping line. Here, the second region may be the cusp region shown in FIG. 21, etc., and the third region may be the switch region, and the fourth region may be the constant L region. The first line may be a straight line connecting a point having the maximum chroma value in the gamut of the video data and a point having the maximum chroma value in the target gamut. That is, the first line may refer to the cusp line in FIG. 21.

The metadata may be signaled in a supplemental enhancement information (SEI) message.

Figure 48:
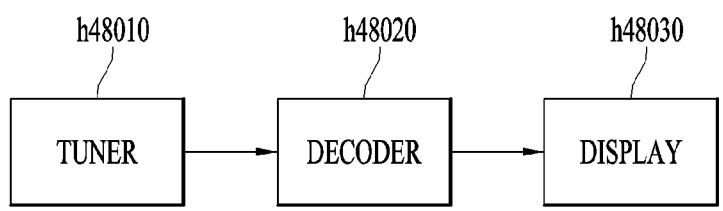
FIG. 48 is a diagram illustrating a broadcast signal reception apparatus according to an embodiment of the present invention.

FIG. 48 is a diagram illustrating a broadcast signal reception apparatus according to an embodiment of the present invention.

A broadcast signal reception apparatus according to the embodiment may include a tuner h48010 configured to receive a broadcast signal including video data and metadata for the video data, a decoder h48020 configured to decode the video data and metadata included in the received broadcast signal, and/or a display h48030 configured to display the video data using the metadata. Here, the metadata may be the metadata described in FIGS. 11, 12, 13, 16, and 25 to 43.

The metadata may include original gamut information indicating the gamut of the video data and target gamut information indicating a target gamut to which the video data is to be converted. Herein, the original gamut information may include original_color_gamut_type and/or RGB-WL_primaries( ) in FIGS. 26, 27 and 29, and may include source_color_gamut_type and/or RGBWL_primaries( ) in FIGS. 36 and 38. In addition, the target gamut information may include target_color_gamut_type and/or RGBWL_primaries( ) in FIGS. 26, 27 and 29, and may include target_color_gamut_type and/or RGBWL_primaries( ) in FIGS. 36 and 38.

The metadata may also include color space conversion information used to convert a gamut to a three-dimensional color space in which the lightness axis and the hue axis are separable. Here, the color space conversion information may include color_space_type, color_space_conversion_flag, and/or color_space_conversion_function( ) in FIGS. 26, 28, and 30, or mapping_color_space_type, forward_color_space_conversion_info_flag, backward_color_space_conversion_info_flag and/or color_space_conversion_function ( ) in FIGS. 36, 37, and 39.

The metadata may also include color correction information used for color correction. Herein, the color correction information may include hue_correction_type and/or hue_correction_info( ) in FIGS. 26 and 32, or include hue_correction_type and/or hue_correction_info( ) in FIGS. 36 and 41.

The metadata may include information indicating the number of regions present in the gamut, information indicating a method of dividing the regions, and detailed information for dividing the regions according to the method of dividing the regions. Here, the detailed information for dividing the regions may include reference coordinate information for dividing the regions.

Here, the information indicating the number of regions may be number_of_regions in FIG. 26 or number_of_hue_regions[i] in FIG. 36. The information indicating the method of dividing the regions may be the region_boundary_type in FIG. 26 and FIG. 33, or hue_region_type in FIGS. 36 and 42. Further, the detailed information for dividing the regions may be region_boundary_info( ) in FIGS. 26 and 33, or hue_region_info( ) in FIGS. 36 and 42.

The metadata may also include information indicating a type of a mapping function used for converting a gamut of the video data to a target gamut, and parameter information used in the mapping function. Here, the information indicating the type of the mapping function may be mapping_function_type in FIGS. 26 and 34 or mapping_function_type in FIGS. 36 and 43.

The parameter information used in the mapping function may be mapping_function_info( ) in FIGS. 26 and 34 or mapping_function_type in FIGS. 36 and 43.

In one embodiment, a first region of the regions present in the gamut (the original gamut or the target gamut) may be set not to be subjected to gamut conversion. Here, the first region may be the invariant area or core region described above, which is invariable.

In another embodiment, the method of setting a mapping line used to convert the gamut of the video data to the target gamut may differ among the regions. That is, the mapping line of region A, the mapping line of region B, and the mapping line of region C may be different from each other, as in the embodiment of FIG. 19. In addition, as in the embodiment of FIG. 21, the mapping line of the cusp region, the mapping line of the switch region, and the mapping line of the constant L region may be different from each other.

In yet another embodiment, for a second region of the regions present in the gamut, a straight line parallel to a first line may be set as a first mapping line. For a third region of the regions present in the gamut, a straight line passing through a point where first line intersects the lightness axis as a second mapping line. For a fourth region of the regions present in the gamut, a straight line perpendicular to the lightness axis may be set as a third mapping line. Here, the second region may be the cusp region shown in FIG. 21, etc., and the third region may be the switch region, and the fourth region may be the constant L region. The first line may be a straight line connecting a point having the maximum chroma value in the gamut of the video data and a point having the maximum chroma value in the target gamut. That is, the first line may refer to the cusp line in FIG. 21.

The metadata may be signaled in a supplemental enhancement information (SEI) message.

The internal components of the above-described apparatuses may be processors executing the sequential execution processes stored in the memory, or hardware components configured with other hardware. These may be located inside or outside the apparatuses.

The above-described modules may be omitted in an embodiment, or may be replaced by other modules performing similar/identical operations.

Each of the above-described parts, modules, or units may be an processor or a hardware part that executes sequential execution processes stored in a memory (or storage unit). Each of the steps described in the above embodiments may be performed by the processors or hardware parts. The respective modules/blocks/units described in the above embodiments may operate as hardware/processors. Further, the methods proposed by the present invention may be executed as codes. The codes may be written to a storage medium readable by the processor, and thus readable by the processors provided by the apparatuses.

Although the drawings have been described separately for the sake of convenience of explanation, it is also possible to design a new embodiment to be implemented by combining the embodiments described in each drawing. It is also within the scope of the present invention to design a computer-readable recording medium in which a program for executing the previously described embodiments is recorded according to the needs of those skilled in the art.

The apparatuses and methods according to the present invention are not limited to the configurations and methods of the embodiments described above. The above-described embodiments may be configured such that various modifications can be made by selectively combining all or some of the embodiments.

The methods according to the present invention may be implemented with processor-readable code in a processor-readable recording medium provided to a network device. The processor-readable medium includes all kinds of recording devices capable of storing data readable by a processor. Examples of the processor-readable medium include ROM, RAM, CD-ROM, magnetic tapes, floppy disks, and optical data storage devices, and also include carrier-wave type implementation such as transmission over the Internet. In addition, the processor-readable recording medium may be distributed over network-connected computer systems so that code readable by the processor in a distributed fashion may be stored and executed.

While the present invention has been particularly shown and described with reference to exemplary embodiments thereof, it is to be understood that the invention is not limited to the disclosed exemplary embodiments. It will be understood by those skilled in the art that various modifications and variations can be made in the present invention without departing from the spirit and scope of the present invention. These modifications should not be understood individually from the technical idea or viewpoint of the present invention.

It will be understood by those skilled in the art that various changes and modifications may be made in the present invention without departing from the spirit or scope of the invention. Thus, it is intended that the present invention cover the modifications and variations of this invention provided they come within the scope of the appended claims and their equivalents.

Both apparatus and method inventions are discussed in this specification and descriptions of both of the apparatus and method inventions may be complementarily applicable to each other.

MODE FOR INVENTION

Various embodiments have been described in the best mode.

INDUSTRIAL APPLICABILITY

The present invention is available in a series of broadcast signal provision fields.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of receiving data, the method comprising:
receiving video data having an original color gamut and metadata for the video data;
dividing a constant hue angle plane composed of a lightness axis and a chroma axis into multiple regions based on the original color gamut, a target color gamut of a display for displaying the video data, a first line, and a second line on the constant hue angle plane,
wherein the first line is set as a line made by intersecting a maximum chroma point of the original color gamut and a maximum chroma point of the target color gamut,
wherein the second line is set as a line that is parallel to the chroma axis based on a point at which the first line intersects the lightness axis,
wherein the multiple regions comprise a first region and second regions including one or more mapping regions, and
wherein the first region is a closed area in a boundary of the target color gamut;
mapping color information of the original color gamut into color information between a boundary of the first region and the boundary of the target color gamut when the color information of the original color gamut presents between a boundary of the original color gamut and the boundary of the target color gamut,
wherein the mapping color information of the original color gamut applies a different mapping method for each mapping region of the second regions,
wherein the color information of the original color gamut is not changed when the color information of the original color gamut presents in the first region, and
wherein the color information includes a lightness component and a chroma component; and
displaying the video data.

2. The method of claim 1, wherein the second regions include a first mapping region, a second mapping region, and a third mapping region,
wherein the first mapping region is determined based on the boundary of the first region, the second line, and the boundary of the original color gamut,
wherein the second mapping region is determined based on the boundary of the first region, the first line, and the boundary of the original color gamut, and
wherein the third mapping region is determined based on the boundary of the first region, the first line, the second line and the boundary of the original color gamut.

3. The method of claim 2, wherein color information of the original color gamut in the first mapping region is mapped into color information of the target color gamut along a mapping line that is parallel to the second line and intersects a point of the color information of the original color gamut.

4. The method of claim 2, wherein color information of the original color gamut in the second mapping region is mapped into color information of the target color gamut along a mapping line that is parallel to the first line and intersects a point of the color information of the original color gamut.

5. The method of claim 2, wherein color information of the original color gamut in the third mapping region is mapped into color information of the target color gamut along a mapping line intersecting a point of the color information of the original color gamut and the point at which the first line intersects the lightness axis.

6. An apparatus for receiving data, the apparatus comprising:
a receiver to receive video data having an original color gamut and metadata for the video data; and
a color gamut mapper to maps color information of the original color gamut into color information of a target color gamut of a display for displaying the video data,
wherein the color gamut mapper divides a constant hue angle plane composed of a lightness axis and a chroma axis into multiple regions based on the original color gamut, the target color gamut, a first line, and a second line on the constant hue angle plane,
wherein the first line is set as a line made by intersecting a maximum chroma point of the original color gamut and a maximum chroma point of the target color gamut,
wherein the second line is set as a line that is parallel to the chroma axis based on a point at which the first line intersects the lightness axis,
wherein the multiple regions comprise a first region and second regions including one or more mapping regions,
wherein the first region is a closed area in a boundary of the target color gamut,
wherein the color gamut mapper maps color information of the original color gamut into color information between a boundary of the first region and the boundary of the target color gamut when the color information of the original color gamut presents between a boundary of the original color gamut and the boundary of the target color gamut,
wherein the color gamut mapper applies a different mapping method for each mapping region of the second regions,
wherein the color information of the original color gamut is not changed when the color information of the original color gamut presents in the first region,
wherein the color information includes a lightness component and a chroma component, and
wherein the display displays the video data.

7. The apparatus of claim 6, wherein the second regions include a first mapping region, a second mapping region, and a third mapping region,
wherein the first mapping region is determined based on the boundary of the first region, the second line, and the boundary of the original color gamut,
wherein the second mapping region is determined based on the boundary of the first region, the first line, and the boundary of the original color gamut, and
wherein the third mapping region is determined based on the boundary of the first region, the first line, the second line and the boundary of the original color gamut.

8. The apparatus of claim 7, wherein color information of the original color gamut in the first mapping region is mapped into color information of the target color gamut along a mapping line that is parallel to the second line and intersects a point of the color information of the original color gamut.

9. The apparatus of claim 7, wherein color information of the original color gamut in the second mapping region is mapped into color information of the target color gamut along a mapping line that is parallel to the first line and intersects a point of the color information of the original color gamut.

10. The apparatus of claim 7, wherein color information of the original color gamut in the third mapping region is mapped into color information of the target color gamut along a mapping line intersecting a point of the color information of the original color gamut and the point at which the first line intersects the lightness axis.

\* \* \* \* \*